(12) United States Patent
Nurse et al.

(10) Patent No.: US 9,002,680 B2
(45) Date of Patent: Apr. 7, 2015

(54) FOOT GESTURES FOR COMPUTER INPUT AND INTERFACE CONTROL

(75) Inventors: Matthew A. Nurse, Lake Oswego, OR (US); James C. Meschter, Portland, OR (US); Jeffrey C. Pisciotta, Oregon City, OR (US); Allan M. Schrock, Portland, OR (US); William F. Rauchholz, Portland, OR (US)

(73) Assignee: Nike, Inc., Beaverton, OR (US)

( * ) Notice: Subject to any disclaimer, the term of this patent is extended or adjusted under 35 U.S.C. 154(b) by 856 days.

(21) Appl. No.: 13/051,859

(22) Filed: Mar. 18, 2011

(65) Prior Publication Data
US 2011/0199393 A1     Aug. 18, 2011

Related U.S. Application Data

(63) Continuation-in-part of application No. 12/483,824, filed on Jun. 12, 2009, now Pat. No. 8,676,541, and a continuation-in-part of application No. 12/483,828, filed on Jun. 12, 2009.

(60) Provisional application No. 61/138,048, filed on Dec. 16, 2008, provisional application No. 61/061,427, filed on Jun. 13, 2008.

(51) Int. Cl.
*G06F 11/00* (2006.01)
*A43B 3/00* (2006.01)
(Continued)

(52) U.S. Cl.
CPC ............... *A43B 3/00* (2013.01); *A43B 3/0005* (2013.01); *A43B 3/0021* (2013.01); *A43B 3/16* (2013.01);
(Continued)

(58) Field of Classification Search
CPC ..................................................... G06F 3/0485
USPC .................... 702/188, 41, 139, 160, 182, 187
See application file for complete search history.

(56) References Cited

U.S. PATENT DOCUMENTS

4,373,651 A   2/1983   Fanslow
4,518,267 A   5/1985   Hepp
(Continued)

FOREIGN PATENT DOCUMENTS

CN     200994779 Y     12/2007
EP     1707065         10/2006
(Continued)

OTHER PUBLICATIONS

Non-final Office Action dated Sep. 26, 2013, in U.S. Appl. No. 13/401,918.
(Continued)

*Primary Examiner* — Phuong Huynh
(74) *Attorney, Agent, or Firm* — Banner & Witcoff, Ltd.

(57) ABSTRACT

Non-video game computer user interfaces utilize human foot action to generate input for controlling the interface (e.g., a graphical user interface). Computer systems that use such input may include: (a) at least one input system including one or more sensing devices for sensing action by one or more feet; (b) a data transmission system for transmitting the sensed foot action to (c) a processing system that utilizes the foot action input to provide control data input for a user interface; and (d) an output device for producing a non-video game computer output based, at least in part, on data provided by the processing system. The control data relating to the foot action is used, at least in part, for controlling a user interface associated with the computer output.

27 Claims, 34 Drawing Sheets

(51) Int. Cl.

| | | |
|---|---|---|
| *A43B 3/16* | (2006.01) | |
| *A63B 24/00* | (2006.01) | |
| *A63B 69/00* | (2006.01) | |
| *G06F 3/01* | (2006.01) | |
| *G06F 3/023* | (2006.01) | |
| *G06F 3/033* | (2013.01) | |
| *G06F 3/0482* | (2013.01) | |
| *G06F 3/0484* | (2013.01) | |
| *G06F 3/0485* | (2013.01) | |
| *G06F 11/30* | (2006.01) | |
| *A63B 26/00* | (2006.01) | |
| *A63B 71/06* | (2006.01) | |

(52) U.S. Cl.
 CPC ............ *A63B 24/0062* (2013.01); *A63B 69/00* (2013.01); *A63B 69/0028* (2013.01); *G06F 3/011* (2013.01); *G06F 3/017* (2013.01); *G06F 3/0236* (2013.01); *G06F 3/0334* (2013.01); *G06F 3/0482* (2013.01); *G06F 3/04847* (2013.01); *G06F 3/0485* (2013.01); *A63B 26/003* (2013.01); *A63B 2069/0006* (2013.01); *A63B 2071/0638* (2013.01); *A63B 2220/12* (2013.01); *A63B 2220/40* (2013.01); *A63B 2220/53* (2013.01); *A63B 2220/836* (2013.01); *A63B 2225/50* (2013.01); *A63B 2243/0004* (2013.01); *A63B 2243/0025* (2013.01); *A63B 2243/0029* (2013.01); *A63B 2243/0041* (2013.01); *A63B 2243/0083* (2013.01); *A63F 2300/1012* (2013.01); *A63F 2300/1031* (2013.01)

(56) References Cited

U.S. PATENT DOCUMENTS

| | | | |
|---|---|---|---|
| 4,578,769 | A | 3/1986 | Frederick |
| 4,578,969 | A | 4/1986 | Larson |
| 4,647,918 | A | 3/1987 | Goforth |
| 4,703,445 | A | 10/1987 | Dassler |
| 4,745,930 | A | 5/1988 | Confer |
| 4,814,661 | A | 3/1989 | Ratzlaff et al. |
| 4,866,412 | A | 9/1989 | Rzepczynski |
| 5,033,291 | A | 7/1991 | Podoloff et al. |
| 5,047,952 | A | 9/1991 | Kramer et al. |
| 5,050,962 | A | 9/1991 | Monnier et al. |
| 5,150,536 | A | 9/1992 | Strong |
| 5,323,650 | A | 6/1994 | Fullen et al. |
| 5,373,651 | A | 12/1994 | Wood |
| 5,393,651 | A | 2/1995 | Hoshi |
| 5,422,521 | A | 6/1995 | Neer et al. |
| 5,444,462 | A | 8/1995 | Wambach |
| 5,471,405 | A | 11/1995 | Marsh |
| 5,500,635 | A | 3/1996 | Mott |
| 5,636,146 | A | 6/1997 | Flentov et al. |
| 5,636,378 | A | 6/1997 | Griffith |
| 5,638,300 | A | 6/1997 | Johnson |
| 5,644,858 | A | 7/1997 | Bemis |
| 5,702,323 | A | 12/1997 | Poulton |
| 5,720,200 | A | 2/1998 | Anderson et al. |
| 5,724,265 | A | 3/1998 | Hutchings |
| 5,785,666 | A | 7/1998 | Costello et al. |
| 5,812,142 | A | 9/1998 | Small et al. |
| 5,813,142 | A | 9/1998 | Demon |
| 5,813,406 | A | 9/1998 | Kramer et al. |
| 5,844,861 | A | 12/1998 | Maurer |
| 5,903,454 | A | 5/1999 | Hoffberg et al. |
| 5,907,819 | A | 5/1999 | Johnson |
| 5,913,727 | A | 6/1999 | Ahdoot |
| 5,929,332 | A | 7/1999 | Brown |
| 5,960,380 | A | 9/1999 | Flentov et al. |
| 5,963,891 | A | 10/1999 | Walker et al. |
| 6,017,128 | A | 1/2000 | Goldston et al. |
| 6,018,705 | A | 1/2000 | Gaudet et al. |
| 6,050,962 | A | 4/2000 | Kramer et al. |
| 6,066,075 | A | 5/2000 | Poulton |
| 6,081,750 | A | 6/2000 | Hoffberg et al. |
| 6,122,340 | A | 9/2000 | Darley et al. |
| 6,174,294 | B1 | 1/2001 | Crabb et al. |
| 6,195,921 | B1 | 3/2001 | Truong |
| 6,198,394 | B1 | 3/2001 | Jacobsen et al. |
| 6,266,623 | B1 | 7/2001 | Vock et al. |
| 6,298,314 | B1 | 10/2001 | Blackadar et al. |
| 6,330,757 | B1 | 12/2001 | Russell |
| 6,336,365 | B1 | 1/2002 | Blackadar et al. |
| 6,357,147 | B1 | 3/2002 | Darley et al. |
| 6,360,597 | B1 | 3/2002 | Hubbard, Jr. |
| 6,426,490 | B1 | 7/2002 | Storz |
| 6,428,490 | B1 | 8/2002 | Kramer et al. |
| 6,430,843 | B1 | 8/2002 | Potter et al. |
| 6,493,652 | B1 | 12/2002 | Ohlenbusch et al. |
| 6,496,787 | B1 | 12/2002 | Flentov et al. |
| 6,496,952 | B1 | 12/2002 | Osada et al. |
| 6,498,994 | B2 | 12/2002 | Vock et al. |
| 6,515,284 | B1 | 2/2003 | Walle et al. |
| 6,516,284 | B2 | 2/2003 | Flentov et al. |
| 6,536,139 | B2 | 3/2003 | Darley et al. |
| 6,539,336 | B1 | 3/2003 | Vock et al. |
| 6,544,858 | B1 | 4/2003 | Beekman et al. |
| 6,560,903 | B1 | 5/2003 | Darley |
| 6,578,291 | B2 | 6/2003 | Hirsch et al. |
| 6,611,789 | B1 | 8/2003 | Darley |
| 6,640,144 | B1 | 10/2003 | Huang et al. |
| 6,718,200 | B2 | 4/2004 | Marmaropoulos et al. |
| 6,748,462 | B2 | 6/2004 | Dubil et al. |
| 6,785,579 | B2 | 8/2004 | Huang et al. |
| 6,785,805 | B1 | 8/2004 | House et al. |
| 6,808,462 | B2 | 10/2004 | Snyder et al. |
| 6,829,512 | B2 | 12/2004 | Huang et al. |
| 6,836,744 | B1 | 12/2004 | Asphahani et al. |
| 6,882,897 | B1 | 4/2005 | Fernandez |
| 6,889,282 | B2 | 5/2005 | Schollenberger |
| 6,892,216 | B2 | 5/2005 | Coburn, II et al. |
| 6,909,420 | B1 | 6/2005 | Nicolas et al. |
| 6,922,664 | B1 | 7/2005 | Fernandez et al. |
| 6,959,259 | B2 | 10/2005 | Vock et al. |
| 6,963,818 | B2 | 11/2005 | Flentov et al. |
| 6,978,320 | B2 | 12/2005 | Nonaka |
| 7,045,151 | B2 | 5/2006 | Trant |
| 7,046,151 | B2 | 5/2006 | Dundon |
| 7,054,784 | B2 | 5/2006 | Flentov et al. |
| 7,057,551 | B1 | 6/2006 | Vogt |
| 7,070,571 | B2 | 7/2006 | Kramer et al. |
| 7,092,846 | B2 | 8/2006 | Vock et al. |
| 7,152,343 | B2 | 12/2006 | Whatley |
| 7,171,331 | B2 | 1/2007 | Vock et al. |
| 7,200,517 | B2 | 4/2007 | Darley et al. |
| 7,245,898 | B2 | 7/2007 | Van Bosch et al. |
| 7,277,021 | B2 | 10/2007 | Beebe et al. |
| 7,304,580 | B2 | 12/2007 | Sullivan et al. |
| 7,310,895 | B2 | 12/2007 | Whittlesey et al. |
| RE40,474 | E | 9/2008 | Quellais et al. |
| 7,426,873 | B1 | 9/2008 | Kholwadwala et al. |
| 7,428,471 | B2 | 9/2008 | Darley et al. |
| 7,433,805 | B2 | 10/2008 | Vock et al. |
| 7,457,724 | B2 | 11/2008 | Vock et al. |
| 7,498,856 | B2 | 3/2009 | Baier et al. |
| 7,498,956 | B2 | 3/2009 | Baier et al. |
| 7,522,970 | B2 | 4/2009 | Fernandez |
| 7,552,549 | B2 | 6/2009 | Whittlesey et al. |
| 7,579,946 | B2 | 8/2009 | Case, Jr. |
| 7,607,243 | B2 | 10/2009 | Berner, Jr. et al. |
| 7,617,068 | B2 | 11/2009 | Tadin et al. |
| 7,623,987 | B2 | 11/2009 | Vock et al. |
| 7,816,632 | B2 | 10/2010 | Bourke, III et al. |
| 7,997,007 | B2 | 8/2011 | Sanabria-Hernandez |
| 8,056,268 | B2 | 11/2011 | DiBenedetto et al. |
| 8,061,061 | B1 | 11/2011 | Rivas |
| 8,099,258 | B2 | 1/2012 | Alten et al. |
| 8,172,722 | B2 | 5/2012 | Molyneux et al. |
| 8,251,930 | B2 | 8/2012 | Ido |
| 8,467,979 | B2 | 6/2013 | Sobolewski |

(56) References Cited

U.S. PATENT DOCUMENTS

| | | |
|---|---|---|
| 8,474,153 B2 | 7/2013 | Brie et al. |
| 8,676,541 B2 | 3/2014 | Schrock et al. |
| 8,739,639 B2 | 6/2014 | Owings et al. |
| 2003/0009308 A1 | 1/2003 | Kirtley |
| 2003/0163287 A1 | 8/2003 | Vock et al. |
| 2004/0218317 A1 | 11/2004 | Kawazu et al. |
| 2004/0226192 A1 | 11/2004 | Geer et al. |
| 2005/0032582 A1 | 2/2005 | Mahajan et al. |
| 2005/0106977 A1 | 5/2005 | Coulston |
| 2005/0183292 A1 | 8/2005 | DiBenedetto et al. |
| 2005/0188566 A1 | 9/2005 | Whittlesey et al. |
| 2005/0221403 A1 | 10/2005 | Gazenko |
| 2005/0282633 A1 | 12/2005 | Nicolas et al. |
| 2006/0010174 A1 | 1/2006 | Nguyen et al. |
| 2006/0017692 A1 | 1/2006 | Wehrenberg et al. |
| 2006/0025229 A1 | 2/2006 | Mahajan et al. |
| 2006/0026120 A1 | 2/2006 | Carolan et al. |
| 2006/0143645 A1 | 6/2006 | Vock et al. |
| 2006/0144152 A1 | 7/2006 | Cabuz et al. |
| 2006/0226843 A1 | 10/2006 | Al-Anbuky et al. |
| 2006/0248749 A1 | 11/2006 | Ellis |
| 2006/0262120 A1 | 11/2006 | Rosenberg |
| 2007/0006489 A1 | 1/2007 | Case, Jr. et al. |
| 2007/0032748 A1* | 2/2007 | McNeil et al. .............. 600/595 |
| 2007/0063849 A1 | 3/2007 | Rosella et al. |
| 2007/0063850 A1 | 3/2007 | Devaul et al. |
| 2007/0067885 A1 | 3/2007 | Fernandez |
| 2007/0068244 A1 | 3/2007 | Billing et al. |
| 2007/0078324 A1 | 4/2007 | Wijisiriwardana |
| 2007/0094890 A1 | 5/2007 | Cho et al. |
| 2007/0118328 A1 | 5/2007 | Vock et al. |
| 2007/0143452 A1 | 6/2007 | Suenbuel et al. |
| 2007/0152812 A1 | 7/2007 | Wong et al. |
| 2007/0173705 A1 | 7/2007 | Teller et al. |
| 2007/0208544 A1 | 9/2007 | Kulach et al. |
| 2007/0250286 A1 | 10/2007 | Duncan et al. |
| 2007/0260421 A1 | 11/2007 | Berner et al. |
| 2007/0283599 A1 | 12/2007 | Talbott |
| 2008/0027679 A1 | 1/2008 | Shklarski |
| 2008/0028783 A1 | 2/2008 | Immel et al. |
| 2008/0048616 A1 | 2/2008 | Paul et al. |
| 2008/0056508 A1 | 3/2008 | Pierce et al. |
| 2008/0060224 A1 | 3/2008 | Whittlesey et al. |
| 2008/0066343 A1 | 3/2008 | Sanabria-Hernandez |
| 2008/0127527 A1 | 6/2008 | Chen |
| 2008/0172498 A1 | 7/2008 | Boucard |
| 2008/0177507 A1 | 7/2008 | Mian et al. |
| 2008/0200312 A1 | 8/2008 | Tagliabue |
| 2008/0203144 A1 | 8/2008 | Kim |
| 2008/0218310 A1 | 9/2008 | Alten et al. |
| 2008/0221403 A1 | 9/2008 | Hernandez |
| 2008/0246629 A1 | 10/2008 | Tsui et al. |
| 2008/0255794 A1 | 10/2008 | Levine |
| 2008/0258921 A1 | 10/2008 | Woo et al. |
| 2008/0259028 A1 | 10/2008 | Teepell et al. |
| 2008/0287832 A1 | 11/2008 | Collins et al. |
| 2008/0297832 A1 | 12/2008 | Otsuka |
| 2008/0306410 A1 | 12/2008 | Kalpaxis et al. |
| 2008/0318679 A1 | 12/2008 | Tran et al. |
| 2009/0018691 A1 | 1/2009 | Fernandez |
| 2009/0048538 A1 | 2/2009 | Levine et al. |
| 2009/0075347 A1 | 3/2009 | Cervin et al. |
| 2009/0105047 A1 | 4/2009 | Guidi et al. |
| 2009/0107009 A1 | 4/2009 | Bishop et al. |
| 2009/0135001 A1 | 5/2009 | Yuk |
| 2009/0137933 A1* | 5/2009 | Lieberman et al. .......... 600/595 |
| 2009/0153369 A1 | 6/2009 | Baier et al. |
| 2009/0153477 A1 | 6/2009 | Saenz |
| 2009/0163287 A1 | 6/2009 | Vald'Via et al. |
| 2009/0167677 A1 | 7/2009 | Kruse et al. |
| 2010/0000121 A1 | 1/2010 | Brodie et al. |
| 2010/0004566 A1 | 1/2010 | Son et al. |
| 2010/0063778 A1 | 3/2010 | Schrock et al. |
| 2010/0063779 A1 | 3/2010 | Schrock et al. |
| 2010/0072948 A1 | 3/2010 | Sun et al. |
| 2010/0152619 A1 | 6/2010 | Kalpaxis et al. |
| 2010/0191490 A1 | 7/2010 | Martens et al. |
| 2010/0312083 A1 | 12/2010 | Southerland |
| 2011/0087445 A1 | 4/2011 | Sobolewski |
| 2011/0119027 A1 | 5/2011 | Zhu et al. |
| 2011/0208444 A1 | 8/2011 | Solinsky |
| 2012/0050529 A1 | 3/2012 | Bentley |
| 2012/0234111 A1 | 9/2012 | Molyneux et al. |
| 2013/0213145 A1 | 8/2013 | Owings et al. |
| 2014/0033572 A1 | 2/2014 | Steier et al. |

FOREIGN PATENT DOCUMENTS

| | | |
|---|---|---|
| FR | 2929827 A1 | 10/2009 |
| GB | 251054 | 4/1926 |
| GB | 2421416 | 6/2006 |
| JP | 2005156531 | 6/2005 |
| JP | 2005270640 | 10/2005 |
| JP | 200715117 | 6/2007 |
| JP | 2010088886 A | 4/2010 |
| JP | 2010-517725 A | 5/2010 |
| WO | 00/33031 A1 | 6/2000 |
| WO | 2006065679 A2 | 6/2006 |
| WO | 2007064735 | 6/2007 |
| WO | 2008061023 | 5/2008 |
| WO | 2009152456 A2 | 12/2009 |
| WO | 2012112931 A2 | 8/2012 |
| WO | 2012/143274 | 10/2012 |

OTHER PUBLICATIONS

Notice of Reasons for Rejection (with English translation) dated Jul. 3, 2013 for JP Application No. 2011-513731.

ISR & WO dated Aug. 7, 2013, from PCT/US2013/027397.

ISR & WO dated May 28, 2013,, from PCT/US2013/027421.

English translation of CN Office Action dated Apr. 18, 2013, from CN Application No. 200980127315.X.

International Search Report and Written Opinion from PCT Application No. PCT/US2012/025713 mailed Sep. 5, 2012.

International Search Report and Written Opinion from PCT Application No. PCT/US2012/025717 mailed Aug. 21, 2012.

ISR and WO for PCT Application No. PCT/2009/047246 mailed Dec. 11, 2009.

Chinese Office Action issued Jun. 8, 2012 from CN Application No. 200980128315.X.

ISR and WO Mailed Jul. 11, 2012 from PCT/2012025709.

Morris, Stacy, J., A Shoe-Integrated Sensor System for Wireless Gait Analysis and Real-Time Therapeutic Feedback, dissertation, 2004, pp. 1-314, Massachusetts Institute of Technology, MA.

International Preliminary Report on Patentability dated Aug. 29, 2013 in International Application No. PCT/US2012/025713.

Fleming et al, Athlete and Coach Perceptions of Technology Needs for Evaluating Running Performance, article, Aug. 14, 2010, 18 pages, 13:1-18, UK.

Salpavaara, et al. Wireless Insole Sensor System for Plantar Force Measurements during Sports Events, article, Sep. 6-11, 2009, XIX IMEKO World Congress, Fundamental and Applied Metrology, 6 pages, Lisbon, Portugal.

ISR and WO for application No. PCT/US2011/060187 mailed Mar. 7, 2012.

Search Report and Written Opinion for International application No. PCT/US2013/022219 mailed Jul. 15, 2013.

* cited by examiner

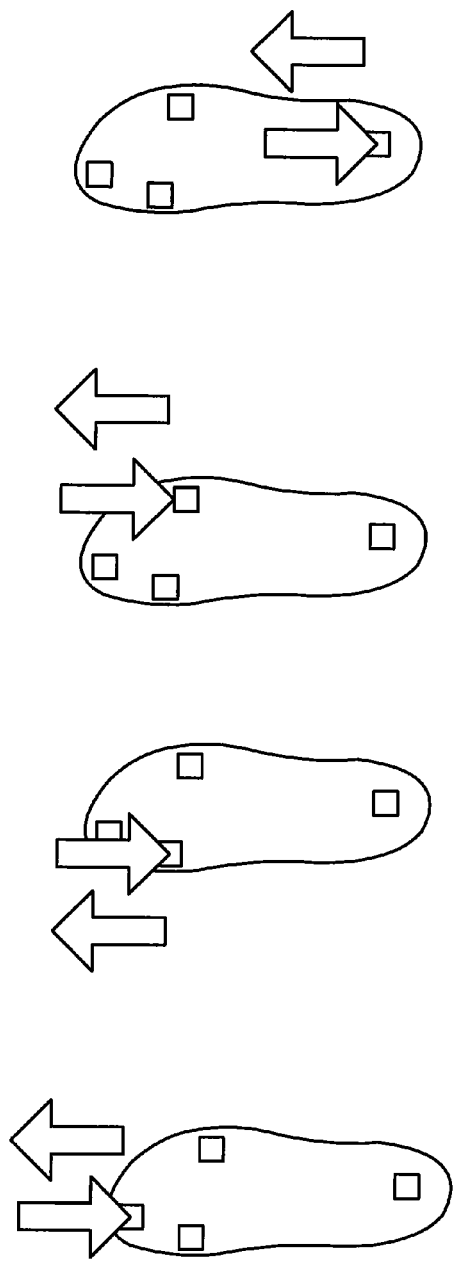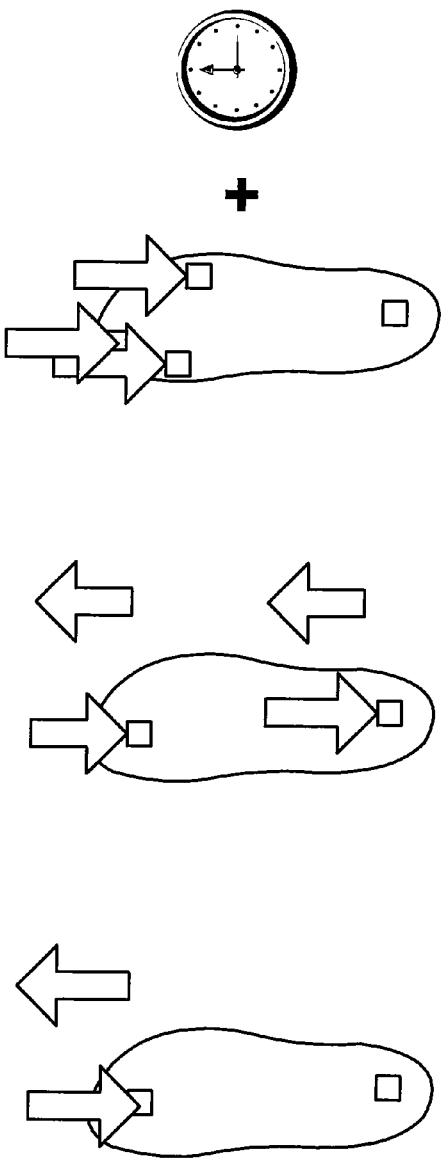

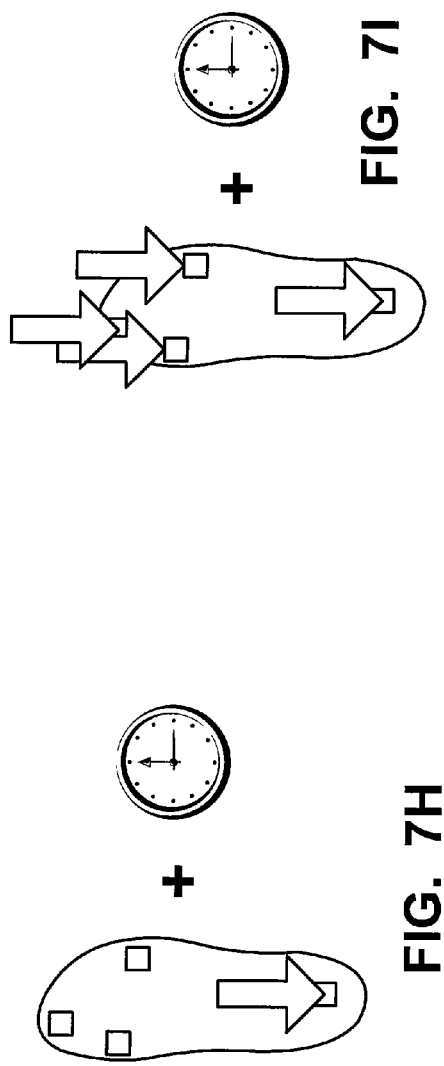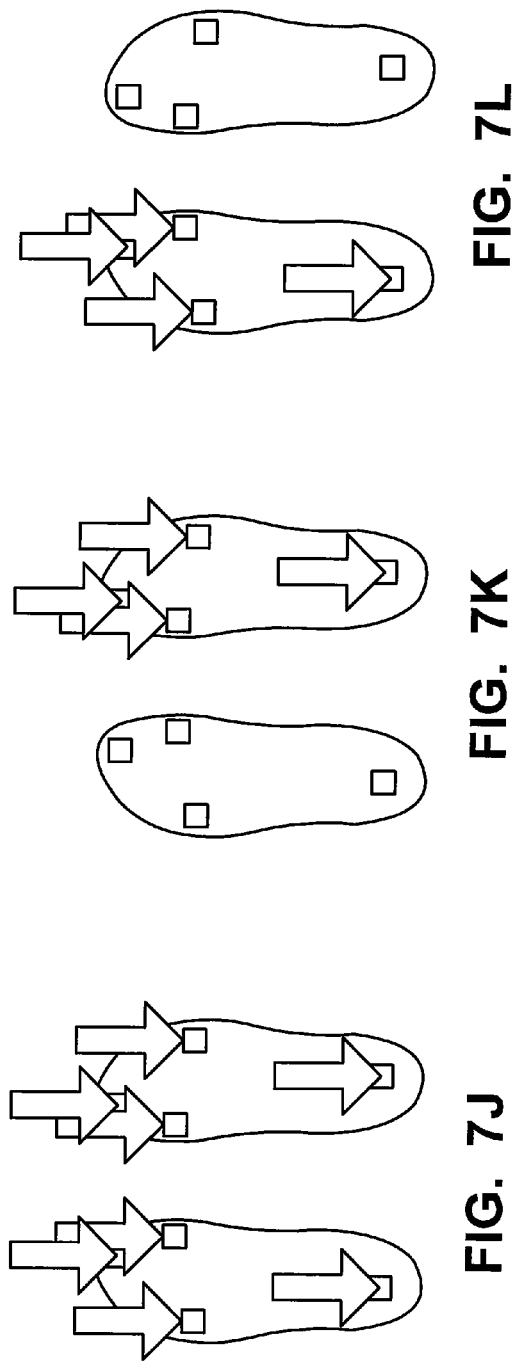

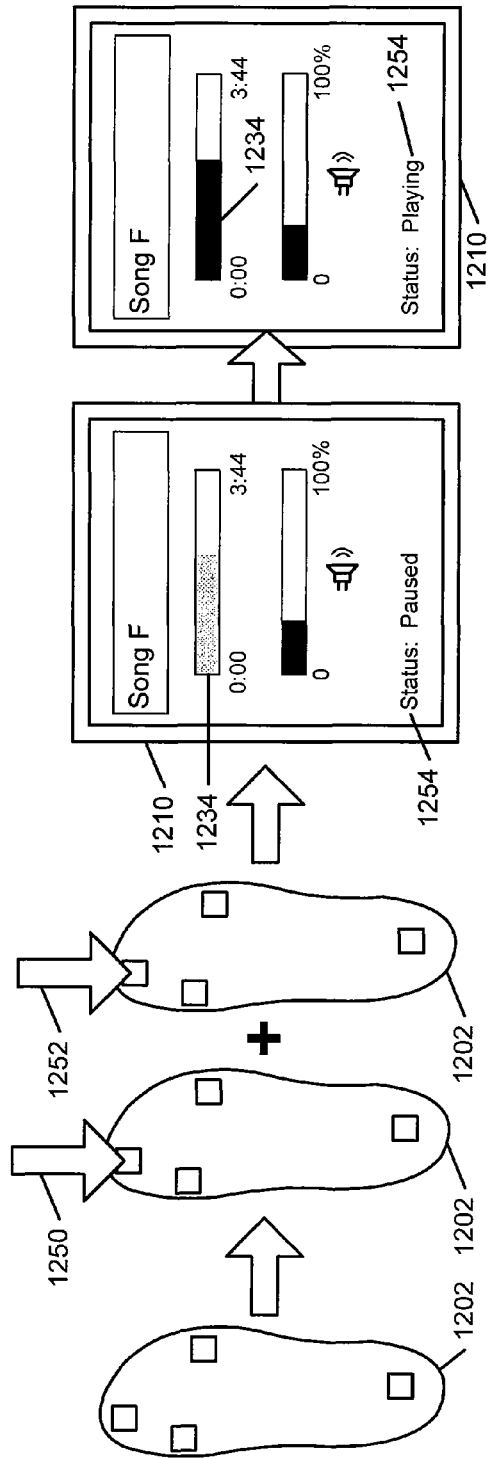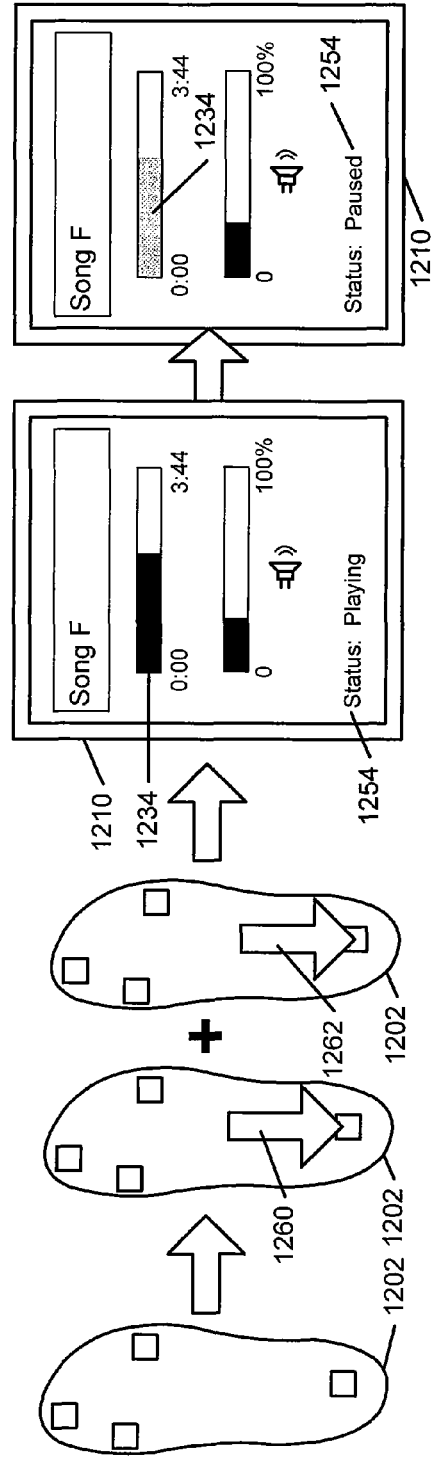

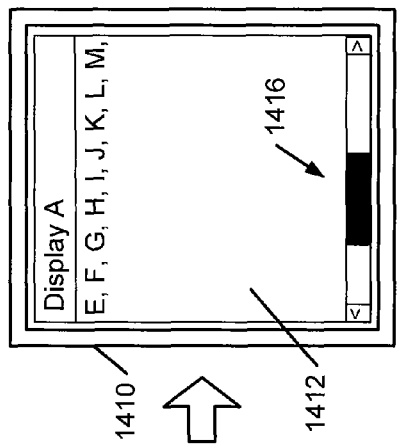
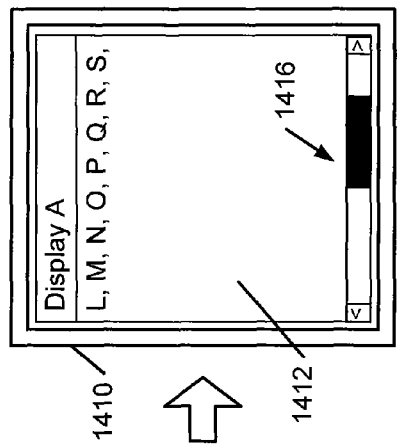
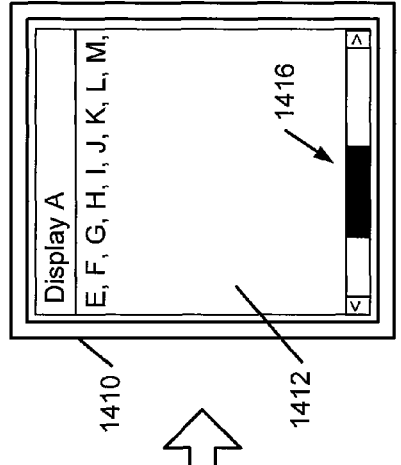
FIG. 14C
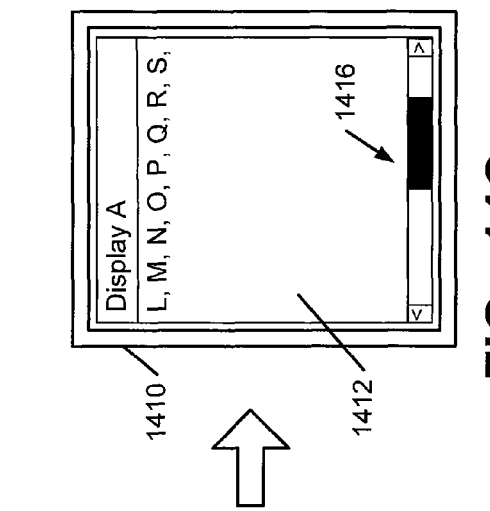
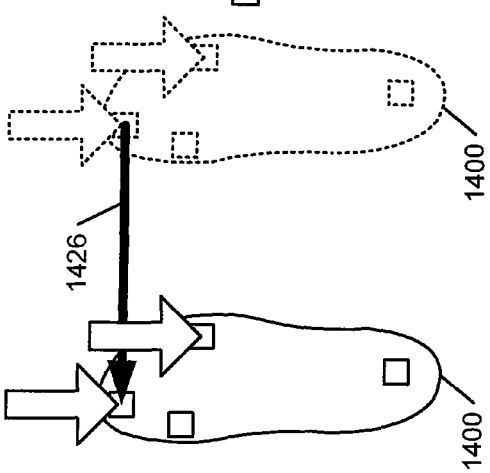
FIG. 14D
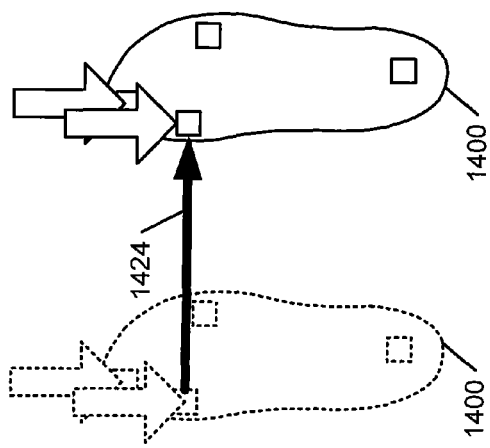

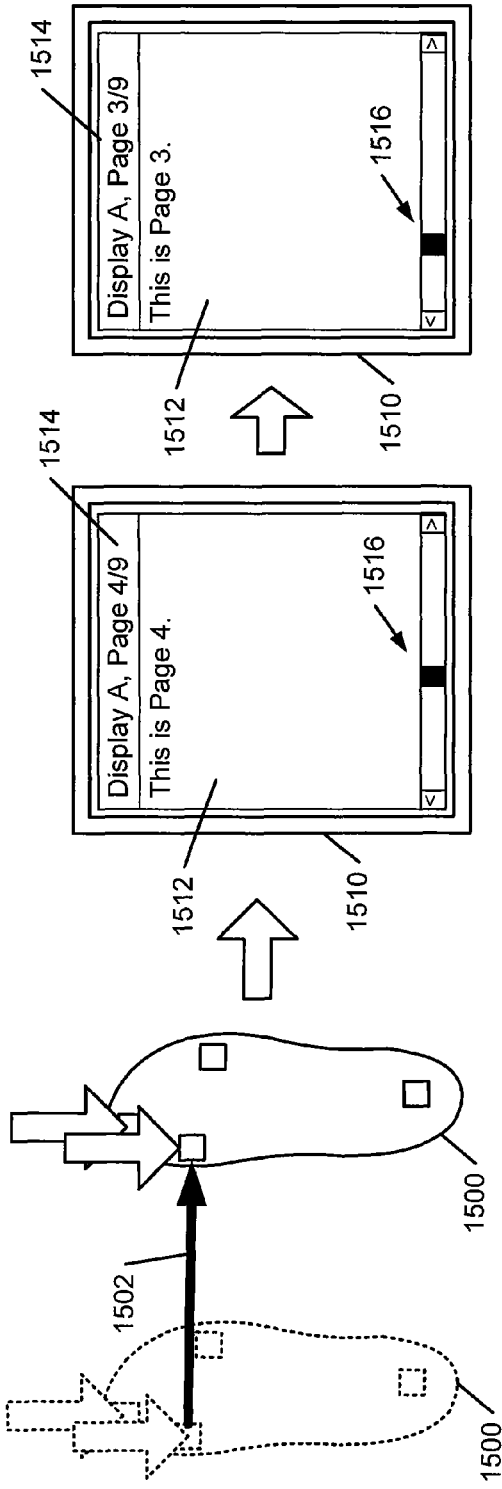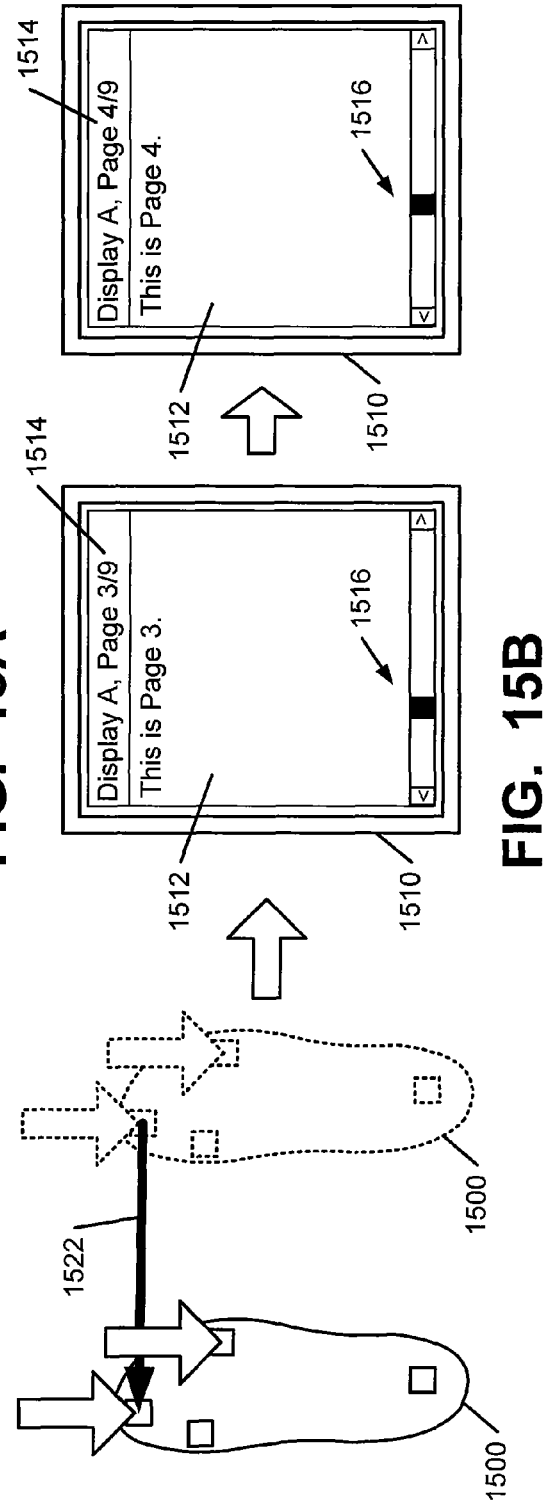
FIG. 15A
FIG. 15B

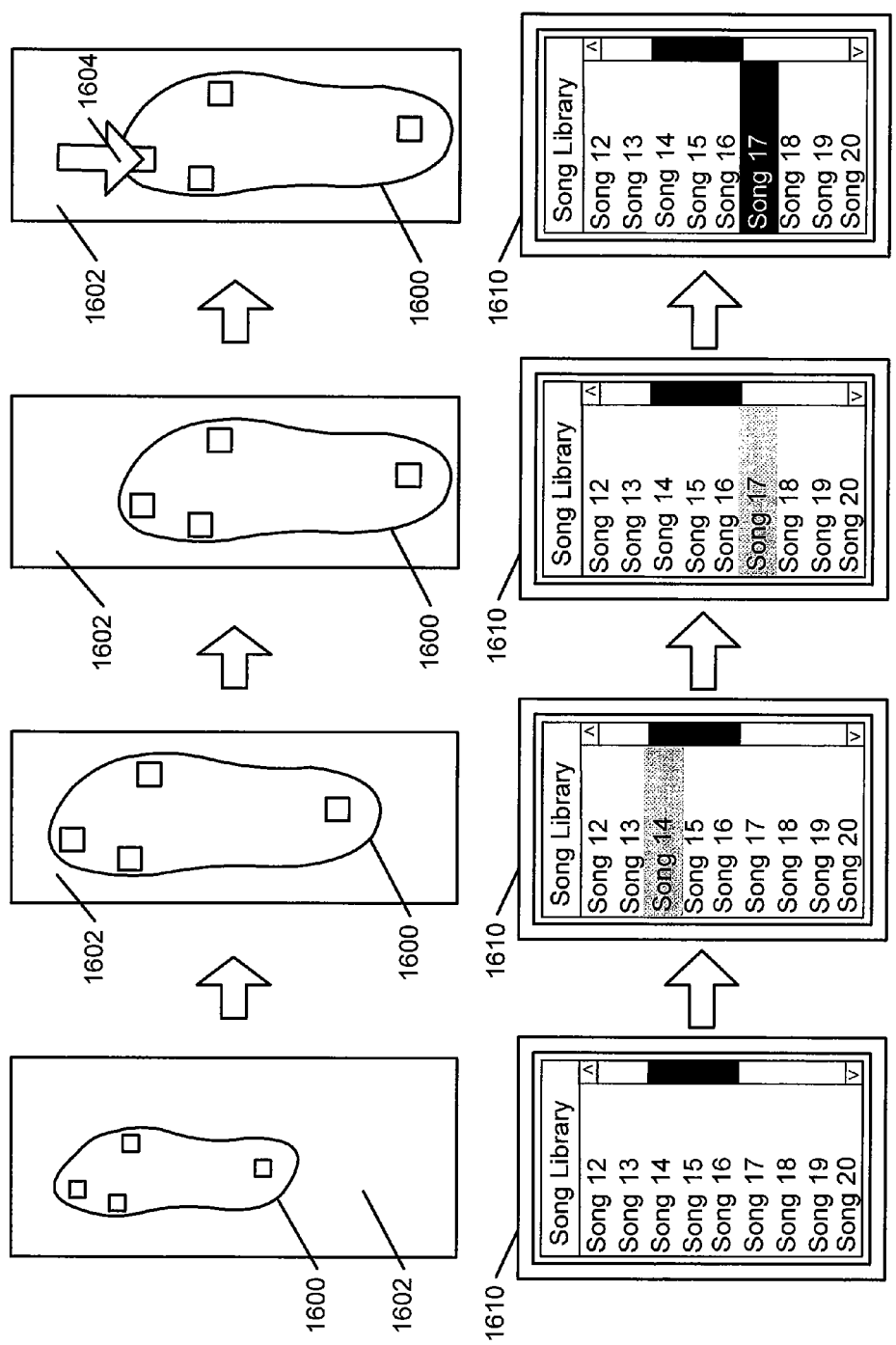

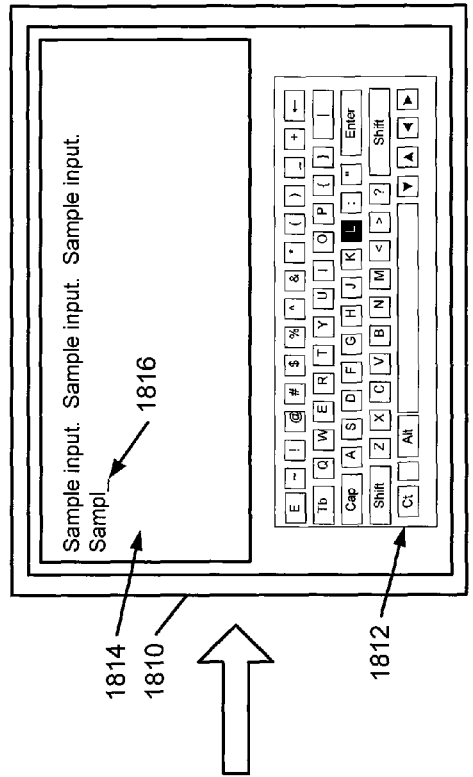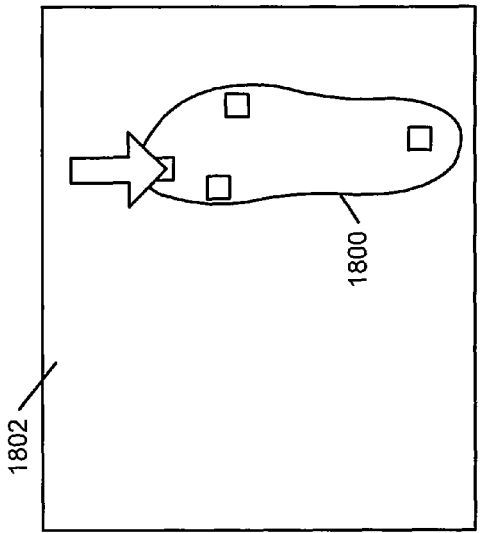
FIG. 18A
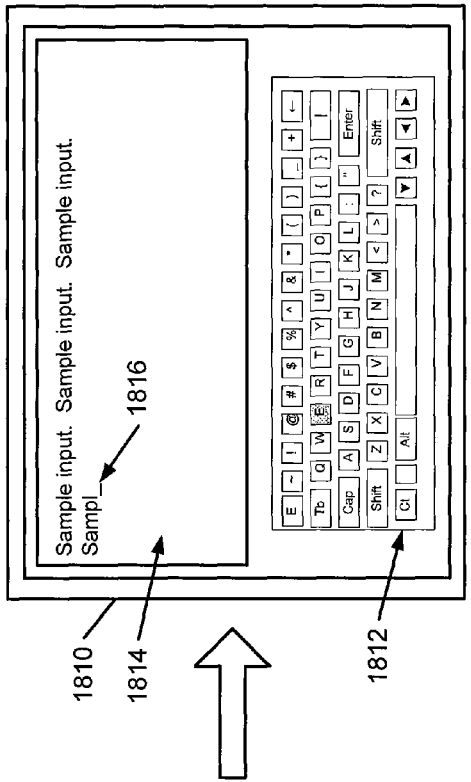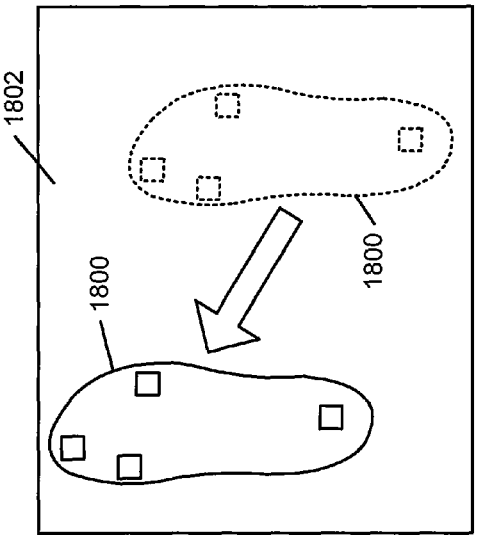
FIG. 18B

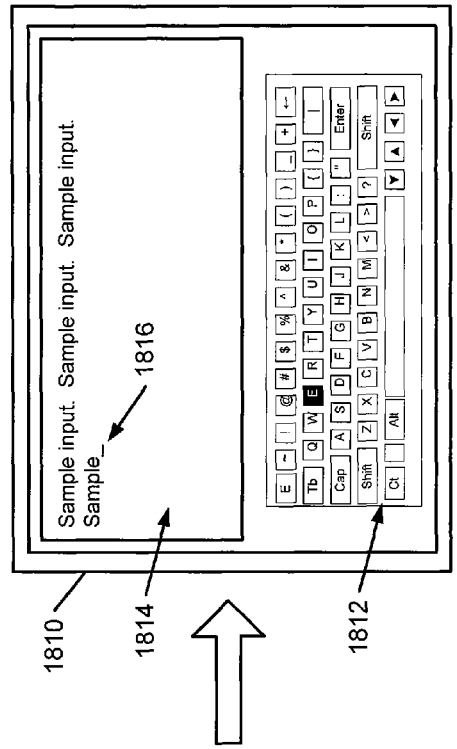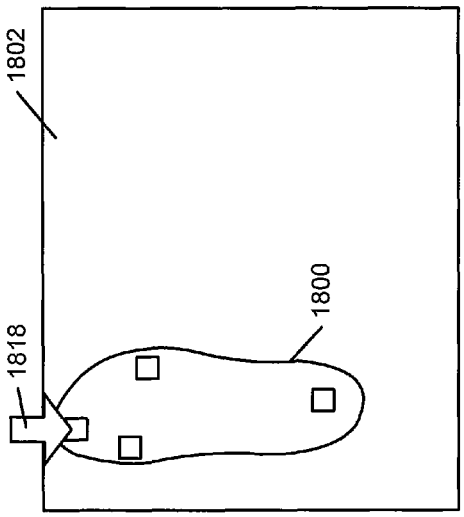
FIG. 18C
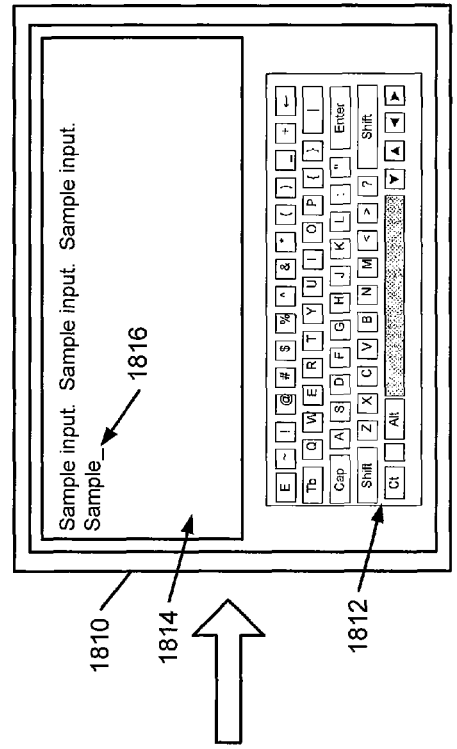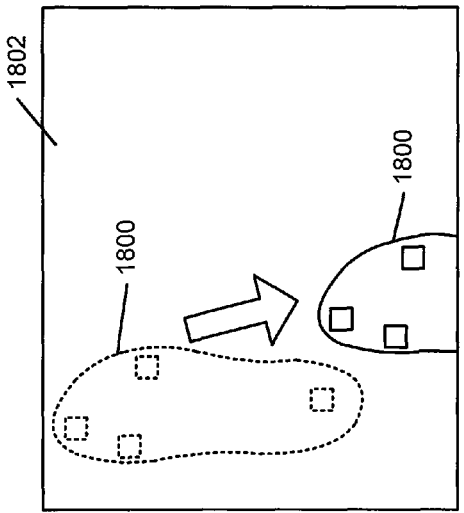
FIG. 18D

FOOT GESTURES FOR COMPUTER INPUT AND INTERFACE CONTROL

RELATED APPLICATION DATA

This application is a continuation-in-part application and claims priority benefits based the following U.S. patent applications:
- (a) U.S. patent application Ser. No. 12/483,824 filed Jun. 12, 2009, entitled "Footwear Having Sensor System," in the names of Allan M. Schrock, Matthew A. Nurse, Jeffrey C. Pisciotta, and Andrew Owings;
- (b) U.S. patent application Ser. No. 12/483,828 filed Jun. 12, 2009, entitled "Footwear Having Sensor System," in the names of Allan M. Schrock, Matthew A. Nurse, Jeffrey C. Pisciotta, Michael S. Amos, Andrew Owings, and James C. Meschter;
- (c) U.S. Provisional Patent Appln. No. 61/138,048 filed Dec. 16, 2008, entitled "Foot Gestures for Computer Input and Interface Control," in the names of Matthew A. Nurse, James C. Meschter, Jeffery C. Pisciotta, Allan M. Schrock, and William F. Rauchholz (now expired); and
- (d) U.S. Provisional Patent Appln. No. 61/061,427 filed Jun. 13, 2008, entitled "Footwear Having Sensor System and Universal Communication Port," in the names of Allan M. Schrock, Matthew A. Nurse, and Jeffrey C. Pisciotta (now expired).

Each of these earlier filed patent applications is entirely incorporated herein by reference.

FIELD OF THE INVENTION

The present invention relates to systems and methods for providing input to and controlling computer generated user interfaces, such as graphical user interfaces ("GUIs"), using input data generated by the action of one or more feet. The user interface may be a non-video game user interface and/or the foot action input does more than provide movement input for a character or other object in a video game. Rather, in accordance with examples of this invention, the foot action provides data for controlling the user interface and for providing other input or data to the computer system.

BACKGROUND

Computer systems have become ubiquitous in modern society. Computer systems play a role in virtually all aspects of modern human life. Some computer systems are relatively small and portable, such as cellular telephones or other communication devices, personal digital assistances, portable audio and/or video player devices, palm top computers, laptop computers, and the like. Other computer systems are very large including components that can take up a substantial amount of space, such as desktop computers, automatic teller machines, other electronic kiosks, etc.

To operate, computer systems typically include interfaces or other input systems that accept user input and allow a user to interact with the computer. Many types of computer input systems are known and used in the art, such as keyboards; mouses; tracking balls; roller balls; touch pads; touch screens; stylus input devices; hard buttons; joy sticks; game controllers; input ports for telephone Ethernet, USB devices, and the like; computer disk drives; thumb drive readers; and the like. Additionally, computer input may be provided, in at least some computer systems, by voice commands.

While modern computer systems are flexible and user friendly, additional ways of inputting data may be beneficial. For example, in many instances a person's hands may be occupied or incapable of performing the necessary functions to interact with the control elements necessary to control the computer system (particularly when the control elements are relatively small). As another example, it may be impractical, impossible, or dangerous for a person to stop using their hands in order to interact with a computer's user interface (e.g., when a person is driving a vehicle, handling hot or heavy objects, injured, etc.). In other situations, a user may be unwilling or unable to interact with a computer system using voice input (e.g., when in a movie theater, library, or other public setting, etc.). Additional ways of interacting with and providing input to a computer's user interface would be of great value in these and other situations.

SUMMARY OF THE INVENTION

The following presents a general summary of aspects of the present invention in order to provide a basic understanding of the invention and various example features of it. This summary is not intended to limit the scope of the invention in any way, but it simply provides a general overview and context for the more detailed description that follows.

Aspects of this invention relate to systems, methods, and computer-readable media with computer-executable instructions stored thereon for performing methods and/or operating systems including user interfaces that use a human foot as an input device for controlling the interface (e.g., such as a graphical user interface of non-video game computer output). Computer systems in accordance with at least some examples this invention may include: (a) at least one input system including one or more sensing devices for sensing action by one or more feet, wherein the sensed foot action includes at least one of: foot movement, contact force between a foot and a contact surface, and contact between a foot and a contact surface; (b) a data transmission system (e.g., wired, wireless, etc.) for transmitting data relating to the sensed foot action; (c) a processing system for receiving the data transmitted by the data transmission system, wherein the processing system utilizes the data transmitted by the data transmission system, at least in part, to provide control data based, at least in part, on the sensed foot action; and (d) an output device for producing a non-video game computer output based, at least in part, on data provided by the processing system, wherein the control data relating to the sensed foot action is used, at least in part, for controlling a user interface associated with the computer output.

Additional aspects of this invention relate to methods of using sensed foot actions to control non-video game computer user interfaces (e.g., such as graphical user interfaces). Yet additional aspects of this invention relate to computer readable media including computer executable instructions stored thereon for performing methods of controlling computer generated user interfaces based on foot motion input data. Still additional aspects of this invention relate to the user interfaces that receive and/or are at least partially controlled by foot generated input data, as well as to the generation and/or control of such interfaces.

BRIEF DESCRIPTION OF THE DRAWINGS

The present invention is illustrated by way of example and not limited in the accompanying figures, in which like reference numerals indicate the same or similar elements throughout, and in which:

FIGS. 7A through 7L illustrate various example foot action gestures that may be recognized and used for providing input to computer systems and methods in accordance with examples of this invention;

FIGS. 12A through 20 illustrate various examples of the effect of recognition and use of foot action input on user interfaces in computer systems and methods in accordance with examples of this invention.

Figure 1A:
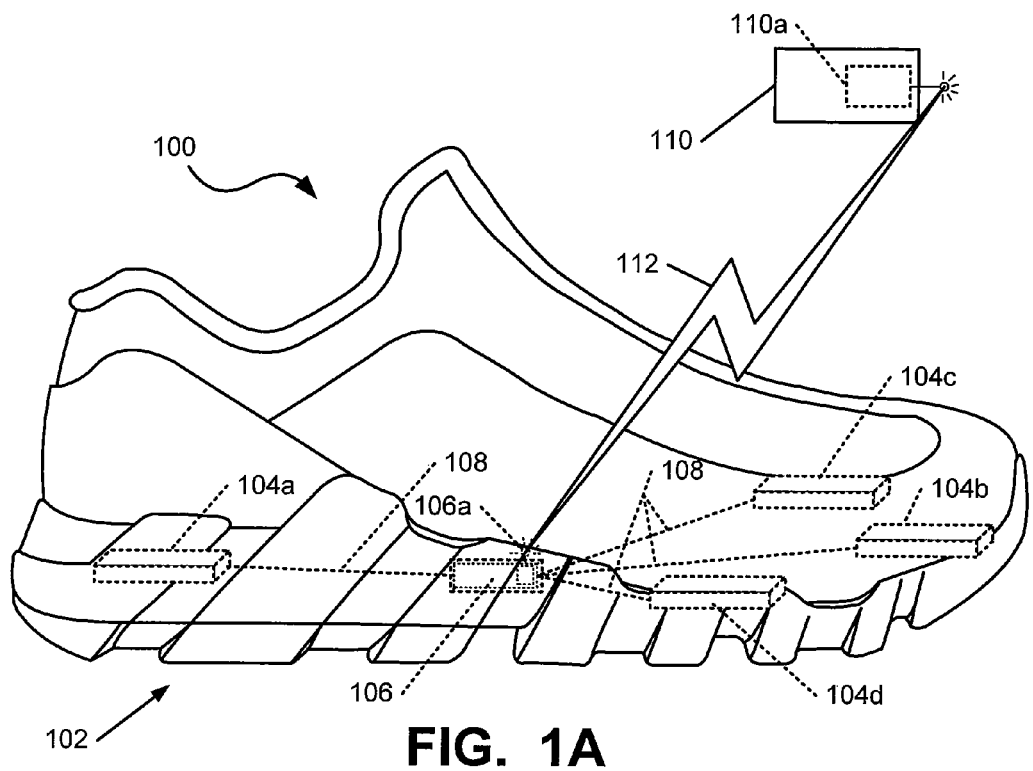
FIGS. 1A and 1B illustrate example features of an article of footwear including one or more sensing devices and/or transmission devices that may be used in systems and methods in accordance with examples of this invention.

The reader is advised that the various parts shown in these drawings are not necessarily drawn to scale.

DETAILED DESCRIPTION

The following description and the accompanying figures disclose features of systems, methods, computer-readable media, and user interfaces in accordance with examples of the present invention.

I. General Description of Foot Action Controlled Systems, Methods, Computer-Readable Media, and User Interfaces in Accordance with this Invention Aspects of this invention relate to systems, methods, and computer-readable media with computer-executable instructions stored thereon for performing methods and/or operating user interfaces that use a human foot as an input device for controlling the interface (e.g., graphical user interfaces of non-video game computer output). Computer systems in accordance with at least some examples this invention may include: (a) an input system including a first sensing device for sensing foot action, wherein the sensed foot action includes at least one of: foot movement, contact force between a foot and a contact surface, and contact between a foot and a contact surface; (b) a data transmission system (e.g., wired, wireless, etc.) for transmitting data relating to the sensed foot action; (c) a processing system for receiving the data transmitted by the data transmission system, wherein the processing system utilizes the data transmitted by the data transmission system to provide control data based, at least in part, on the sensed foot action; and (d) an output device for producing a non-video game computer output based on data provided by the processing system, wherein the control data relating to the sensed foot action is used, at least in part, for controlling a user interface associated with the computer output. Optionally, if desired, a second input system (or even more input systems) may be provided (including at least a second sensing system) for sensing action of a second foot (or additional feet), such as second foot movement, second foot contact with a surface, and/or second foot contact force. The output device may include, for example, a computer monitor, an audio and/or video output device, and other devices that display information or include a user interface, such as alphanumeric output devices (e.g., pagers, beepers, etc.), textual display output devices, and graphical output display devices, etc.

Systems in accordance with this invention may be embodied in or used in conjunction with any desired type of end user device, including, for example, portable audio and/or video players, cellular telephones, personal digital assistants, pagers, beepers, palm top computers, laptop computers, desktop computers, vehicle dashboard displays, portable navigation systems, and any type of computer controlled device that generates or displays a human perceptible output and/or interface. Some more specific examples of computer systems, programs, and/or applications having user interfaces controllable, at least in part, by control data relating to sensed foot action include, but are not limited to, user interfaces (e.g., graphical user interfaces) associated with: audio playback devices (portable or non-portable); video playback devices (portable or non-portable), including audio/video playback devices; word processing programs; web browser programs; interactive map display (and manipulation) programs; global positioning satellite navigation systems; desktop publishing programs; on-line shopping programs; electronic drawing or painting programs; electronic spreadsheet programs; email programs (e.g., for transmitting, receiving, and/or storing email); document management systems; digital cameras; photo storage and/or editing programs; finance management systems (e.g., including on-line stock trading programs, retirement account management programs, etc.); calculators; telephones (e.g., desktop, wall-mounted, portable, wireless, and/or cellular telephones); on-line banking systems; text messaging devices; scheduling or calendar programs; and automatic teller machines ("ATMs").

In some examples of this invention, the input system(s), including their various sensing devices, may be engaged with or formed as part of an article of footwear. If desired, one input system for controlling a user interface may be associated with one shoe of a pair, and a second input system for controlling the interface may be associated with a second shoe of the pair. The data transmission system(s) for the input systems also may be engaged with or formed as part of one or more articles of footwear.

In other example systems and methods according to this invention, however, the input system(s) may be included as part of one or more non-footwear based contact surfaces. One or more sensing devices (for sensing foot action) may be provided on each of the one or more non-footwear based contact surfaces. In some more specific examples, the input system and/or the foot action sensing devices may be engaged with or included as part of wheelchair foot pads (e.g., to allow user interface control by a person using a wheelchair) or in other vehicles.

A wide variety of foot actions or gestures may be detected and used to control a user interface without departing from this invention. In addition to simply detecting overall foot actions or motions, systems and methods in accordance with at least some examples of this invention may associate actions with particular parts of a user's foot. Additionally, systems and methods in accordance with at least some examples of this invention may detect other features or characteristics of sensed foot action, including features or characteristics of sensed foot action by one foot, by two feet, or potentially, by even more feet. As some more specific examples, the sensed foot action may include sensing one or more of: a foot tap motion, a foot double tap motion, a foot press-and-hold action, a heel tap motion, a toe tap motion, a lateral foot side tap motion, a medial foot side tap motion, a heel double tap motion, a toe double tap motion, a lateral foot side double tap motion, a medial foot side double tap motion, a heel press-and-hold action, a toe press-and-hold action, a lateral foot side press-and-hold action, a medial foot side press-and-hold action, a tap force, a press-and-hold press force, foot motion while in contact with a contact surface, heel motion while in contact with a contact surface, toe motion while in contact with a contact surface, lateral foot side motion while in contact with a contact surface, medial foot side motion while in contact with a contact surface, toe contact force, heel contact force, lateral foot side contact force, medial foot side contact force, a foot shaking motion, a direction of foot motion, a foot motion speed, a change in foot motion direction, a change in foot motion speed, a change in foot press force, a change in location of foot contact or press force, relative motion of two feet, relative motion direction of two feet, force differential between contact force of two feet, force differential between contact force of two consecutive foot contacts, and a foot hover action. The various foot "tap motions" and other "motions" described above may be detected as a result of foot contact with a surface, or they may be detected without the need of direct foot/surface contact (e.g., using optical, infrared, or other image detecting, using accelerometers or other motion detectors, etc.). The various foot motions described above also may be detected without the requirement that the foot contact a surface.

The sensed foot actions (e.g., taps, motions, contacts, hovers, or other gestures) may be used by computer systems for controlling the user interface in any desired manner without departing from this invention. As some more specific examples, the data relating to the sensed foot action may used to provide control data for controlling the user interface to perform at least one of the actions selected from the group consisting of: an item select action; a cursor positioning action; a highlight action; a switching action between open application programs; a switching action between operating modes within a single application program; launching a new application or program; volume up; volume down; channel up; channel down; zoom in; zoom out; changing a view on a display device by scrolling upward; changing a view on a display device by scrolling downward; changing a view on a display device by scrolling leftward; changing a view on a display device by scrolling rightward; page up; page down; moving around on content displayed on a display device; activating a text input panel; moving locations on a listing of items; incrementing a counter; skipping a currently playing item; replaying a currently playing item from its beginning; chapter up; chapter down; activating fast forward of audio or video replay; activating rewind of audio or video replay; activating play of audio or video; pausing playback of audio or video; moving to a checkout sequence; advancing to a top of a list or to a beginning of a display; moving to a bottom of a list or to an end of a display; draw a line or curve; exiting an application program; closing an individual document or other window element; changing font properties; changing line properties; changing paragraph properties; changing margins or dimensions of displays or portions thereof; changing window sizes; operating virtual switches, knobs, sliders, handles, doors, drawers, buttons, ON/OFF switches, and radio buttons; selecting or changing ringtones; initiating a telephone call; ending a telephone call; dialing a telephone call; initiating a conference call; and dropping one or more parties from a conference call.

More specific examples of particular actions and their potential detection, recognition, and use for controlling user interfaces will be described in more detail below.

Additional aspects of this invention relate to methods of using sensed foot actions of the types described above to control non-video game computer user interfaces (e.g., of the types described above). Such methods may include one or more of: (a) sensing a foot action that includes at least one of: foot movement, contact force between a foot and a contact surface, and contact between a foot and a contact surface; (b) transmitting the sensed foot action to a processing system; (c) receiving input data indicating the sensed foot action, wherein the sensed foot action includes at least one of: foot movement, contact force between a foot and a contact surface, and contact between a foot and a contact surface; (d) processing the data indicating the sensed foot action to provide control data based, at least in part, on the sensed foot action; (e) generating output data for controlling a non-video game computer user interface displayed by an output device, wherein the output data includes the control data; (f) outputting the output data to an output device; and (g) controlling a non-video game computer user interface, at least in part, using the control data relating to the sensed foot action. The processing further may include recognizing a foot gesture from the input data, and wherein the control data is generated based, at least in part, on the recognized foot gesture. Data may be sensed and received as input from one, two, or more feet.

Methods according to examples of this invention may detect any desired types of foot actions and/or control any desired types of user interfaces and/or generate any desired type of output responses in the interfaces, including detecting the various types of foot actions to control the various types of systems, programs, and applications, and taking the various types of actions described above.

Still additional aspects of this invention relate to computer readable media including computer executable instructions stored thereon for performing the various methods described above (and described in more detail below). Such computer readable media include, but are not necessarily limited to: computer readable and/or writable memories, both internal to a computer (e.g., hard drives) or separable from the computer (such as disks, solid state or flash memory devices, etc.). Still additional aspects of this invention relate to the user interfaces and their control in the various manners described above.

Given the general description of various example features and aspects of the invention provided above, more detailed descriptions of various specific examples of foot action controlled systems, methods, computer-readable media, and user interfaces according to the invention are provided below.

II. Detailed Description of Specific Examples of Foot Action Controlled Systems, Methods, Computer-Readable Media, and User Interfaces According to the Invention The following discussion and accompanying figures describe various example systems, methods, computer-readable media, and user interfaces in accordance with the present invention in which input generated based on detection of foot actions are used, at least in part, to control a non-computer game related user interface. When the same reference number appears in more than one drawing, that reference number is used consistently in this specification and the drawings to refer to the same or similar parts throughout.

A. Example Hardware Systems

As described above, aspects of this invention relate to the use of foot action, such as foot movement, foot contact with a surface, and/or foot contact force, for providing input to a user interface (e.g., a graphical user interface), e.g., for operating a non-computer game type computer program. In other words, in systems and methods in accordance with at least some examples of this invention, the user's feet provide non-video game type input to the computer and may be used to control the operating system and/or the computer interface. The feet may be used, as least in part, to actually operate and control the interface, not simply to show movement of a player or other object within a video game environment.

In order to operate an interface using foot action, the action of the foot must be monitored or sensed in some manner. This action may be captured in any desired manner without departing from this invention, for example, through the use of video or camera type sensors, through the use of infrared or ultrasonic radiation sensors, or the like. In other example systems and methods according to this invention, an article of footwear (and perhaps both shoes of a pair) will include or will be engaged with one or more sensors that are capable of, in some manner, sensing foot action. More specific examples of such structures will be described in more detail below.

Figure 1B:
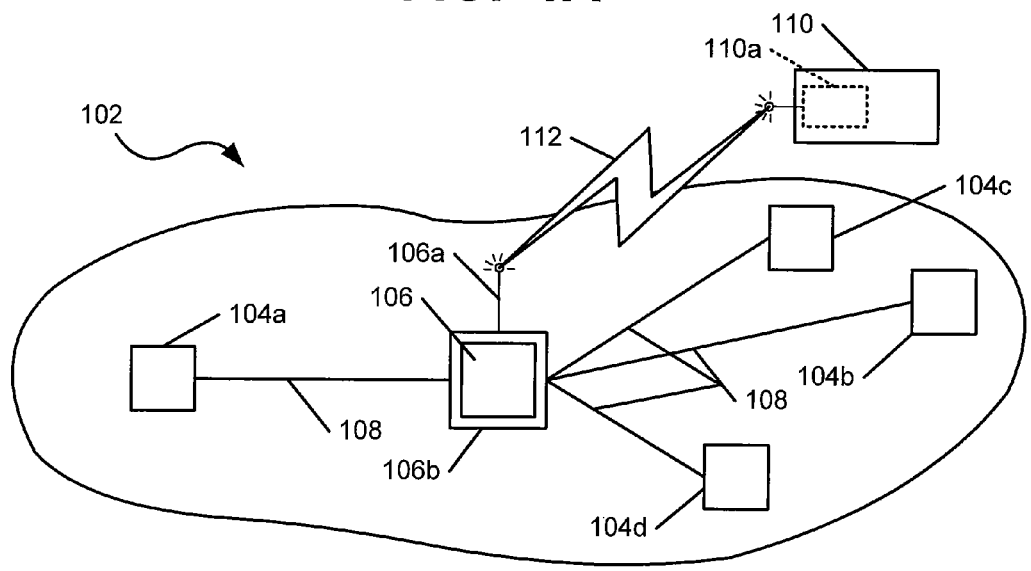

FIGS. 1A and 1B illustrate an article of footwear 100 that includes a sensor system incorporated into the sole 102 of the shoe. While any desired number of sensors may be utilized, in this illustrated example structure, the article of footwear 100 includes four sensors 104a through 104d. One sensor 104a is located in the heel area, and three sensors are located in the forefoot region. More specifically, one sensor 104b is provided at a forward toe location, one sensor 104c is provided at the medial (inside) metatarsal location, and a third sensor 104d is provided at the lateral (outside) metatarsal location. The sensors 104a through 104d of this example structure 100 transmit their output to a central processing station 106 (e.g., via electrical conductors 108 incorporated into the sole structure 102), and the processing station 106 transmits output (optionally after further processing at station 106) to a remote device 110 (such as a computer operating a user interface to be controlled, at least in part, via the foot action input). Any desired connection 112 between the central processing station 106 and the remote device 110 may be used without departing from this invention, including, for example, wired or wireless connections (e.g., wireless transceivers 106a and 110a and a wireless connection 112 are provided as examples in FIGS. 1A and 1B).

Any number of sensors may be provided in an article of footwear 100 for use as an input device without departing from this invention, in any desired location(s) with respect to the footprint. For example, a single sensor may be provided, e.g., simply to determine whether or not foot action (such as foot contact with a surface or foot motion) has occurred. More sophisticated sensors and networks of sensors also may be provided. For example, as illustrated in FIGS. 1A and 1B, the sensors may be provided at multiple locations around the article of footwear 100, so that the location of foot contact or other characteristics of the foot action may be more readily determined (and optionally, if desired, the contact force, foot motion velocity, foot motion direction, or other features of the foot action may be determined). As additional examples, the sensors may be relatively simple switch type sensors (that simply determine whether or not foot contact has occurred), or they may be more sophisticated sensor packages, such as sensor packages including one or more of an accelerometer, a gyroscope sensor, a piezoelectric sensor, an ultrasound sensor, a proximity detector, etc. Moreover, any of the sensor and conductor arrangements described in U.S. Provisional Patent Appln. No. 61/061,427 filed Jun. 13, 2008 may be used without departing from this invention.

The processing station 106 may be located at any desired location without departing from this invention, including both on board the article of footwear 100 or somewhere remote from it (e.g., if the sensors 104a through 104d have wireless data transmission capabilities, then the processing station 106 may be located remote from the article of footwear, including as part of the computer system 110). In some example structures according to this invention, the processing station 106 may be located within the sole structure 102 of an article of footwear, such as in the heel or in the arch of an article of footwear. Optionally, the processing station 106 may be at the location where a housing 106b for a sensor chip is currently provided in footwear structures that utilize the "NIKE+™" athletic performance monitoring system, available from NIKE Inc., of Beaverton, Oreg. (e.g., within the footwear front heel or arch areas, below the insole and within the midsole structure). The processing system 106 may simply act as a conduit for the information transmitted by one or more of the sensors 104a through 104d, or it may collect incoming data from these sensors 104a through 104d and further process it before sending it on to the remote device 110.

Figure 2:
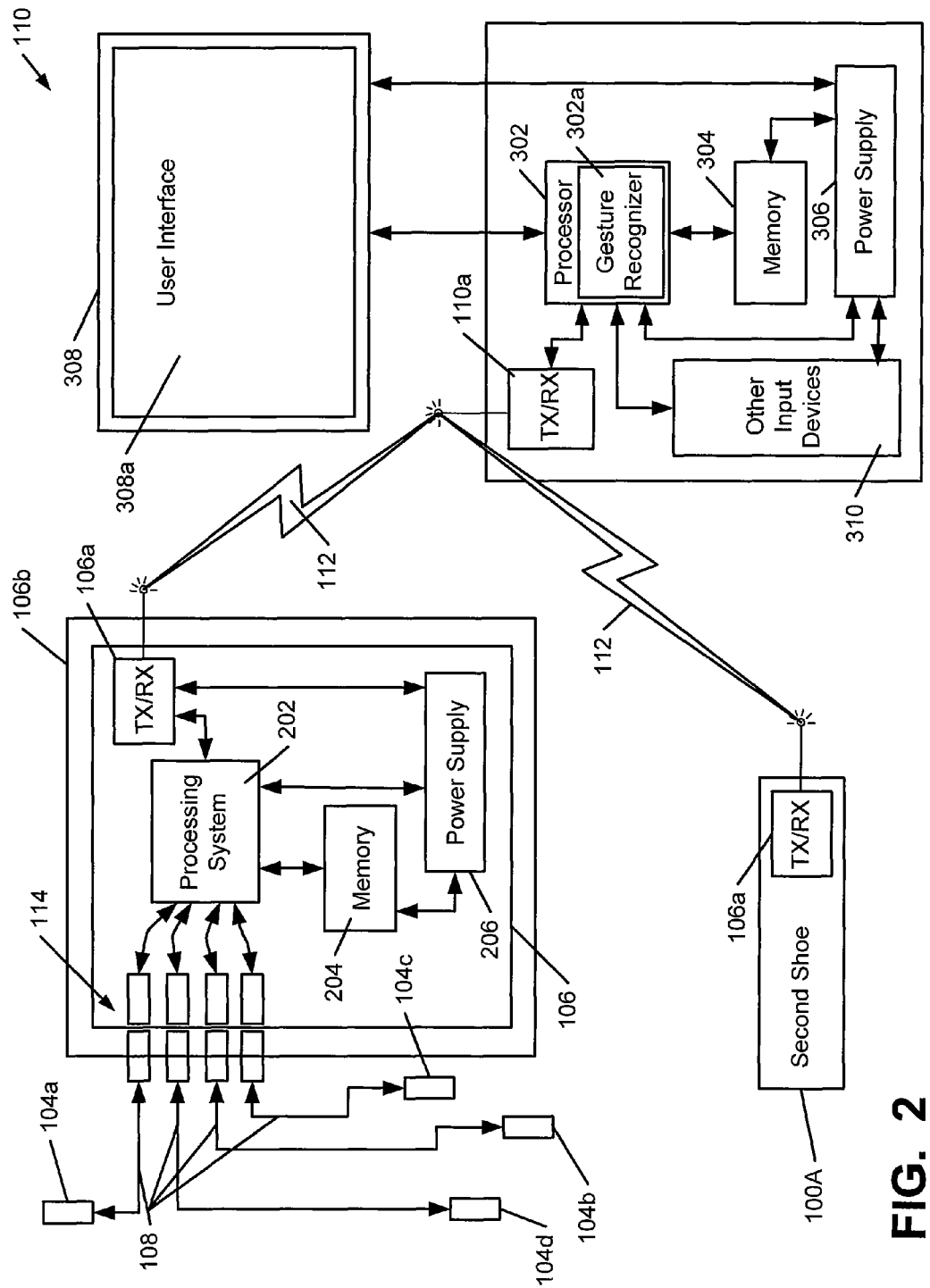
FIG. 2 schematically illustrates an example input system and computer system controlled, at least in part, by foot actions in accordance with this invention.

FIG. 2 provides a schematic block diagram of a complete user interface control system in accordance with at least some examples of this invention. The upper left hand portion of FIG. 2 illustrates the structures on board an article of footwear, such as the article of footwear 100 illustrated in FIGS. 1A and 1B. As shown in this figure, the sensors 104a through 104d are connected to the housing 106a through conductors 108. Connection pads or wires 114 (e.g., akin to electrical connectors between a portable electronic device and its power supply) transmit the sensed data from the sensors 104a through 104d into the electronics of the processing station 106. The processing station 106 may include various electronic elements, such as one or more microprocessors 202, a memory 204, and a power supply 206 (e.g., a rechargeable battery). After any desired processing by the processing system 202 or other action, the transceiver 106a wirelessly transmits the sensed foot action data from the article of footwear 100 to a transceiver 110a provided with a remote device 110 (which may be a computer whose operating system is to be controlled, at least in part, using the incoming foot action data). The wireless connection is illustrated by connection icon 112 in FIG. 2.

If desired, as illustrated in FIG. 2, a second shoe 100A may include some or all of the sensing and other systems provided on shoe 100, so that both feet of a single user (or so that multiple users) may provide foot action input to the remote device 110. Optionally, any number of users and any number of shoes (or other input devices, examples of which will be described in more detail below) may provide input to control a user interface without departing from this invention. The multiple users may transmit (or otherwise furnish) their input to the same input device (such as transceiver 110a) or to different input devices without departing from this invention.

As noted above, the processing station 106 further may be configured for communication with an external device 110, which may be, for example, portable audio and/or video players, cellular telephones, personal digital assistants, pagers, beepers, palm top computers, laptop computers, desktop computers, vehicle dashboard displays, portable navigation systems, ATMs, and any type of computer controlled device that generates or displays a human perceptible output and/or interface. The example remote device 110 shown in FIG. 2 includes a processor 302 (which may include a "gesture recognition module" 302a), a memory 304, a power supply 306, an output device 308, other user input devices 310, and a data transmission/reception system 110a. The transmission/reception system 110a is configured for communication with the central processing system 106 via the transmission/reception system 106a through any type of known electronic communication, including contacted and contactless communication methods, such as RFID, Bluetooth, infrared transmission, etc.

The output device 308 may constitute any desired type of output device that includes a human perceptible interface and/or that generates output, such as portable audio and/or video players, cellular telephones, personal digital assistants, pagers, beepers, palm top computers, laptop computers, desktop computers, vehicle dashboard displays, GPS navigation systems (portable or vehicle mounted), and the like. Some more specific examples of computer systems, programs, and/or applications having user interfaces controllable, at least in part, by control data relating to sensed foot action include, but are not limited to, user interfaces (e.g., graphical user interfaces) associated with: audio playback devices (portable or non-portable); video playback devices (portable or non-portable), including audio/video playback devices; word processing programs; web browser programs; interactive map display (and manipulation) programs; global positioning satellite navigation systems; desktop publishing programs; on-line shopping programs; electronic drawing or painting programs; electronic spreadsheet programs; email programs (e.g., for transmitting, receiving, and/or storing email); document management systems; digital cameras; photo storage and/or editing programs; finance management systems (e.g., including on-line stock trading programs, retirement account management programs, etc.); calculators; telephones (e.g., desktop, wall-mounted, portable, wireless, and/or cellular telephones); television or other entertainment system remote controls; "on-screen" electronic television guides; on-line banking systems; and automatic teller machines ("ATMs").

Figure 3:
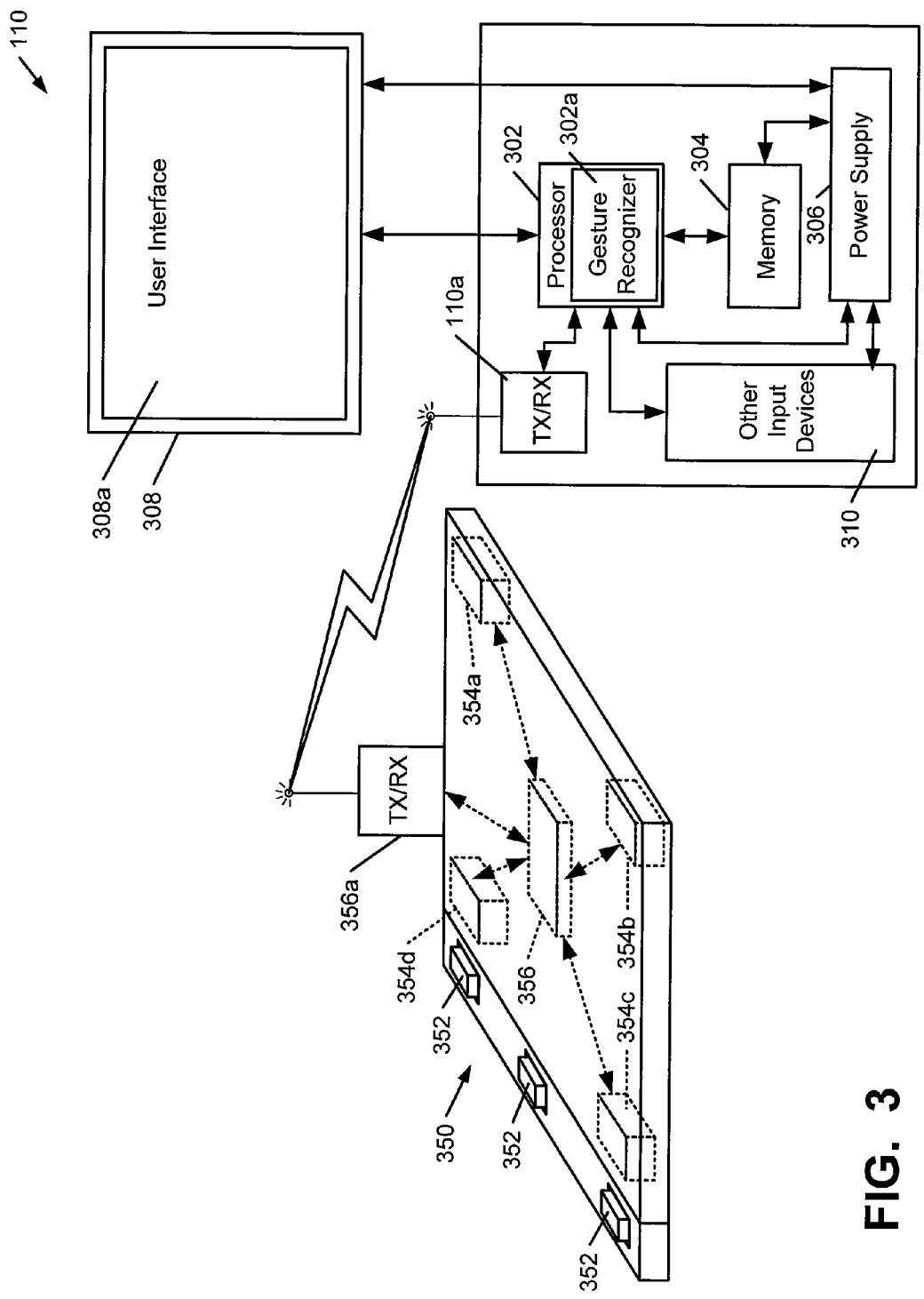
FIG. 3 schematically illustrates an example foot contact pad input system and computer system controlled, at least in part, by foot actions in accordance with this invention.

Some example systems and methods in accordance with this invention do not require specialized electronic shoes for supplying the foot action input for controlling a user interface. Rather, as illustrated in FIG. 3, a user interface 308a of a similar computing device 110 may be control by foot action input transmitted from an electronic foot contact pad 350. As shown in FIG. 3, in this example structure, the corners of the foot contact pad 350 may be equipped with sensors 354a through 354d that sense foot action with respect to the contact pad (e.g., the same types of things that may be sensed via the shoe mounted sensors 104a through 104d, such as a foot contact event, a foot motion event, a foot contact time duration, a foot contact force, foot motion direction, etc.). These sensors 354a through 354d transmit their output to a central processing station 356, which may include (or connect with) a transceiver 356a for transmitting the data as input to the remote computer system 110 (e.g., via transceiver 110a). Any number of sensors 354 and any distribution of the sensors 354 may be provided in the foot contact pad 350 without departing from this invention.

The foot contact pad 350 may have any desired construction and/or arrangement without departing from this invention. As some more specific examples, the foot contact pad 350 may be mounted under a desk, on the floor of a vehicle, by the base of an ATM or other kiosk type computer input system, on the floor of a telephone booth, and the like. In this illustrated example, the foot contact pad 350 further includes one or more "hard" buttons 352, which may be activated by a user's foot. These buttons 352 may provide various different functions, such as an ON/OFF switch, a navigate "back" function (e.g., to return to a previous user interface screen), a navigate "forward" function (e.g., to return to a previous user interface screen), a "return to home" function (e.g., to return to a homepage, a base menu, or other standard location within the interface), a "select" function, etc. Any desired number of hard buttons 352 and/or orientation thereof (including no hard buttons 352) may be provided in systems and methods without departing from this invention.

Figure 4:
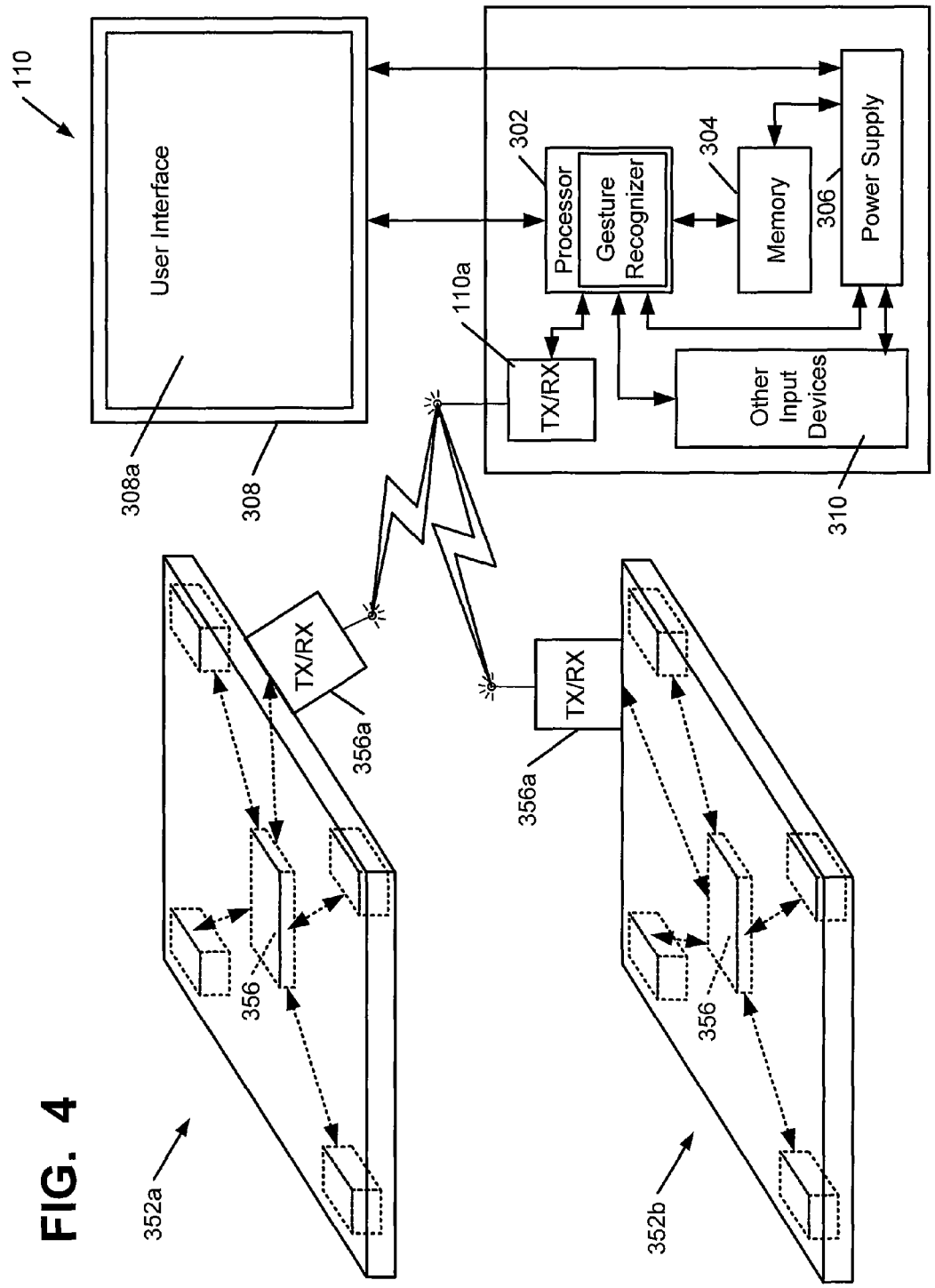
FIG. 4 schematically illustrates another example foot contact pad input system and computer system controlled, at least in part, by foot actions in accordance with this invention.
Figure 5:
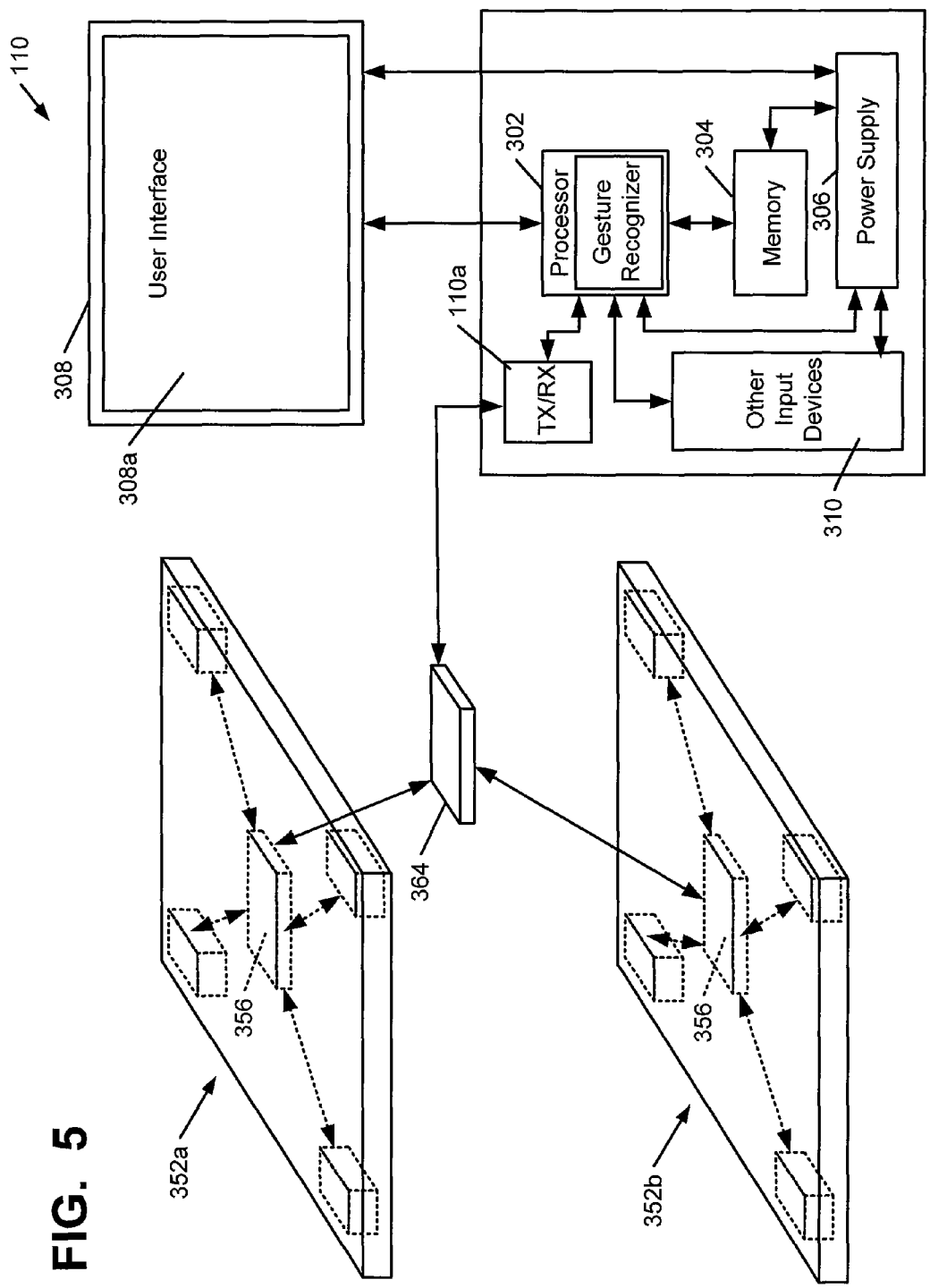
FIG. 5 schematically illustrates another example foot contact pad input system and computer system controlled, at least in part, by foot actions in accordance with this invention.

FIGS. 4 and 5 show foot contact pad type arrangements similar to that shown in FIG. 3, except in these instances multiple contact pads 352a and 352b are arranged to provide input to computer system 110. Such arrangements may be useful, for example, when multiple users provide foot action input to a single computer system 110 (such as audience voting systems and methods, etc.). As another example, such arrangements may be useful in situations where a single user desires to input foot action data using both feet independently. FIG. 4 illustrates independent wireless data transmission arrangements from each foot contact pad 352a and 352b, whereas FIG. 5 illustrates a system in which both contact pads 352a and 352b transmit their data to a common processing station 364, and the data is transmitted from this station 364 to a computing device 110. While a wireless connection is shown in FIG. 4 and a wired connection is shown in FIG. 5, either connection type may be used in either system (or a combination of these connection types may be used in a single system) without departing from this invention. The arrangements of FIGS. 4 and 5 may be particularly suitable for use in wheelchair foot pads to allow persons in wheelchairs to use foot action as input to control computer user interfaces.

Of course, a variety of manners of transmitting foot action data from the sensors (whether on board footwear 100, in a contact pad 352, or at some other location, such as a remote camera stand) to a data processor may be used without departing from this invention. For example, if desired, the central processing systems 106 and/or 356 may be omitted, and the various sensors 104 and 354 could transmit their sensed data directly to the transmission systems 106a and 356a or to the remote device oriented transceiver 110a for further processing on board system 110. As another example, if desired, any necessary processing system may be included directly as part of the sensors 104 and/or 354, rendering central processing and/or transmission systems 106, 354, and/or 356 unnecessary. Other data processing systems, arrangements, and/or configurations are possible without departing from this invention.

Figure 6:
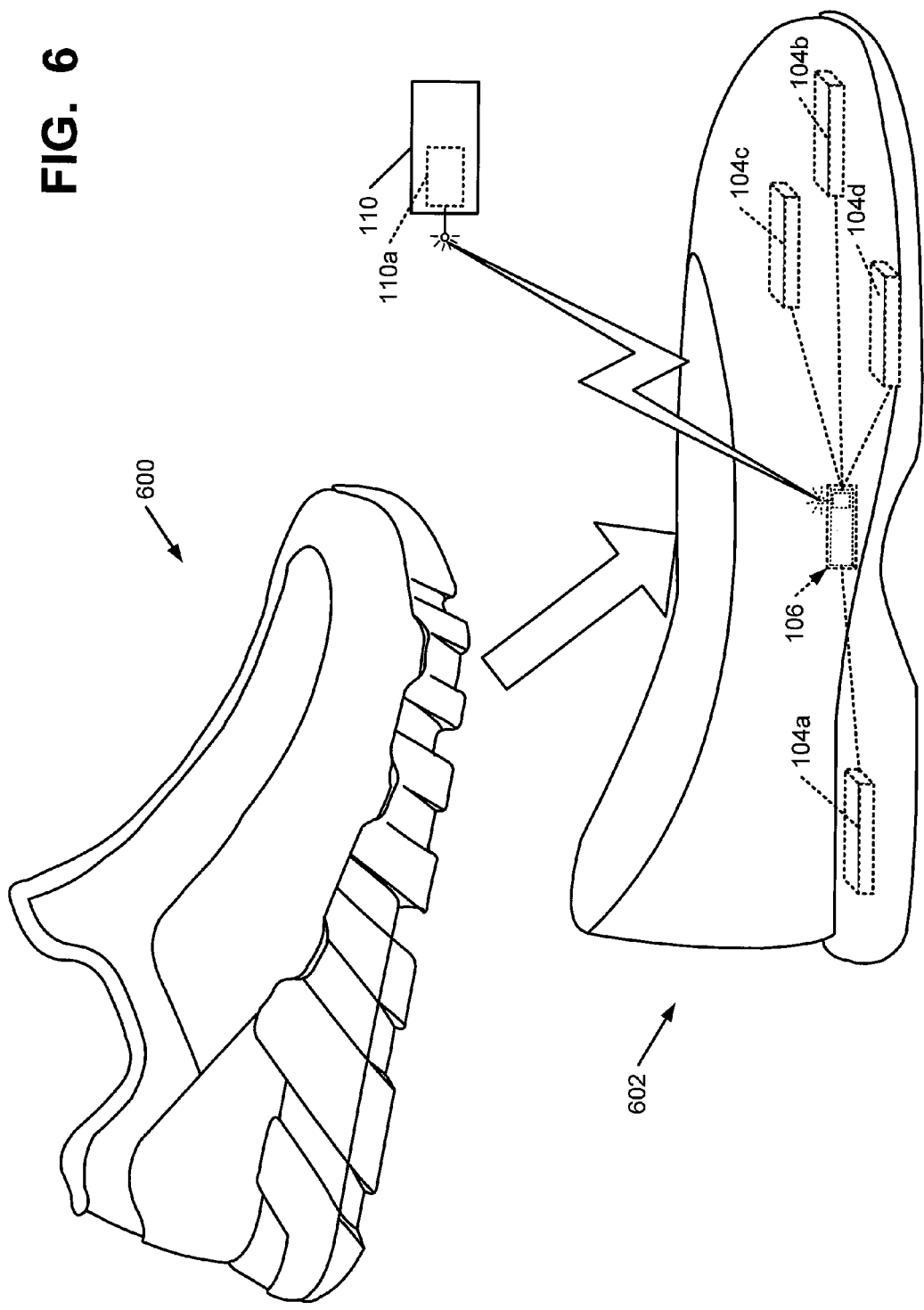
FIG. 6 illustrates an example foot-receiving device that may include sensors and other devices useful for providing foot action input to computer systems and methods in accordance with examples of this invention.

FIG. 6 illustrates another example of hardware that may be useful in at least some examples of systems and methods according to this invention. As shown, in this example arrangement, a user places his or her own conventional article of footwear 600 into a specialized chamber 602 that is equipped with one or more sensors and/or data transmission devices, e.g., as described above in conjunction with FIGS. 1A and 1B. The chamber 602 may be somewhat footwear shaped, as shown in FIG. 6 (e.g., akin to a rubber overshoe), or it may be more in the form of stanchion box chamber into which the foot may be inserted. Such arrangements may be useful, for example, in situations where multiple users will likely interact with a common remote computer system 110. Such an arrangement also may be advantageous, for example, to allow a single user to associate his or her own foot action input system with multiple different pairs of his or her shoes.

B. Example Gestures

Given the description above of examples of hardware systems that may be useful to capture foot action input, more detailed descriptions of certain gestures will be provided in more detail below in conjunction with FIGS. 7A through 11. Those skilled in the art will recognize, however, that systems and methods in accordance with aspects of this invention may recognize more or fewer foot actions as gestures and as user foot action input without departing from this invention. Moreover, one or more foot actions (with one or more feet) may be combined to provide a single gesture recognizable by systems and methods in accordance with this invention.

The first gestures described are relatively simple "tap" gestures. FIG. 7A illustrates a single footed, toe tap gesture (e.g., contacting at sensor location 104b in FIG. 1B); FIG. 7B illustrates a medial (inside) foot tap gesture (e.g., contacting at sensor location 104c in FIG. 1B); FIG. 7C illustrates a lateral (outside) foot tap gesture (e.g., contacting at sensor location 104d in FIG. 1B); and FIG. 7D illustrates a heel tap gesture (e.g., contacting at sensor location 104a in FIG. 1B). In these gestures, the relevant portion(s) of the foot is (are) moved downward to contact a contact surface and then is (are) relatively quickly removed from the contact surface (e.g., contact time less than 1 second, or even less than 0.75 or 0.5 seconds).

If desired, a tap may be recognized simply by an increased application of force to the contact surface at a predetermined area (such as the toe). More specifically, if the tap gesture begins when a foot is already in contact with a contact surface (and thus a contact force is already recognized by the sensor), a tap still could be registered if the force applied at a given location of the foot temporarily increased more than some threshold amount (e.g., a 25% increase, a 50% increase, etc.). As yet another example, if desired, there need not be any contact at all to recognize a tap. Rather, in some example systems and methods according to the invention, simply the motion of the foot in air may be sufficient to register a tap gesture, for example, if the sensors (such as accelerometer or gyro sensors) recognize the foot's in air movement as constituting a tap gesture (e.g., for motions of sufficient length and/or speed, in a predetermined direction, etc.).

The tap gestures need not be so "nuanced" in all systems and methods according to the invention. For example, as illustrated in FIG. 7E, an article of footwear may include only two sensors, one in the toe and one in the heel, and the system could be designed to recognize a toe tap (as shown in FIG. 7E) or a heel tap (e.g., as shown in FIG. 7D). As another example, if the shoe includes only a single sensor, activation of this sensor in the correct manner (e.g., for a short period of time) may be used to indicate a tap gesture, without providing information regarding the portion of the foot used in making the tap.

FIG. 7F illustrates a gesture in which an entire foot is used in making the tap (e.g., all sensors (one, two, four, etc.) are activated for the predetermined tap gesture time period range). If desired, systems and methods according to at least some examples of this invention could distinguish this type of tap gesture from other tap gestures (such as a toe only tap, heel only tap, medial side tap, lateral side tap, etc.) and take other predetermined action in response to this "whole foot" tap gesture.

As another example parameter, if desired, the tap force may be measured and tap actions above a given force threshold may be used to induce one type of action in the user interfaces, while tap actions below that threshold may be used to induce a different type of action. For example, if desired, a toe tap action below 5 psi may be used to insert a cursor, while toe tap actions at the same location between 5-15 psi may be used to select the entire word at the cursor's location, and toe tap actions at the same location between 15-25 psi may be used to select the entire paragraph at the cursor's location. Other actions in response to force measurements associated with foot gestures are possible.

FIGS. 7G through 7I illustrate various "press-and-hold" foot actions. In some pen-based and touch screen computing systems, "press-and-hold" actions by the stylus (or by the user's finger) can be recognized and used to initiate certain actions with respect to a user interface. For example, because many pen-based computing systems use only a stylus for input (and not a conventional computer mouse), a stylus "press-and-hold" action may be used in such systems to mimic a right mouse button press action (for right handed mouse users), i.e., to launch the menus or initiate the other action that typically is associated with a right mouse button press. A "press-and-hold" gesture, as used in the context of this invention, means that the user makes contact with and/or presses downward on a contact surface with at least a threshold force, with some portion of the foot (e.g., the front portion (FIG. 7G), the heel portion (FIG. 7H), the whole foot (FIG. 7I), or some other desired portion(s)), and the user holds the foot pressure at least at that level for a predetermined time (e.g., at least one second, etc), optionally until a desired menu is displayed or other predetermined action is initiated by the system. If desired, press-and-hold gestures may require the pressure to remain within a predetermined range (e.g., at the initial press force±15%) for a specified time period. In this manner, relatively large changes in pressure over relatively short time frames will not result in a press-and-hold activation.

As noted above, foot action input is not limited to action by a single foot. FIGS. 7J through 7L illustrate examples of two foot action input generation scenarios. For example, FIG. 7J illustrates both feet tapping or otherwise applying force to a contact surface (or making a movement consistent with a tap motion). As an alternative, as illustrated in FIG. 7K, a gesture may include the right foot in contact with a surface while the left foot is not in contact with the surface (or is making another gesture, like a tap gesture, a press-and-hold gesture, a motion gesture, etc.). FIG. 7L illustrates a gesture in which the left foot contacts a surface while the right foot is not in contact with the surface (or is making another gesture, like a tap gesture, a press-and-hold gesture, a motion gesture, etc.). Any desired combinations of gestures (e.g., taps, presses, contact force, foot movements, no contact etc.) by the two feet may be recognized and used to control a user interface in systems and methods in accordance with this invention. More examples of two foot gestures will be provided below.

Recognizable foot actions for computer input are not limited to taps and press-and-hold type actions. Foot motion also may be recognized and used to provide input for controlling a user interface. Such foot motion may take place while the foot is in contact with a contact surface (e.g., such that the foot slides along the contact surface), or it may take place while the foot is not in contact with any surface. Various example foot "motion" gestures are described below in conjunction with FIGS. 8A through 8K. In these and the other figures below, the foot shape in the broken lines generally illustrates foot position at the beginning of the gesture and the foot shape in the solid lines generally illustrates foot position at the end of the gesture. These figures are provided to generally show the motion associated with a gesture. The broken and solid lines do not necessarily represent exact relative positioning of the foot over time. Moreover, if desired, while many of the illustrated gestures will show the foot in contact with a contact surface (as represented by the downward arrows representing application of force), many of the gestures do not necessarily require application of contact force (e.g., the gesture may be recognized due to motion of the foot in the air). For systems in which foot motion can be determined without the need to sense contact with a surface, the gestures need not require foot contact with a surface. Also, while the application of force in these example gestures may be shown with regard to various different portions of a wearer's foot, detection of such gestures need not require the use of multiple sensors, but systems having only one sensor may be used to sense such gestures, if desired, without departing from this invention. Additionally, while many of the example gestures show only one foot making a motion, if desired, the other foot could make the motion without departing from this invention and/or systems and methods according to the invention may not discern or care which foot made the sensed motion.

Figure 8C:
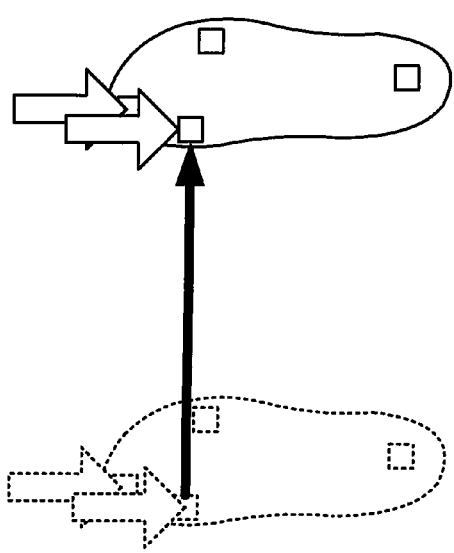
FIGS. 8A through 8K illustrate various additional example foot action gestures that may be recognized and used for providing input to computer systems and methods in accordance with examples of this invention.
Figure 8D:
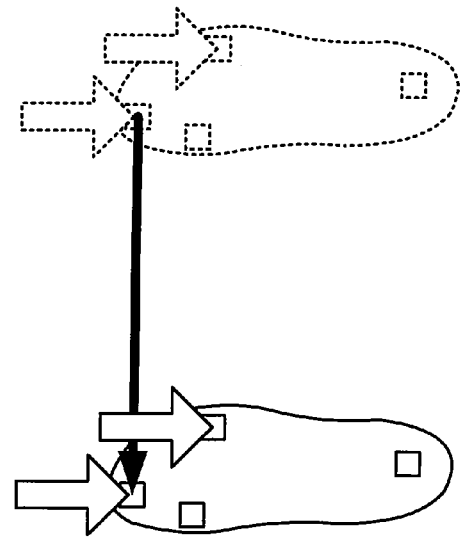
Figure 8B:
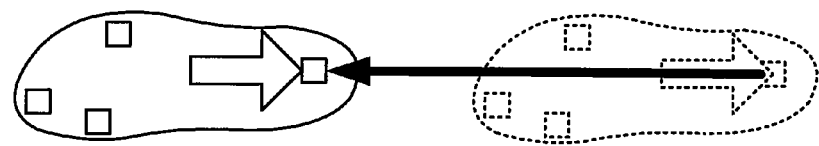
Figure 8A:
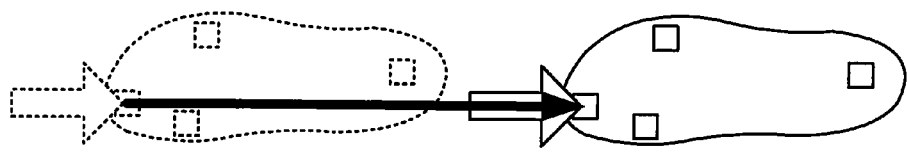

As shown in FIG. 8A, in this example gesture, foot motion in the front to back direction is sensed. More specifically, in this example, the front toe contacts a contact surface at the beginning of the gesture and the foot is moved rearward (optionally while the toe slides along the surface). FIG. 8B illustrates somewhat the opposite gesture, with the foot moving in the back to front direction. In this specific example gesture, the heel contacts a contact surface at the beginning of the gesture and the foot is moved forwardly (optionally, while the heel slides along the surface). While such gestures can be used for any desired purpose in a user interface, as will be described in more detail below, these gestures may be used in systems and methods in accordance with at least some examples of this invention to navigate upward and downward, respectively, in a graphical user interface display, such as a displayed document, a displayed list, etc.

FIGS. 8C and 8D illustrate example gestures in which foot motion in the side-to-side directions is sensed. FIG. 8C illustrates an example gesture in which the right foot is moved in a left-to-right direction (optionally while applying force to the inside front toe of the foot). FIG. 8D illustrates somewhat of the opposite gesture, e.g., in which the right foot is moved in the right-to-left direction (optionally, while applying force to the outside front toe of the foot). While such gestures can be used for any desired purpose in a user interface, as will be described in more detail below, these gestures may be used in systems and methods in accordance with at least some examples of this invention to navigate leftward and rightward, respectively, in a graphical user interface display, such as a displayed document, a displayed list, etc., or to page downward and upward, respectively, in a page type display.

Figure 8F:
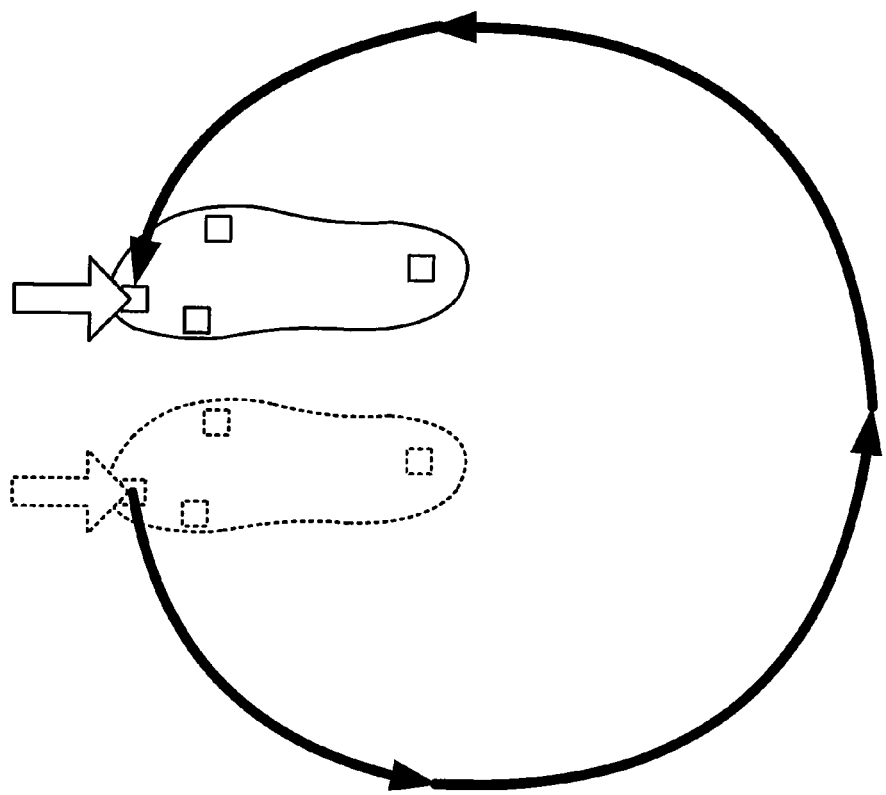
Figure 8E:
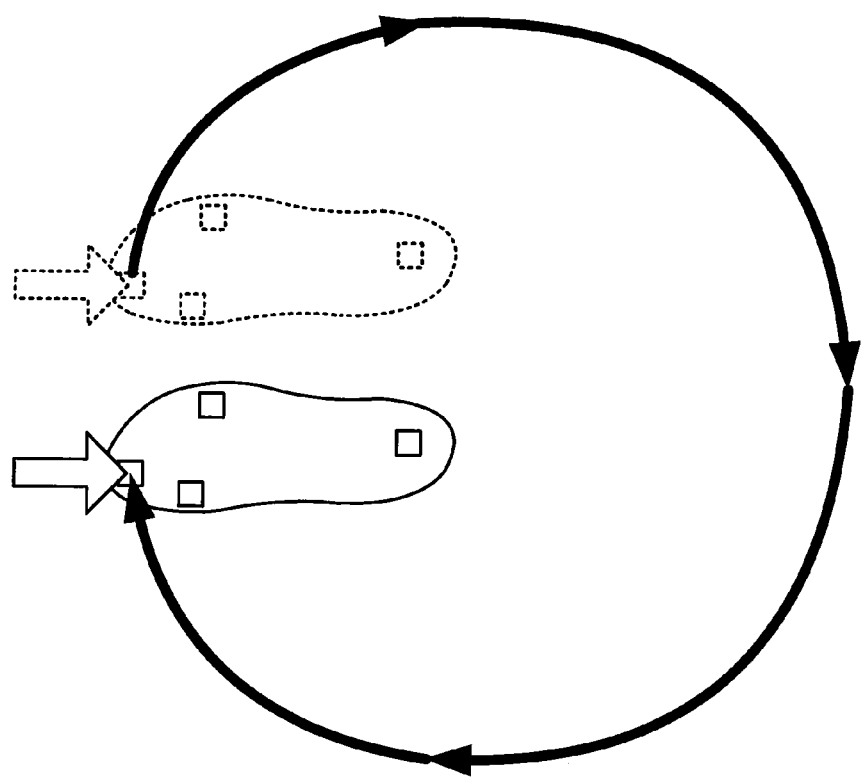

FIGS. 8E and 8F illustrate example gestures in which foot motion in circular directions is sensed. FIG. 8E illustrates an example gesture in which the right foot is moved in a clockwise direction (optionally while applying force to a contact surface using the front toe of the foot). FIG. 8F illustrates somewhat of the opposite gesture, e.g., in which the right foot is moved in a counter-clockwise direction (optionally, while applying force to a contact surface using the front toe of the foot). While such gestures can be used for any desired purpose in a user interface, as will be described in more detail below, these gestures may be used in systems and methods in accordance with at least some examples of this invention to rotate a display, to rotate an object within a display, to change volume of audio output, to change brightness or contrast of video output, etc.

Figure 8H:
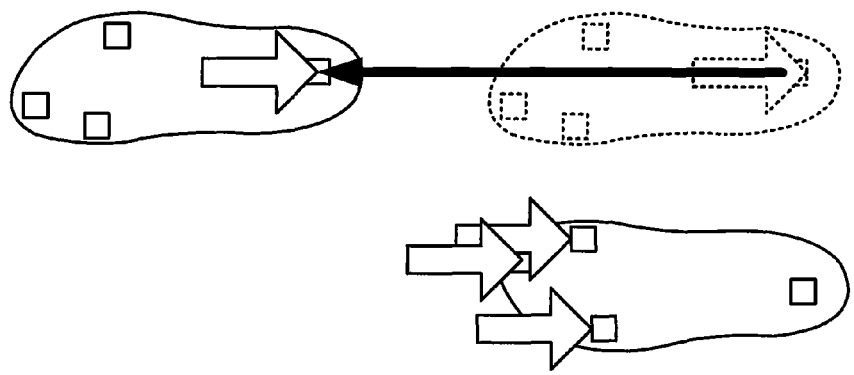
Figure 8G:
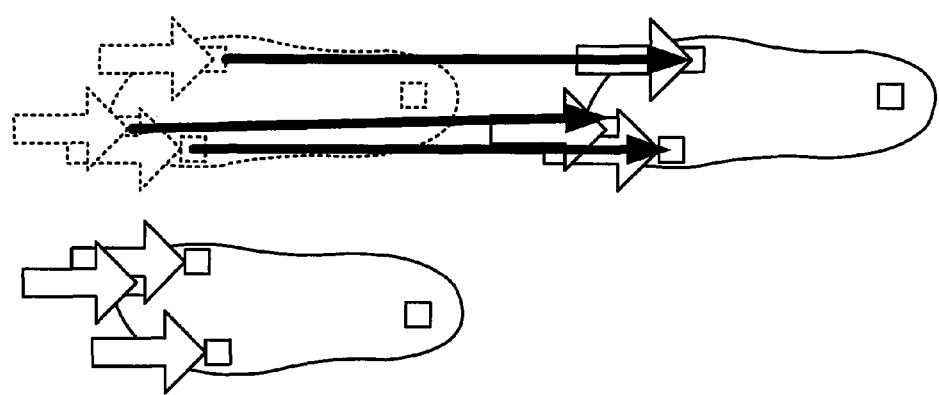

FIGS. 8G through 8K illustrate some examples of two foot gestures that may be recognized and used in systems and methods according to at least some examples of this invention for controlling a user interface. In the gesture of FIG. 8G, the two feet begin adjacent to one another (although this relative positioning is not necessarily required) with both feet applying force to a contact surface. Then, while maintaining the left foot in a relatively stationary position, the right foot is moved rearward (optionally, while keeping the foot (or at least the toe portion thereof) in contact with the contact surface). With the detection of the left foot contact feature and its lack of motion during the time period of the right foot's motion, this gesture can be readily distinguished from the gesture described above in conjunction with FIG. 8A. If desired, the left foot could take other action than simply remaining stationary, and the combination of gestures can be recognized and used to control a user interface. While such gestures can be used for any desired purpose in controlling a user interface, as will be described in more detail below, this example gesture may be used in systems and methods in accordance with at least some examples of this invention to make a larger navigation step than the scrolling action described above in conjunction with FIG. 8A. For example, if desired, the gesture of FIG. 8G might be used to move backward a chapter in an e-book, to skip backward an album in an audio playback sequence, etc.

FIG. 8H shows somewhat of an opposite gesture from that shown in FIG. 8G. In the gesture of FIG. 8H, the two feet begin adjacent to one another (although this relative positioning is not necessarily required) with both feet applying force to a contact surface. Then, while maintaining the left foot in a relatively stationary position, the right foot is moved forward (optionally, while keeping the foot (or at least the heel portion thereof) in contact with the contact surface). With the detection of the left foot contact feature and its lack of motion during the time period of the right foot's motion, this gesture can be readily distinguished from the gesture described above in conjunction with FIG. 8B. If desired, the left foot could take other action than simply remaining stationary, and the combination of gestures can be recognized and used to control a user interface. While such gestures can be used for any desired purpose in controlling a user interface, as will be described in more detail below, this example gesture may be used in systems and methods in accordance with at least some examples of this invention to make a larger navigation step than the scrolling action described above in conjunction with FIG. 8B. For example, if desired, the gesture of FIG. 8H might be used to advance a chapter in an e-book, to skip forward an album in an audio playback sequence, etc.

Figure 8I:
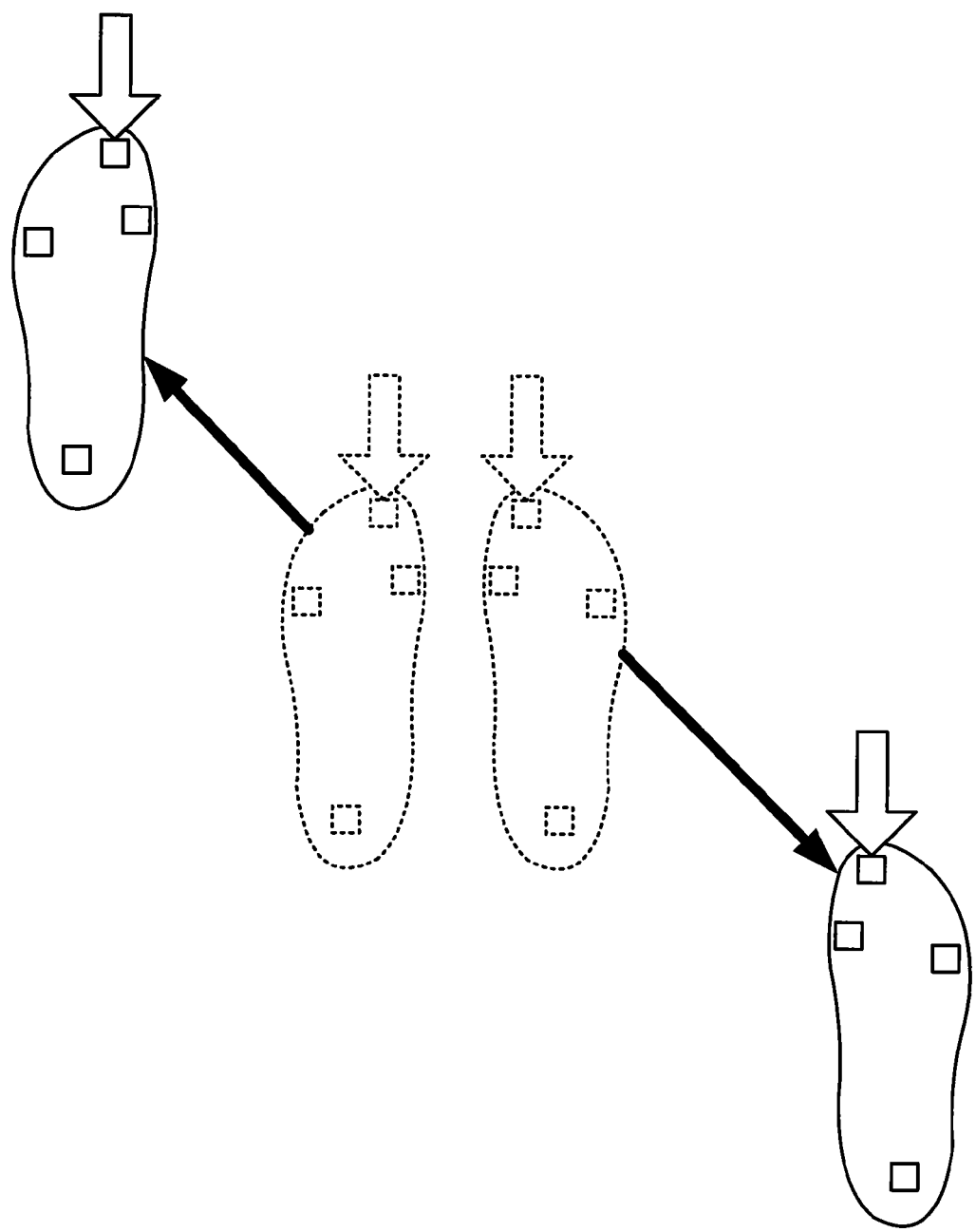
Figure 8J:
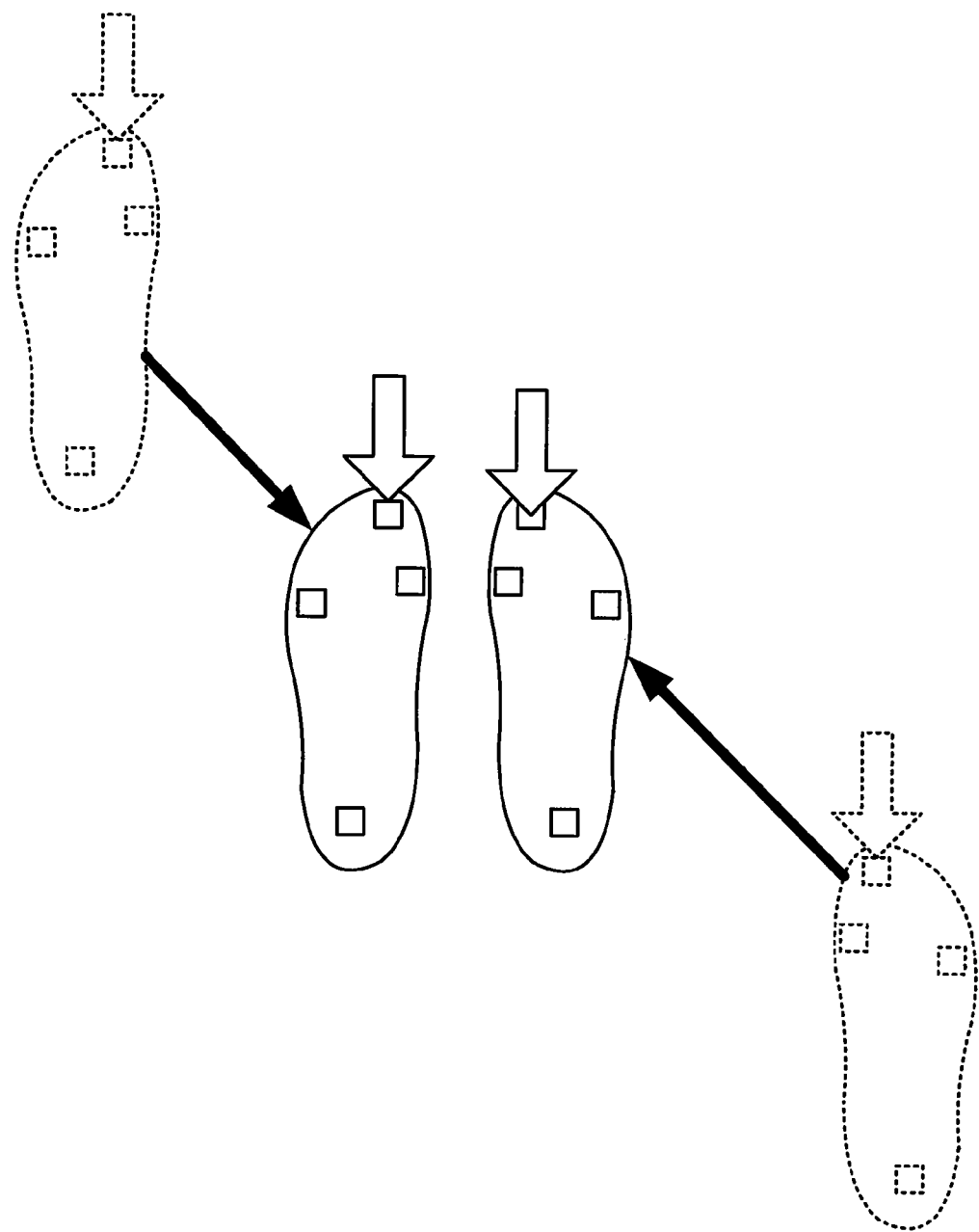
Figure 8K:
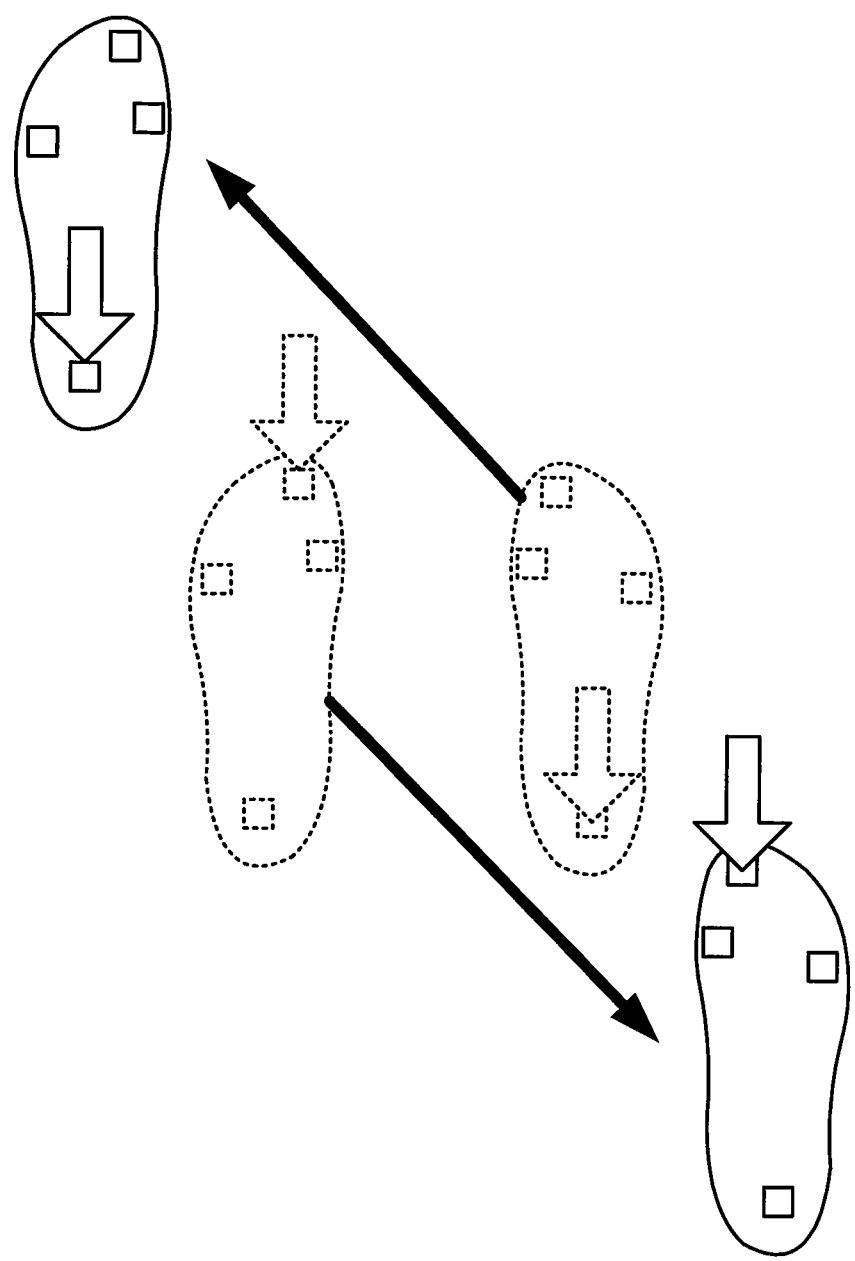

FIGS. 8I through 8K illustrate two foot gestures in which both feet are moved. As shown in FIG. 8I, in this gesture, the two feet start out relatively close together (optionally in contact with a contact surface, although any initial relative positioning location may be used), and the feet are moved apart from one another, optionally in a diagonal direction (other directions also are possible). If desired, foot contact with a contact surface may be required throughout this gesture. While such gestures can be used for any desired purpose in controlling a user interface, as will be described in more detail below, this example gesture may be used in systems and methods in accordance with at least some examples of this invention to zoom in or enlarge information provided on a graphic or video display. This gesture also may be used, if desired, for other purposes, like increasing audio playback volume, navigating on a display, switching between active application programs, etc.

FIG. 8J shows somewhat of an opposite gesture from that shown in FIG. 8I. As shown in FIG. 8J, in this gesture, the two feet start out relatively far apart (optionally in contact with a contact surface), and the feet are moved together, optionally in a diagonal direction (other directions also are possible). If desired, foot contact with a contact surface may be required throughout this gesture. While such gestures can be used for any desired purpose in controlling a user interface, as will be described in more detail below, this example gesture may be used in systems and methods in accordance with at least some examples of this invention to zoom out or to shrink information provided on a graphic or video display. This gesture also may be used, if desired, for other purposes, like decreasing audio playback volume, navigating on a display, switching between active application programs, etc.

FIG. 8K illustrates an example variation on the gesture shown in FIG. 8J and highlights that different relative initial positioning and motion of the feet are possible without departing from this invention. In this example gesture, the two feet start out relatively close together (optionally in contact with a contact surface), and the feet are moved apart, optionally in a diagonal direction (other directions also are possible). In this gesture, the user's legs will somewhat cross during performance of the gesture. If desired, foot contact with a contact surface may be required throughout this gesture. While such gestures can be used for any desired purpose in controlling a user interface, as will be described in more detail below, this example gesture may be used in systems and methods in accordance with at least some examples of this invention to zoom out or to shrink information provided on a graphic or video display. This gesture also may be used, if desired, for other purposes, like decreasing audio playback volume, navigating on a display, switching between active application programs, etc.

Figure 9A:
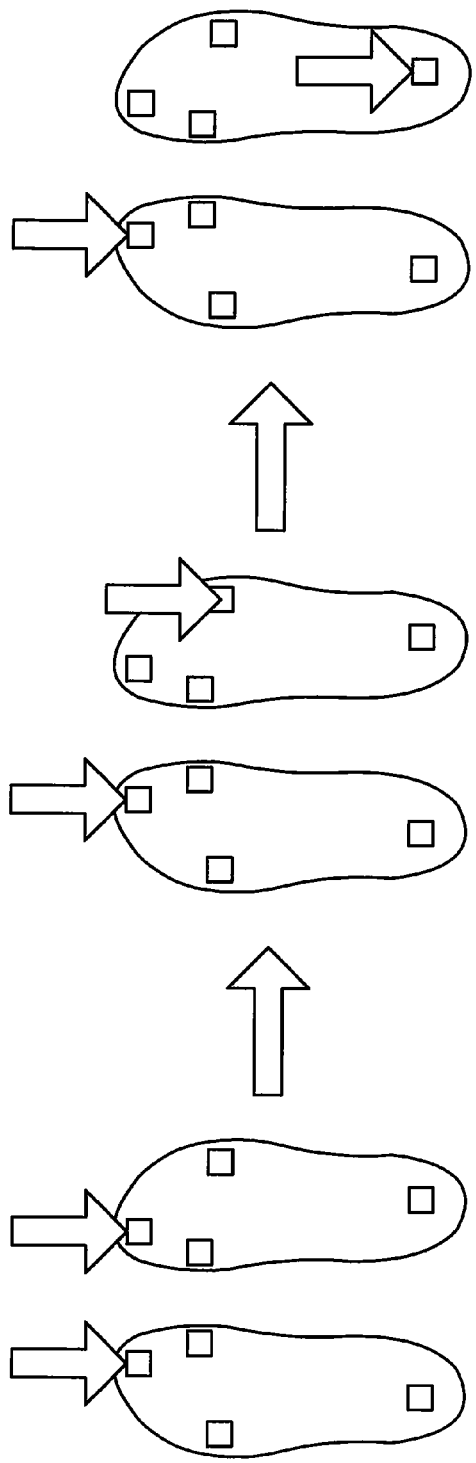
FIGS. 9A and 9B illustrate various example dynamic force application foot gestures that may be recognized and used for providing input to computer systems and methods in accordance with examples of this invention.
Figure 9B:
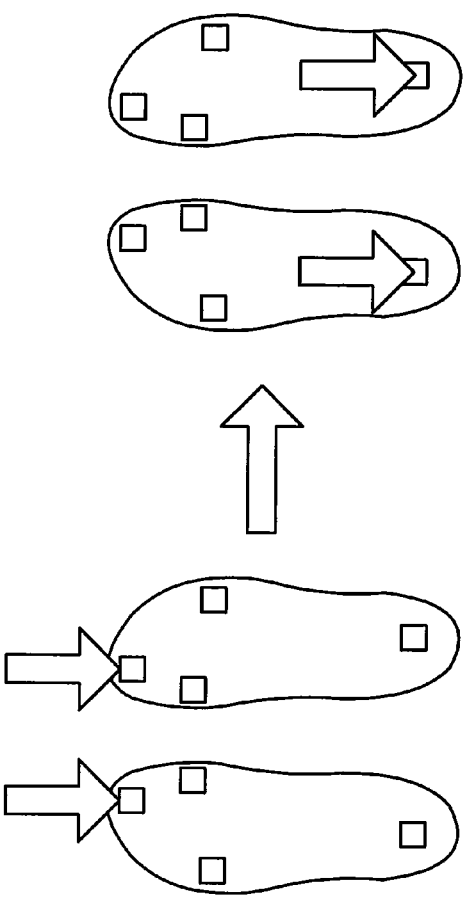

FIGS. 9A and 9B illustrate additional features that may be included in one foot or two foot gestures (or gestures using other numbers of feet) in accordance with at least some examples of this invention. In these example gestures, the location of force application applied by at least one foot changes over the course of the gesture. This change in force location may be detected, recognized, and used by systems and methods according to this invention, if desired, as input for controlling a user interface. In the gesture illustrated in FIG. 9A, the force application by one foot (the left foot) remains stationary (e.g., on the front toe, in this illustrated example), while the force application by the right foot essentially rolls around the foot, e.g., it moves from the front toe (in the far left drawing), to the lateral side of the foot (in the center drawing), and finally to the heel (in the far right drawing). Such a gesture may be used for any desired purpose, e.g., for increasing a volume of an audio playback. Movement of the force in a counterclockwise direction or by providing the movement force using the left foot (while the right foot remains stationary), could be used to produce the opposite effect in the interface, e.g., to decrease the volume of an audio playback. If desired, the detection of the force applied by the non-moving foot could be eliminated from this gesture (e.g., and the gesture could be recognized and used for controlling a user interface based only on the detected force application movement applied by just the one foot).

FIG. 9B illustrates a two foot gesture in which the location of force application changes on both feet. As shown on the left side of FIG. 9B, when this gesture starts, the front toes of both feet are applying pressure against the contact surface. Such an action may be used, for example, to initiate and/or control a fast forward process for fast forwarding through audio and/or video data playback. Movement of the location of the applied force from the toes to the heels (as shown in the right side of FIG. 9B) completes this gesture. Such an action may be recognized and used, for example, to stop the fast forwarding process. If desired, other gestures may be included and used in this gesture set, such as moving the force application location in one foot only, lifting one or both feet from the contact surface, rolling the contact force to either side of the foot, etc.

Figure 10:
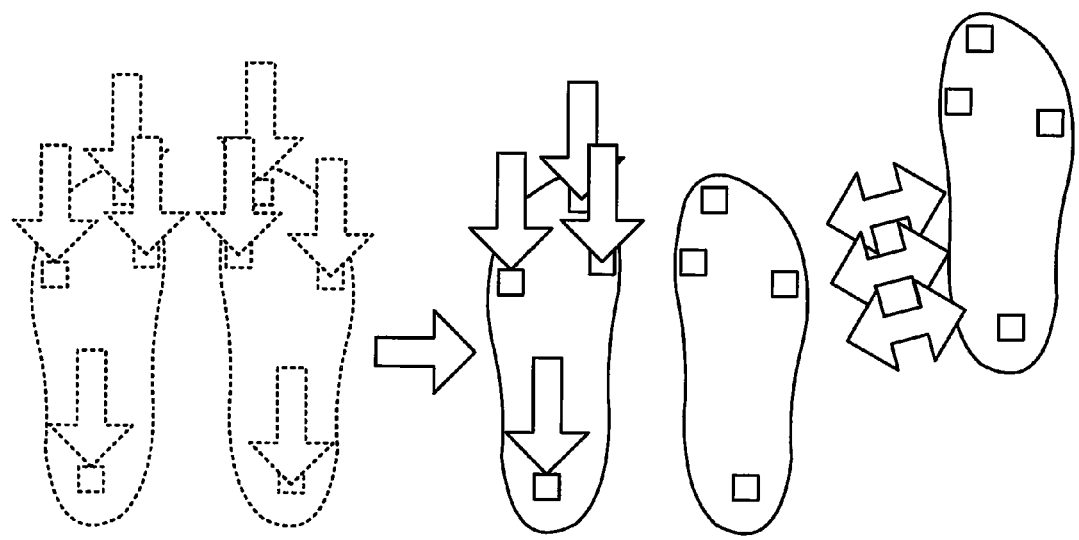
FIG. 10 illustrates an example foot "shaking" action that may be recognized and used for providing input to computer systems and methods in accordance with examples of this invention.

FIG. 10 illustrates another example two foot gesture that may be recognized and used for controlling a user interface in accordance with at least some examples of this invention. As shown on the far left side of FIG. 10, in this gesture, the two feet start out relatively close together, with both feet applying force to the contact surface. Then, as illustrated in the right hand side of FIG. 10, the left foot remains in contact with the contact surface while the right foot is lifted and moved repeatedly from side to side (e.g., a right foot "shaking" gesture). While such a gesture may be recognized and used for any desired purpose without departing from this invention, as some more specific examples, if desired, one or both shaking foot gestures may be used to cause an erase action on a display, a cut action, an active document change action, an active application program change action, etc.

Figure 11:
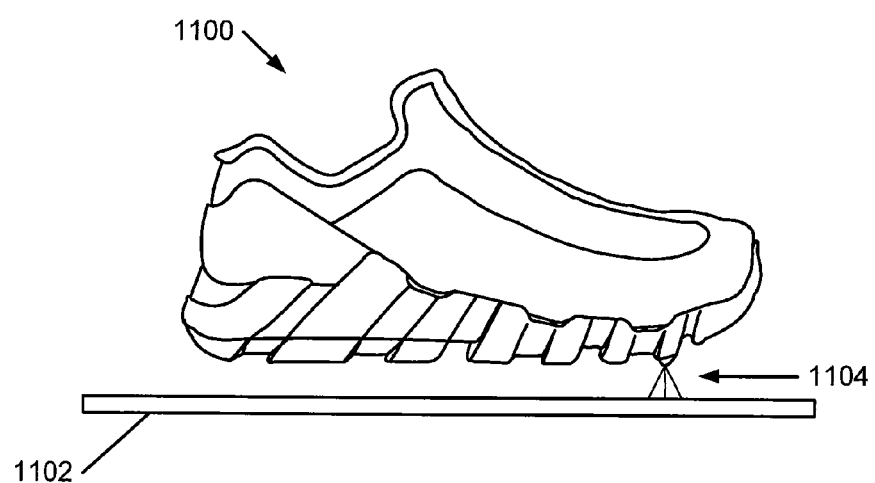
FIG. 11 illustrates an example foot "hover" action that may be recognized and used for providing input to computer systems and methods in accordance with examples of this invention.

FIG. 11 illustrates an example "hover" gesture that may be recognized and used by systems and methods in accordance with at least some examples of this invention. As shown in FIG. 11, in this gesture, the foot (e.g., in a shoe 1100) remains above a contact surface 1102. Either the shoe 1100, the contact surface 1102 (or both), or another piece of hardware may be equipped with electronics and sensors such that systems and methods in accordance with the invention can determine when the shoe 1100 is in relatively close proximity to the contact surface 1102. In such systems, foot movement above (and optionally in close proximity to) the contact surface (i.e., while "hovering") can be detected and tracked, and this movement of the foot while hovering can help the user navigate on a displayed graphical user interface, akin to a user moving a mouse controller over a graphical user interface when neither mouse button is depressed, i.e., using the mouse as a pointer (example uses of this "hover" action will be described in more detail below). Sensors and hardware for detecting a hover action are known in the art, e.g., used in Tablet PC or other pen-based computing systems for detecting hover actions by a stylus over a digitizer screen display. The hover action of a foot 1100 over a contact surface 1102 may be used, for example, in the same manners that pen hover actions are detected and used in pen-based computing systems. In FIG. 11, detection of the hover action is illustrated schematically by the interaction 1104 at the toe area of the shoe 1100.

C. Examples of the Recognition and Use of Foot Gestures for Controlling a User Interface Given the general description above of examples of hardware systems that may be useful to capture foot action input and example gestures that may be recognized, more detailed descriptions of the possible effects of certain gestures will be described in more detail below in conjunction with FIGS. 12A through 21. Those skilled in the art will recognize, however, that systems and methods in accordance with aspects of this invention may recognize and use the foot based gestures in any desired manners for controlling any desired type of user interfaces, operating any desired application programs or operating systems, without departing from this invention.

Figure 12A:
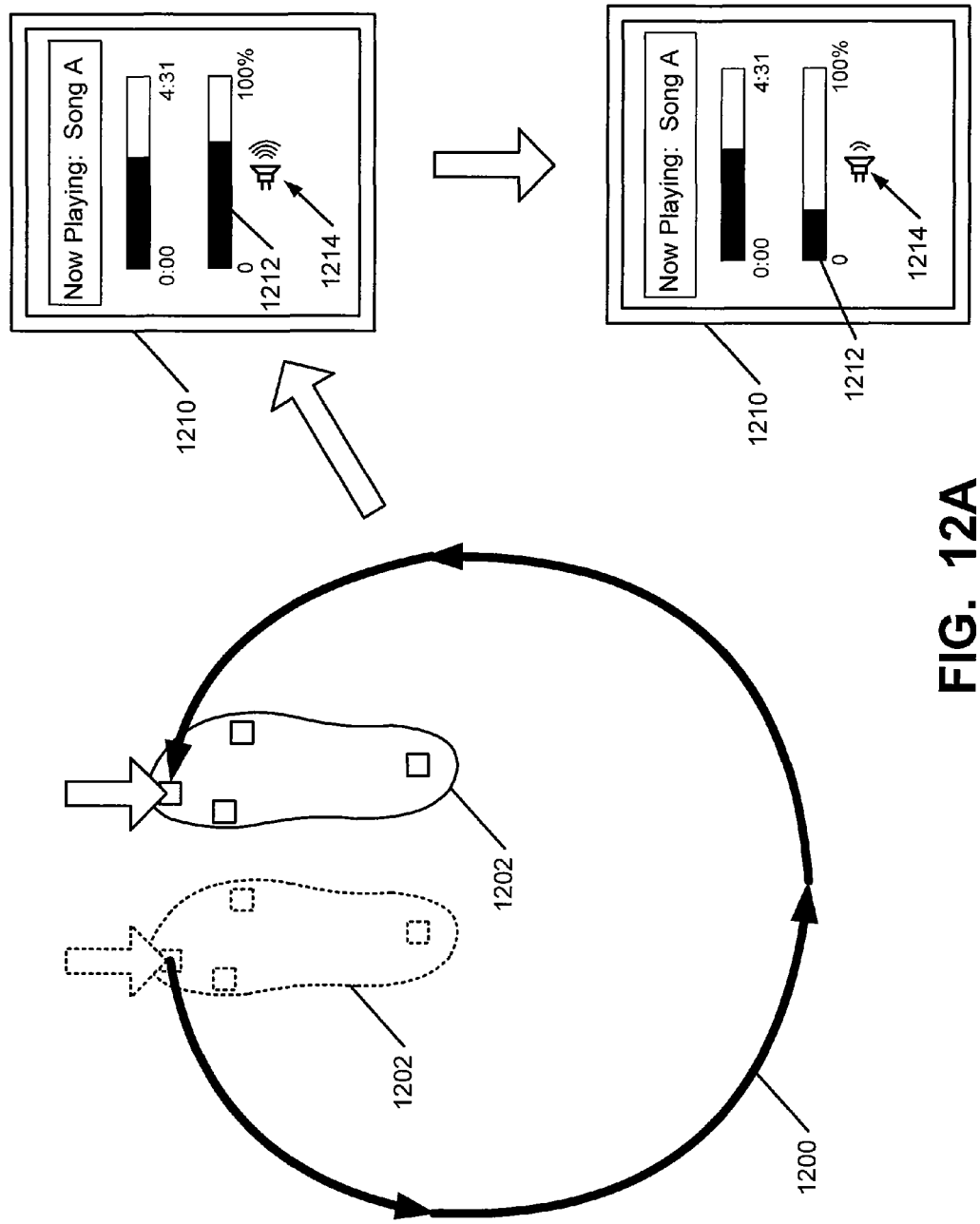

FIG. 12A illustrates the use of the counterclockwise rotation gesture of FIG. 8F for lowering the volume of audio output (e.g., from an audio and/or video playing device). As shown in FIG. 12A, the counterclockwise rotation 1200 of the right foot 1202 (while in contact with a contact surface or while hovering) lowers the volume of the audio playback (the foot action is akin to (and mimics) the physical "turning down" of a volume knob on conventional audio and/or video player devices). In addition to the softer sounding output, this lowering of the volume is evidenced in the example graphical user interface 1210 shown in FIG. 12A by a reduction of the size of the volume bar 1212 and by a change in appearance of the volume/speaker icon 1214 (compare the initial (top) user interface 1210 with the later (bottom) user interface 1210 in FIG. 12A).

Figure 12B:
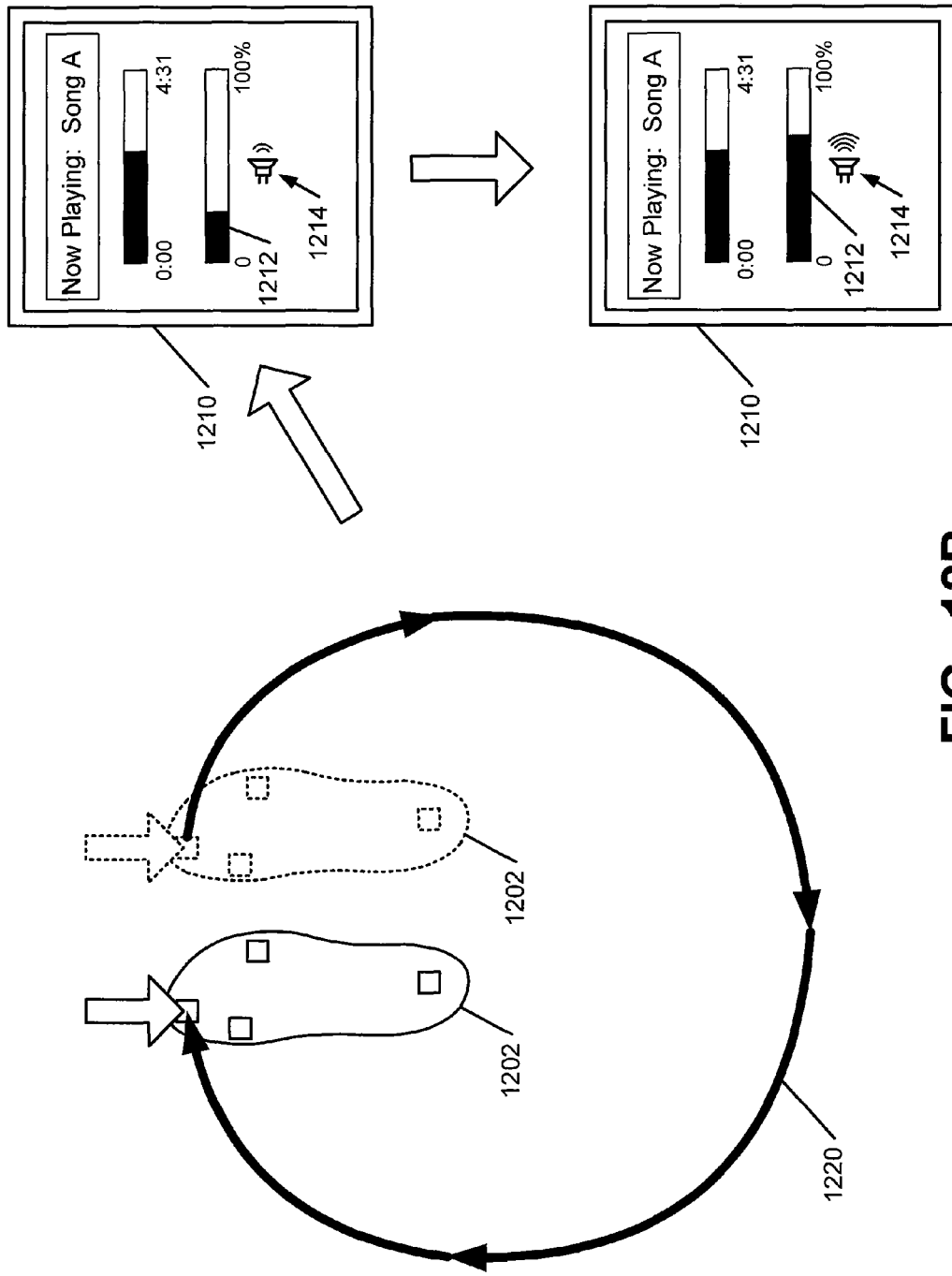

FIG. 12B illustrates the use of the clockwise rotation gesture of FIG. 8E for increasing the volume of audio output (e.g., from an audio and/or video playing device). As shown in FIG. 12B, the clockwise rotation 1220 of the right foot 1202 (while in contact with a contact surface or while hovering) increases the volume of the audio playback (the foot action is akin to (and mimics) the physical "turning up" of a volume knob on conventional audio and/or video player devices). In addition to the louder sounding output, this increase in the volume is evidenced in the example graphical user interface 1210 shown in FIG. 12B by an increase in the size of the volume bar 1212 and by a change in appearance of the volume/speaker icon 1214 (compare the initial (top) user interface 1210 with the later (bottom) user interface 1210 in FIG. 12B).

In the gestures shown in FIGS. 12A and 12B, any desired graphical manner of illustrating the volume change may be used without departing from this invention, or, if desired, no graphical indication of this change is necessary in the display device. Also, the volume adjustment may begin as soon as the gesture is recognized as being the clockwise or counterclockwise foot rotation gesture, and volume adjustment can continue until a volume minimum or maximum is reached or until the foot motion stops. As another example, if desired, the speed of foot motion or the contact force associated with the foot motion (if any) may be used as an input for controlling the rate of volume change. If desired, the graphical indication of volume (if any) may disappear or fade away over time, e.g., after the volume adjustment action has been completed, or this graphical indication of the volume may be replaced by other information (such as time remaining, video information, etc.). The graphical user interface 1210 also could display any other desired textual, video, and/or graphical information without departing from this invention.

Figure 12C:
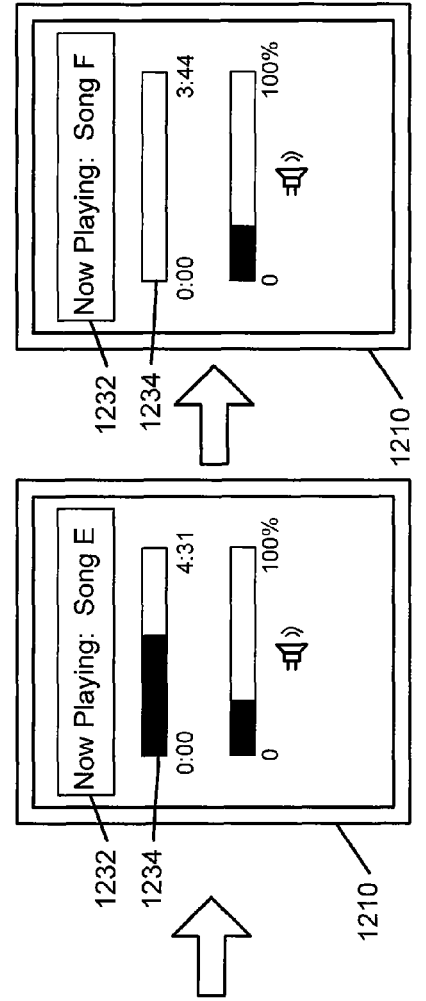
Figure 12D:
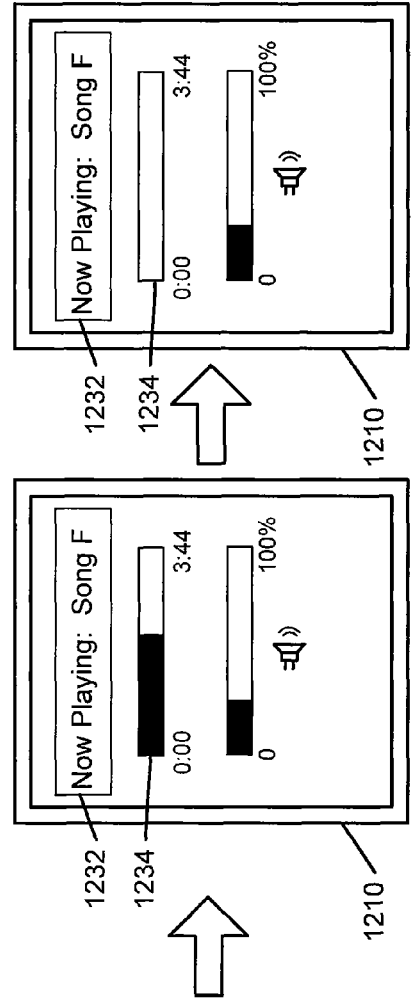
Figure 12E:
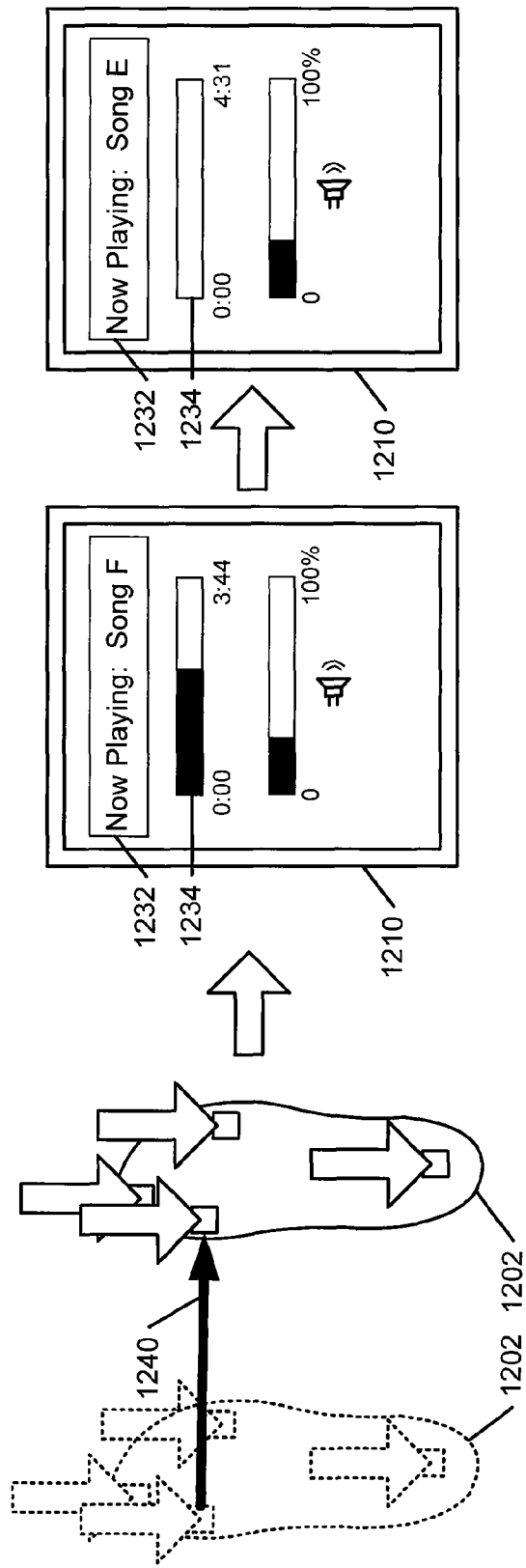

FIGS. 12C through 12E illustrate examples of the use of foot action gestures for navigating through multiple playback items in an audio and/or video player device. In FIG. 12C, a right foot 1202 right-to-left foot motion gesture 1230, e.g., like that shown in FIG. 8D (optionally, with the toe and/or lateral side of the foot in contact with a contact surface), is used to skip forward one song in an audio playback. This action is akin to pressing the right arrow button on the user control button of an IPOD® audio/video playback device available from Apple Computer, Inc. of Cupertino, Calif. This change in the playing audio file is evidenced in the example graphical user interface 1210 shown in FIG. 12C by the change of title in the title block 1232 and by the change in the playback time status bar 1234 (compare the initial (left) user interface 1210 with the later (right) user interface 1210 in FIG. 12C).

In FIG. 12D, a right foot 1202 left-to-right foot motion gesture 1240, e.g., like that shown in FIG. 8C (optionally, with the toe and/or lateral side of the foot in contact with a contact surface), is used to return to the beginning of the currently playing song in an audio playback. This action is akin to pressing the left arrow button on the user control button of an IPOD® audio/video playback device available from Apple Computer, Inc. of Cupertino, Calif. This change in the playing audio file is evidenced in the example graphical user interface 1210 shown in FIG. 12D by the change in the playback time status bar 1234 (compare the initial (left) user interface 1210 with the later (right) user interface 1210 in FIG. 12D). Notably, in response to the recognized gesture of FIG. 12, the song title in the title block 1232 of the graphical user interface 1210 did not change, but the same audio file is simply being replayed from its start.

In some instances, a user may wish to replay a previous song after the next song has started playing. This action could be accomplished, in systems and methods in accordance with at least some examples of this invention, by performing the gesture of FIG. 12D twice in relatively rapid succession. FIG. 12E illustrates another potential gesture for performing this function in systems and methods according to at least some examples of this invention. The gesture of FIG. 12E is similar to that of FIG. 12D except in the gesture of FIG. 12E the entire right foot 1202 applies pressure to the contact surface (as evidenced by the force arrows in both the toe and the heel areas), and the same general left-to-right foot motion 1240 is performed. This change in the playing audio file is evidenced in the example graphical user interface 1210 shown in FIG. 12E by the change of title in the title block 1232 and by the change in the playback time status bar 1234 (compare the initial (left) user interface 1210 with the later (right) user interface 1210 in FIG. 12E). Of course, other gestures for performing this function may be used without departing from this invention (such as the same gesture as in FIG. 12D but by the left foot, a two foot gesture, a right foot press-and-hold followed by the same gesture by the right foot, etc.).

FIG. 12F illustrates an example audio/video playback "start" gesture that may be used in systems and methods according to at least some examples of this invention. As shown on the left side of FIG. 12F, when this gesture starts, the right foot 1202 is not in contact with a contact surface (as evidenced by the lack of force arrows). To begin a playback (e.g., from the start or from a previously instituted "pause" condition), the toe portion of the right foot 1202 makes a tapping action (optionally tapping a contact surface or making a tapping motion in air) two times (as evidenced by force arrows 1250 and 1252), i.e., a double toe tap. This start in the playing of an audio file is evidenced in the example graphical user interface 1210 shown in FIG. 12F by the change in the playback time status bar 1234 from a grayed condition to a black condition and by a change in the "Status" indicator 1254 from a "Paused" to a "Playing" indication (compare the initial (left) user interface 1210 with the later (right) user interface 1210 in FIG. 12F).

FIG. 12G illustrates an example audio/video playback "pause" gesture that may be used in systems and methods according to at least some examples of this invention. As shown on the left side of FIG. 12G, when this gesture starts, the right foot 1202 is not in contact with a contact surface (as evidenced by the lack of force arrows). To pause (or stop) a current playback (or to stop a rewind or fast forward action, if available), the heel portion of the right foot 1202 makes a tapping action (optionally tapping a contact surface or making a tapping motion in air) two times (as evidenced by force arrows 1260 and 1262), i.e., a double heel tap. This pause in the play back of an audio file is evidenced in the example graphical user interface 1210 shown in FIG. 12G by the change in the playback time status bar 1234 from a black condition to a grayed condition and by a change in the "Status" indicator 1254 from a "Playing" to a "Paused" indication (compare the initial (left) user interface 1210 with the later (right) user interface 1210 in FIG. 12G).

Figure 13A:
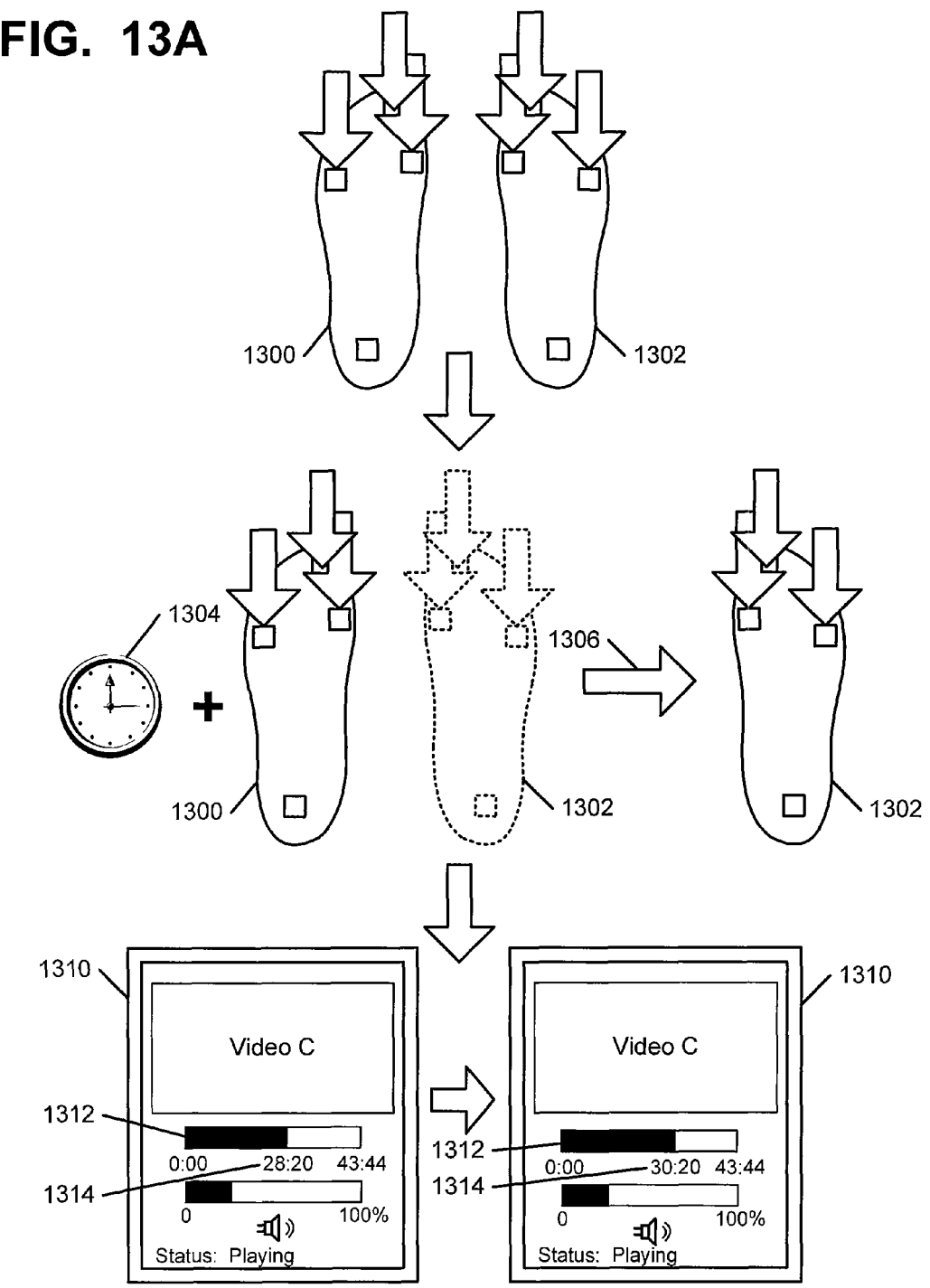
Figure 13B:
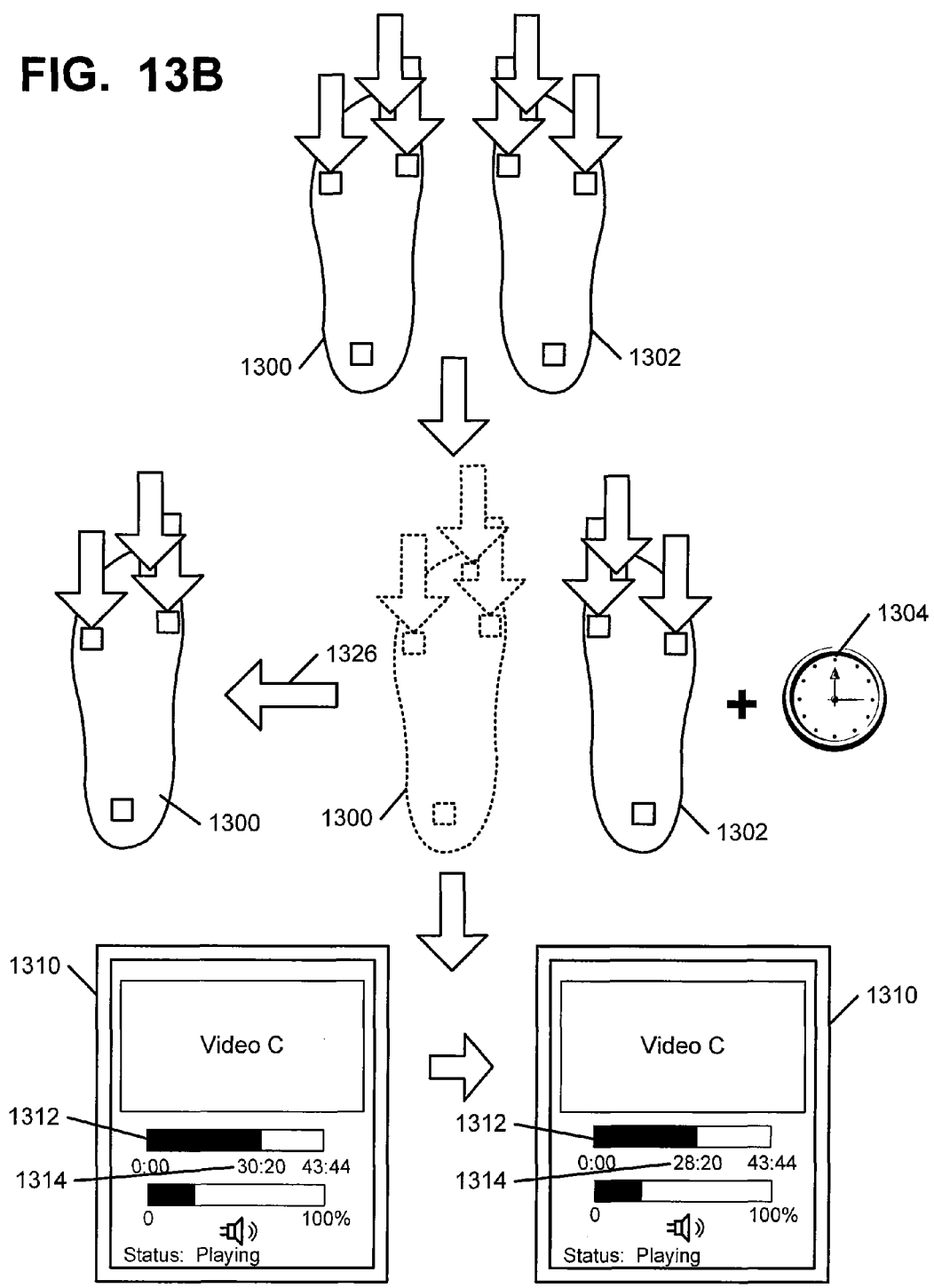

FIGS. 13A and 13B illustrate additional example foot action gestures that may be used with audio/video playback devices and interfaces (or other interfaces) in accordance with this invention. For longer audio and/or video files, a user may simply wish to jump forward or backward over just a portion of the playback, e.g., to skip forward or backward to a desired location more quickly. FIGS. 13A and 13B illustrate two foot gestures that may be used to advance or rewind an audio or video playback by a predetermined time amount (e.g., 2 minutes in these illustrated examples, although any desired time jump may be used without departing from this invention).

The top of FIG. 13A shows the user's feet 1300 and 1302 at the start of this example gesture. At this time, at least the fronts of both feet 1300 and 1302 are in contact with a contact surface and are applying force thereto, as evidenced by the force arrows. Then, while the left foot 1300 remains in a press-and-hold action (as evidenced by the clock element 1304), the right foot 1302 is moved to the right, as shown by arrow 1306. While the right foot 1302 could be lifted from the contact surface during this gesture, in the example illustrated in FIG. 13A, the right foot 1302 is slid along the contact surface and the front of the foot 1302 remains in contact with the contact surface. As illustrated at the bottom of FIG. 13A, this action moves the playback of the video forward about two minutes, as evidenced in the example user interface 1310 by the change in size of the playback time bar 1312 and by the change in the displayed current time 1314 within the playing video from "28:20" to "30:20" (compare the initial (left) user interface 1310 with the later (right) user interface 1310 in FIG. 13A).

FIG. 13B shows essentially the opposite user interface control from that of FIG. 13A, i.e., a skip backward in the playback of a predetermined amount of time as compared to the forward skip of FIG. 13A. Accordingly, in this example, the gesture of FIG. 13B is essentially the opposite of that of FIG. 13A. More specifically, the top of FIG. 13B shows the user's feet 1300 and 1302 at the start of this example gesture. At this time, at least the fronts of both feet 1300 and 1302 are in contact with a contact surface and are applying force thereto, as evidenced by the force arrows. Then, while the right foot 1302 remains in a press-and-hold action (as evidenced by the clock element 1304), the left foot 1300 is moved to the left, as shown by arrow 1326. While the left foot 1300 could be lifted from the contact surface during this gesture, in the example illustrated in FIG. 13B, the left foot 1300 is slid along the contact surface and the front of the foot 1300 remains in contact with the contact surface. As illustrated at the bottom of FIG. 13B, this action moves the playback of the video backward about two minutes, as evidenced in the example user interface 1310 by the change in size of the playback time bar 1312 and by the change in the displayed current time 1314 within the playing video from "30:20" to "28:20" (compare the initial (left) user interface 1310 with the later (right) user interface 1310 in FIG. 13B).

Other types of user interfaces can be manipulated using foot action in accordance with examples of this invention. FIGS. 14A through 14D illustrate example gestures for navigating "window" type user interfaces in which the information contained in the displayed electronic view contains more information than can be displayed within the visible confines of the display screen. In conventional computing systems, users can navigate through all of the information in such displays using, for example, a mouse device and scroll bars provided at the various sides of the display. As will be described below, foot action also can be used for navigating such displays.

Figure 14B:
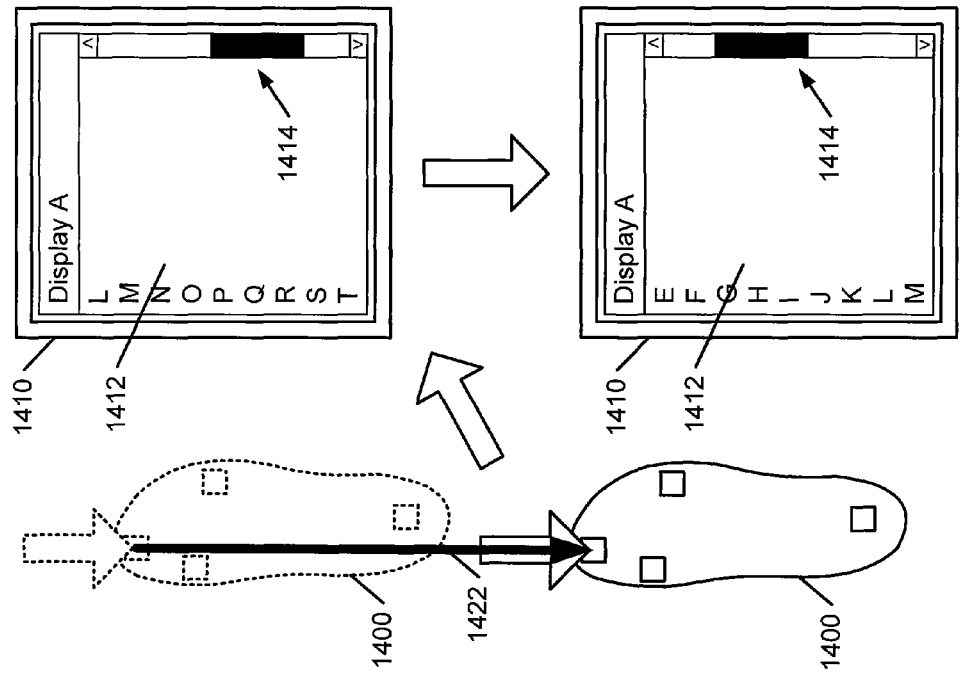
Figure 14A:
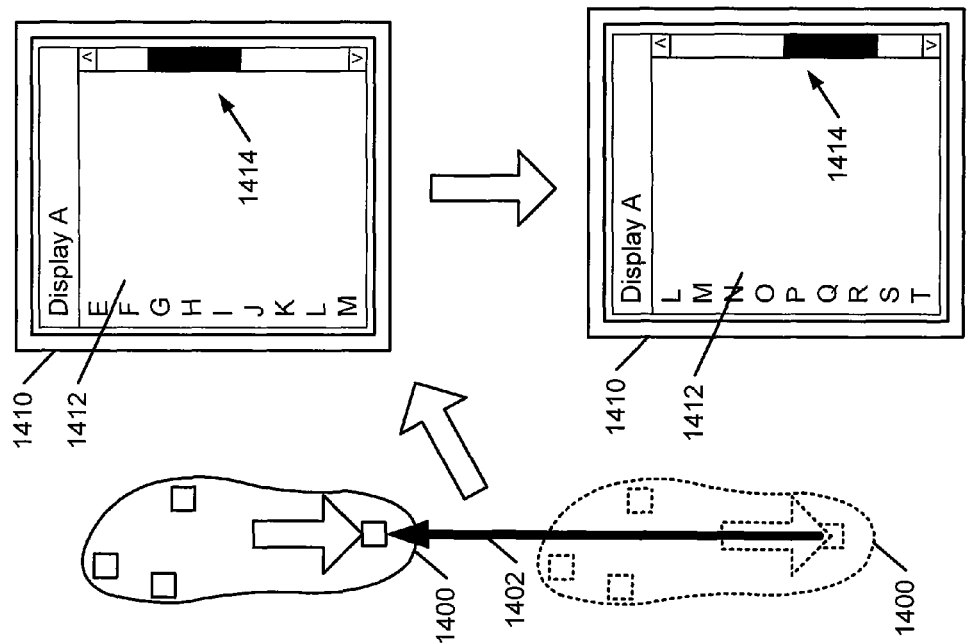

FIG. 14A illustrates a gesture for scrolling downward in displayed information, such as a display list, graphic, document, or other item. In this example gesture, as shown on the left side of FIG. 14A, at least the heel of a foot 1400 begins in contact with a contact surface (shown in broken lines in FIG. 14A), and the foot is moved forward (see arrow 1402), optionally while maintaining the heel contact with the contact surface. The right side of FIG. 14A illustrates the effect that recognition of this gesture has on display 1412 of user interface 1410. As shown in FIG. 14A, this gesture has the effect of "pushing" the displayed information upward in order to essentially scroll downward in the displayed information. The change in the displayed information is evidenced in FIG. 14A, for example, by the actual change in the displayed information and by the change in the scroll bar indicator 1414 on the right hand side of the display 1412 (as is conventional, the darkened part of the scroll bar indicator 1414 illustrates the current location in the overall vertical direction of the displayed information).

FIG. 14B illustrates a gesture for scrolling upward in displayed information, such as a display list, graphic, document, or other item. In this example gesture, as shown on the left side of FIG. 14B, at least the front toe portion a foot 1400 begins in contact with a contact surface (shown in broken lines in FIG. 14B), and the foot is moved rearward (see arrow 1422), optionally while maintaining the front toe contact with the contact surface. The right side of FIG. 14B illustrates the effect that recognition of this gesture has on display 1412 of user interface 1410. As shown in FIG. 14B, this gesture has the effect of "pulling" the displayed information downward in order to essentially scroll upward in the displayed information. The change in the displayed information is evidenced in FIG. 14B, for example, by the actual change in the displayed information and by the change in the scroll bar indicator 1414 on the right hand side of the display 1412.

FIG. 14C illustrates a gesture for scrolling leftward in displayed information, such as a display list, graphic, document, or other item. In this example gesture, as shown on the left side of FIG. 14C, at least the front and medial toe portions of a foot 1400 begin in contact with a contact surface (shown in broken lines in FIG. 14C), and the foot is moved rightward (see arrow 1424), optionally while maintaining the front and medial toe portions in contact with the contact surface. The right side of FIG. 14C illustrates the effect that recognition of this gesture has on display 1412 of user interface 1410. As shown in FIG. 14C, this gesture has the effect of "pulling" the displayed information rightward in order to essentially pan to the left in the displayed information. The change in the displayed information is evidenced in FIG. 14C, for example, by the actual change in the displayed information and by the change in the scroll bar indicator 1416 provided at the bottom side of the display 1412 (as is conventional, the darkened part of the scroll bar indicator 1416 illustrates the current location in the overall horizontal direction of the displayed information).

FIG. 14D illustrates a gesture for scrolling rightward in displayed information, such as a display list, graphic, document, or other item. In this example gesture, as shown on the left side of FIG. 14D, at least the front and lateral toe portions of a foot 1400 begin in contact with a contact surface (shown in broken lines in FIG. 14D), and the foot is moved leftward (see arrow 1426), optionally while maintaining the front and lateral toe portions in contact with the contact surface. The right side of FIG. 14D illustrates the effect that recognition of this gesture has on display 1412 of user interface 1410. As shown in FIG. 14D, this gesture has the effect of "pulling" the displayed information leftward in order to essentially pan to the right in the displayed information. The change in the displayed information is evidenced in FIG. 14D, for example, by the actual change in the displayed information and by the change in the scroll bar indicator 1416 provided at the bottom side of the display 1412.

FIGS. 14A through 14D illustrate potential gestures for navigating information within a display that utilizes scroll bar type navigation. Optionally, the same gestures (or similar gestures, such as the same right foot gestures with a left foot press-and-hold or a left foot heel contact force) may be used to navigate displays of paged information.

FIGS. 15A and 15B illustrate examples of the use of foot gestures in navigating page type displays. FIG. 15A illustrates a gesture for paging downward in displayed information, such as an ebook, an emagazine, or other paged type electronic document or display. In this example gesture, as shown on the left side of FIG. 15A, at least the front and medial toe portions of a foot 1500 begin in contact with a contact surface (shown in broken lines in FIG. 15A), and the foot is moved rightward (see arrow 1502), optionally while maintaining the front and medial toe portions in contact with the contact surface. The right side of FIG. 15A illustrates the effect that recognition of this gesture has on display 1512 of user interface 1510. As shown in FIG. 15A, this gesture has the effect of "pulling" the displayed page to the right in order to essentially page downward in the display. The change in the displayed information is evidenced in FIG. 15A, for example, by the actual change in the displayed information, by the change in the page indicator 1514, and by the change in the scroll bar indicator 1516. The gesture may have the look and feel of essentially turning a book's pages in the frontward direction. Alternatively, if desired, a gesture like that shown in FIG. 14A or 14B may be used to page downward. Optionally, if necessary, this gesture may be combined with a left foot gesture, e.g., to distinguish from the gesture of FIG. 14A.

FIG. 15B illustrates a gesture for paging upward in displayed information, such as an ebook, an emagazine, or other paged type electronic document or display. In this example gesture, as shown on the left side of FIG. 15B, at least the front and lateral toe portions of a foot 1500 begin in contact with a contact surface (shown in broken lines in FIG. 15B), and the foot is moved leftward (see arrow 1522), optionally while maintaining the front and lateral toe portions in contact with the contact surface. The right side of FIG. 15B illustrates the effect that recognition of this gesture has on display 1512 of user interface 1510. As shown in FIG. 15B, this gesture has the effect of "pulling" the displayed page to the left in order to essentially page upward in the display. The change in the displayed information is evidenced in FIG. 15B, for example, by the actual change in the displayed information, by the change in the page indicator 1514, and by the change in the scroll bar indicator 1516. The gesture may have the look and feel of essentially turning a book's pages in the rearward direction. Alternatively, if desired, a gesture like that shown in FIG. 14A or 14B may be used to page downward. Optionally, if necessary, this gesture may be combined with a left foot gesture, e.g., to distinguish from the gesture of FIG. 14A.

If desired, various other parameters or features of the foot action in FIGS. 14A through 15B, such as the movement speed, movement distance, pressing force, etc., may be measured and used to determine the extent of vertical, horizontal, and/or page movement within the displayed information. For example, faster, longer, and/or harder pressing forces may be used to produce larger pans in the vertical or horizontal directions and/or larger numbers of page changes. Also, while the gestures shown in FIGS. 14A through 15B are illustrated as right foot gestures, systems and methods according to this invention may recognize similar gestures when made by the left foot and take similar actions without departing from this invention, and/or systems and methods in accordance with this invention may recognize these gestures and take appropriate action irrespective of the foot making the gesture. Other arrangements also are possible without departing from this invention.

FIG. 16 illustrates additional features that may be provided in systems and methods in accordance with at least some examples of this invention. The top row of FIG. 16 illustrates foot 1600 actions with respect to a contact surface 1602, and the bottom row of FIG. 16 illustrates potential changes to a user interface 1610 in response to these foot actions. In general, FIG. 16 illustrates potential foot actions associated with a "select" action in a graphical user interface 1610.

As shown in FIG. 16, when this example process starts, the foot 1600 is located a distance away from the contact surface 1602 such that its presence is not registered by a foot/contact surface proximity detector. This is illustrated in the far left of FIG. 16 by the relatively small appearance of the foot 1600 and by the fact that the foot registers no visible indication on the user interface 1610. Alternatively, if desired, the process could begin simply when a user lifts his/her foot 1600 from a contact surface 1602, which could result in relatively prompt detection of the foot 1600 by a proximity detector. The second vertical set of drawings in FIG. 16 illustrates the foot 1600 approaching the contact surface (as evidenced by the enlarged size of the foot 1600) and its placement in a "hover" orientation. When the foot 1600 comes in relatively close proximity to the contact surface 1602 so as to be considered to be "hovering," it is detected by the proximity detector arrangement. This fact is registered on the user interface 1610 by illustrating an indication of the location of the foot 1600 with respect to the contact surface 1602 (e.g., a "graying out" of the list element corresponding to the foot's location in FIG. 16). In this example situation, the foot location indicator may be initially located at any location on the displayed information in the user interface 1610 without departing from this invention (including within any menu elements and/or toolbars associated with the displayed information).

The location on the displayed information associated with the "hovering" foot may be displayed on the user interface 1610 in any desired manner without departing from this invention, such as the "graying" described above. Other indicators of the location associated with the hover action may include, for example, color change, size change (e.g., enlargement), bolding, italicizing, glowing, blinking, radiating, an audible indicator, or the like.

The third set of vertical figures in FIG. 16 illustrates motion of the foot 1600 with respect to the contact surface 1602 and the effect of this motion on the displayed information in the user interface 1610. As shown in this set of figures, as the user's foot 1600 moves rearward with respect to the contact surface 1602 while remaining in the "hover" orientation, the grayed out list element changes and moves in a downward direction. As shown in FIG. 16, the grayed out element of the Song Library List changed from "Song 14" to "Song 17" in response to this foot action. This foot action is akin to moving a mouse pointer without depressing a mouse button (e.g., using the mouse as a pointer in a conventional mouse based computer system) or moving a hovering stylus (e.g., using the pen as a pointer in a pen-based computer system).

The final vertical set of illustrations in FIG. 16 illustrates a selection action. As shown in FIG. 16, when the user's foot 1600 makes a tap action (shown by force arrow 1604 in FIG. 16, which may require surface 1602 contact or simply a downward motion of the toe or foot), the list item corresponding to the location of the hovering foot ("Song 17" in this illustrated example) is selected, as evidenced by the "blacked out" view of "Song 17" in FIG. 16. Any desired way of evidencing this selection may be provided without departing from this invention, including, for example, the display of additional information relating to the selected item, the start of playback of this selected item, transferring to another graphical user interface screen relating to this item, etc. Moreover, any desired items may be selected using a tap action in this manner without departing from this invention, including, for example, other list items, hyperlinks or other navigational links, tapping an input key (e.g., from a soft keyboard, etc.), etc.

If desired, in such an interface, moving the foot while in a hovering orientation to the top (or bottom) of the displayed information may be used as a gesture to initiate a scroll in the upward (or downward) direction. Left and right scrolling, if possible given the displayed information, also can be accomplished by moving the hovering foot to a location corresponding to the left and right edges of the displayed information.

Figure 17:
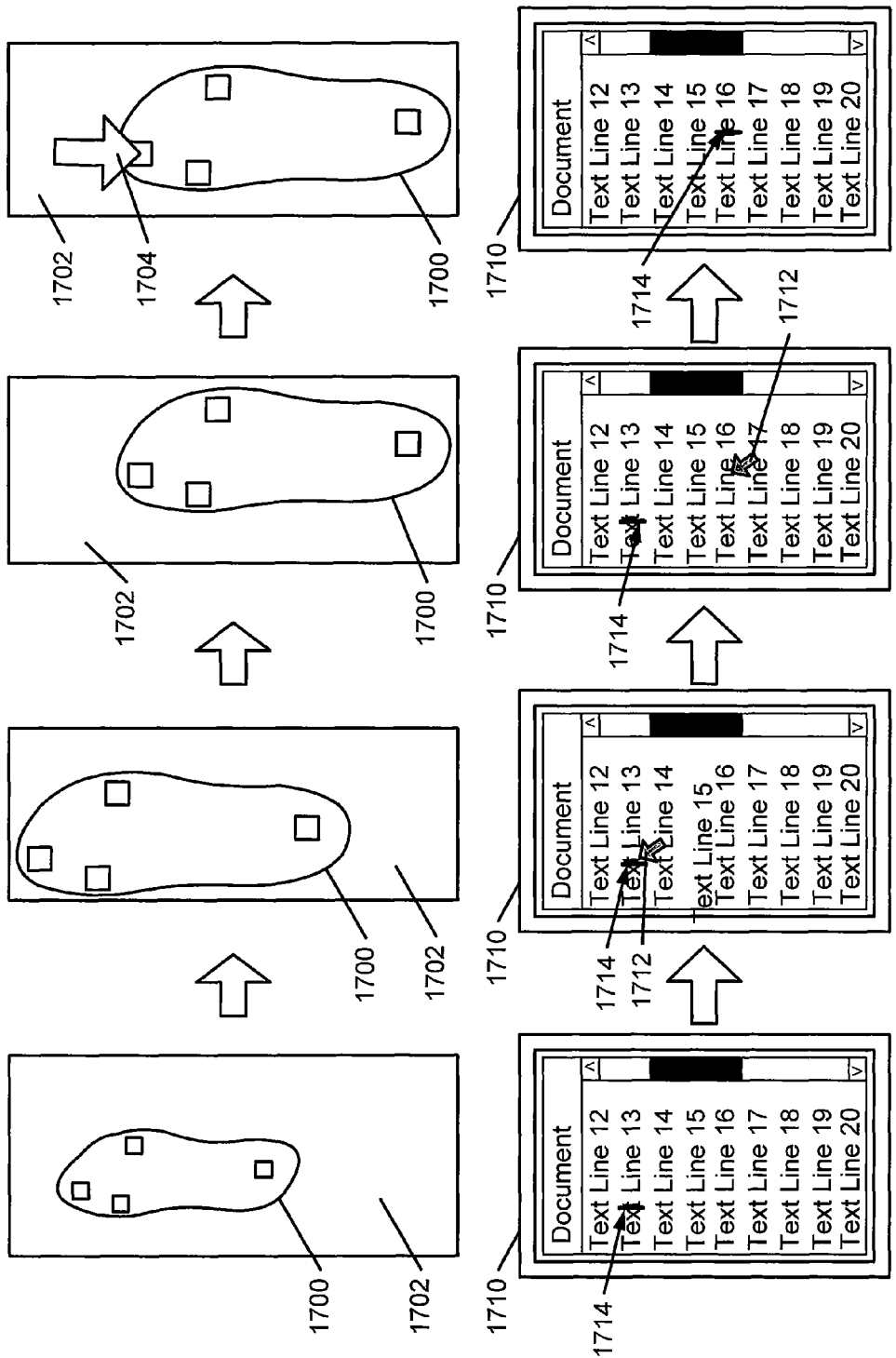

FIG. 17 illustrates foot action associated with movement of a pointer and/or cursor element in accordance with at least some examples of this invention (e.g., in a word processing document, in an electronic spreadsheet document, in other displayed textual information, etc.). The top row of FIG. 17 illustrates foot 1700 actions with respect to a contact surface 1702, and the bottom row of FIG. 17 illustrates potential changes to user interface 1710 in response to these foot actions. As shown in FIG. 17, when this example process starts, the foot 1700 is located a distance away from the contact surface 1702 such that its presence is not registered by a foot/contact surface proximity detector. This is illustrated in the far left vertical set of drawings in FIG. 17 by the relatively small appearance of the foot 1700 and by the fact that the foot registers no visible "pointer" indicator 1712 on the user interface 1710. Alternatively, if desired, the process could begin simply when a user lifts his/her foot 1700 from the contact surface 1702, which could result in relatively prompt detection of the foot 1700 by a proximity detector. The second vertical set of figures in FIG. 17 illustrates the foot 1700 approaching the contact surface (as evidenced by the enlarged size of the foot 1700) and its placement in a "hover" orientation. When the foot 1700 comes in relatively close proximity to the contact surface 1702 so as to be considered to be "hovering" (note, no contact force arrows), it is detected by the proximity detector arrangement. This fact is registered on the user interface 1710 by illustrating a "pointer" indicator 1712 at the location of the foot 1700 with respect to the contact surface 1702. Any visual representation of a pointer indicator 1712 may be provided without departing from this invention. In this example situation, the pointer indicator 1712 is initially located at the same location corresponding to an input cursor 1714, although any location on the displayed user interface 1710 may be possible without departing from this invention (including within any menu elements and/or toolbars associated with the displayed information).

The third set of vertical figures in FIG. 17 illustrates motion of the foot 1700 with respect to the contact surface 1702 and the effect of this motion on the displayed information in the user interface 1710. As shown in this set of figures, as the user's foot 1700 moves rearward and rightward with respect to the contact surface 1702 while remaining in the "hover" orientation, the pointer 1712 moves downward and rightward on the display. Like FIG. 16, this hovering foot action is akin to moving a mouse pointer without depressing a mouse button (e.g., using the mouse as a pointer in a conventional mouse based computer system) or moving a hovering stylus (e.g., using the pen as a pointer in a pen-based computer system).

The final vertical set of illustrations in FIG. 17 illustrates a cursor insertion action. As shown in FIG. 17, when the user's foot 1700 makes a tap action (shown by force arrow 1704 in FIG. 17, which may require surface 1702 contact or simply a downward motion of the toe or foot), the cursor 1714 on the display is moved to the location corresponding to the hovering foot. This is evidenced in FIG. 17 by movement of the cursor 1714 from the location of the "x" in "Text Line 13" to the location of the "n" in "Text Line 16." Any desired way of evidencing this selection may be provided without departing from this invention.

FIGS. 18A through 18D illustrate entry of textual data using foot actions in user interface controlling systems and methods in accordance with at least some examples of this invention. FIG. 18A illustrates a foot 1800 interacting with a contact surface 1802 to produce output in a word processor or spreadsheet (or other) user interface 1810. In this illustrated arrangement, the user interface 1810 includes a soft keyboard 1812 (or a text input panel) having an appearance of a conventional QWERTY keyboard. The output from interaction with this soft keyboard 1812 is displayed on the display screen 1814, which in this instance appears like an electronic word processor document. FIG. 18A shows the various elements of the interface immediately after the foot 1800 has tapped the contact surface 1802 (or otherwise made a tapping action without contact) to enter the letter "l" into the electronic document 1814. Notably, in the document 1814, the last entered letter "l" is displayed (in the partial word "Sampl"), and the input cursor 1816 is located adjacent to this last entered letter). The "L" key in the soft keyboard 1812 is also highlighted, and this highlighting may quickly fade or otherwise disappear after the text is inserted.

FIG. 18B illustrates the foot motion from the initial position of FIG. 18A (shown in broken lines in FIG. 18B) corresponding to the letter "l" to its later position (shown in full lines in FIG. 18B) corresponding to the letter "e". In this example interface, the foot moves while in a hovering orientation, and the location of the foot with respect to the keyboard is illustrated by "graying out" the key of the soft keyboard 1812 corresponding to the foot's location (or in the other manners described above). Notably, in FIG. 18B, the soft keyboard 1812 is illustrated as having the letter "E" grayed out. At this time, no changes have been made in the display 1814 or to the cursor 1816.

Then, as shown in FIG. 18C, the letter "e" is selected. This is shown in FIG. 18C by the force arrow 1818 at the foot's location corresponding to the "e" key and by a blacking out of the "e" key in the soft keyboard 1812. Also, in response to this action, the electronic text in the display 1814 is changed to add the letter "e" at the previous location of the cursor 1816, and the cursor 1816 is moved over one space to the right. Next, as illustrated in FIG. 18D, the foot further moves to a location corresponding to the spacebar on the soft keyboard 1812 (note the lack of a force arrow and the grayed out appearance of the spacebar on the soft keyboard 1812, which indicate a hover action), and the process continues in a similar manner until all of the desired input to the electronic document 1814 is entered.

Figure 19A:
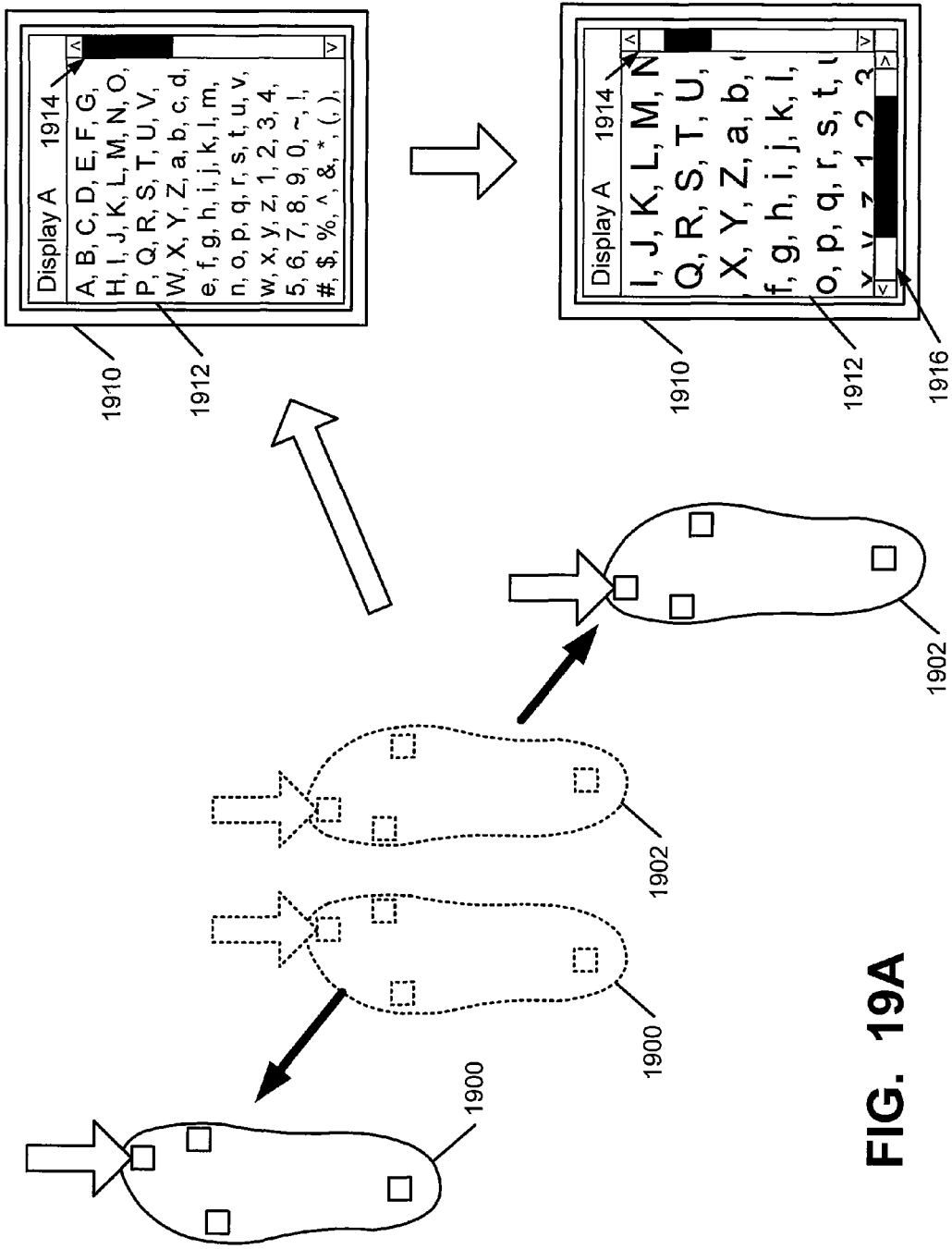
Figure 19B:
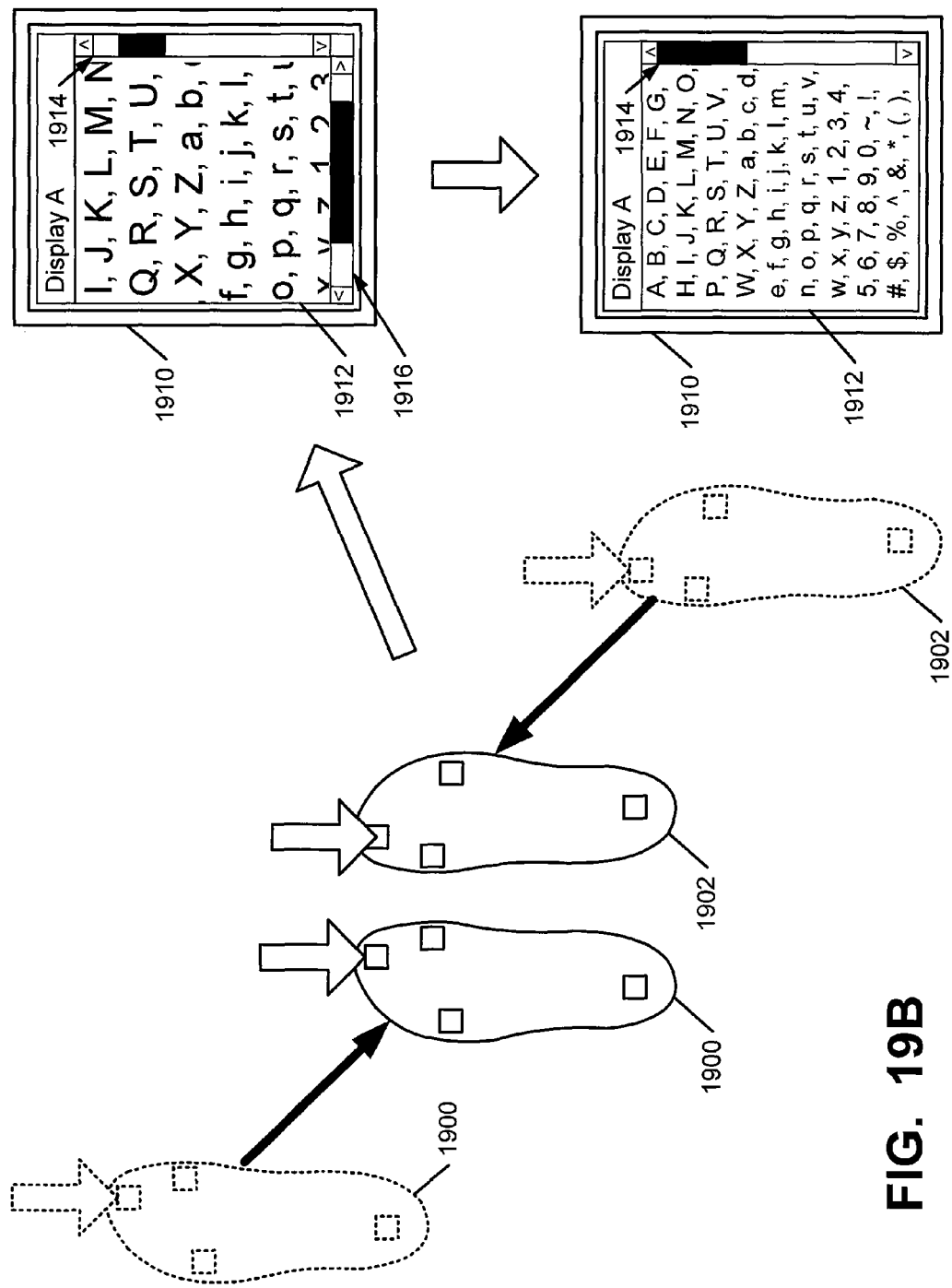

FIGS. 19A and 19B illustrate example foot actions for controlling characteristics of a display of a user interface. In FIG. 19A, the two foot gesture action of FIG. 8K is utilized (e.g., two feet 1900 and 1902 simultaneously moving apart from one another, optionally with continuing contact with a contact surface and optionally in a diagonal direction). In accordance with at least some examples of this invention, this foot action may have the effect of increasing a size of the displayed information in a user interface 1910. In addition to changing the display 1912 to display the information in an increased size, this change is evidenced in the user interface 1910 by changes in or the inclusion of scroll bars 1914 and 1916. In FIG. 19B, the two foot gesture action of FIG. 8J is utilized (e.g., two feet 1900 and 1902 simultaneously moving together with respect to one another, optionally with continuing contact with a contact surface and optionally in a diagonal direction). In accordance with at least some examples of this invention, this foot action may have the effect of decreasing a size of the displayed information in a user interface 1910. In addition to changing the display 1912 to display the information in a decreased size, this change is evidenced in the user interface 1910 by changes in or the disappearance of scroll bars 1914 and 1916.

Figure 20:
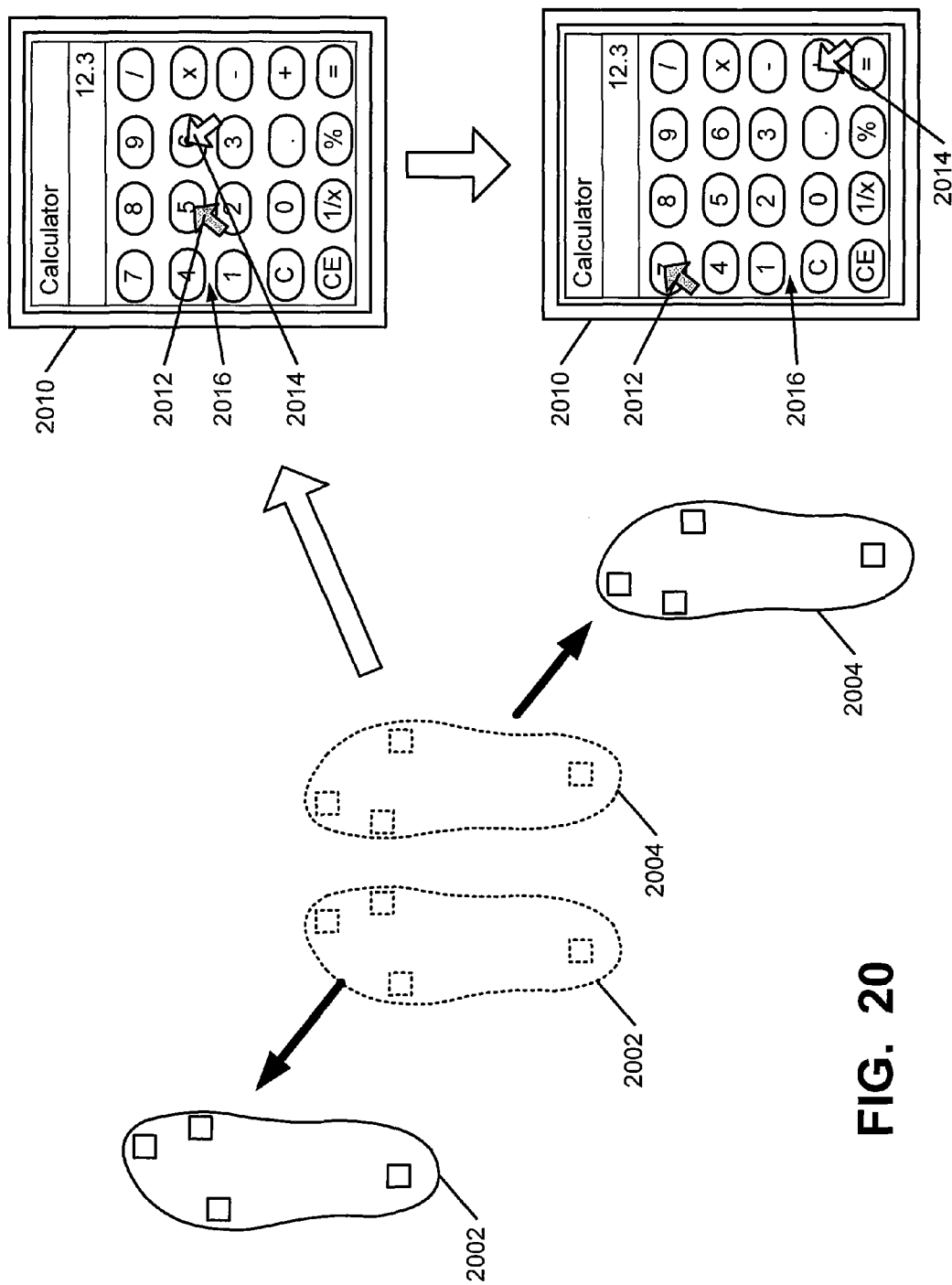

FIG. 20 illustrates an example of simultaneous two foot input (feet 2002 and 2004) in a user interface 2010. In this example, each foot 2002 and 2004 is associated with a unique pointer element 2012 and 2014, respectively, and each foot 2002 or 2004 may act independent of the other foot 2002 or 2004. Any manner of visually (or otherwise) distinguishing between the two pointer elements 2012 and 2014 may be used without departing from this invention, if desired. In this manner, as illustrated in FIG. 20, each pointer element 2012 and 2014 can be independently moved around the interface 2010 by motion of the individual feet 2002 and 2004. Moreover, each foot 2002 and 2004 can be individually used to select items in the interface (e.g., individually make tapping actions to make selections, for example, tapping one or more of the soft keys of soft keyboard 2016). In this manner, the two feet could be used to enter information on a soft keyboard (e.g., like that illustrated in FIG. 20 or like the soft keyboard 1812 illustrated in FIGS. 18A through 18D). Two foot input of this type may make typing on a QWERTY type keyboard much more intuitive, quick, and natural, for example, as compared to one foot typing.

Figure 21:
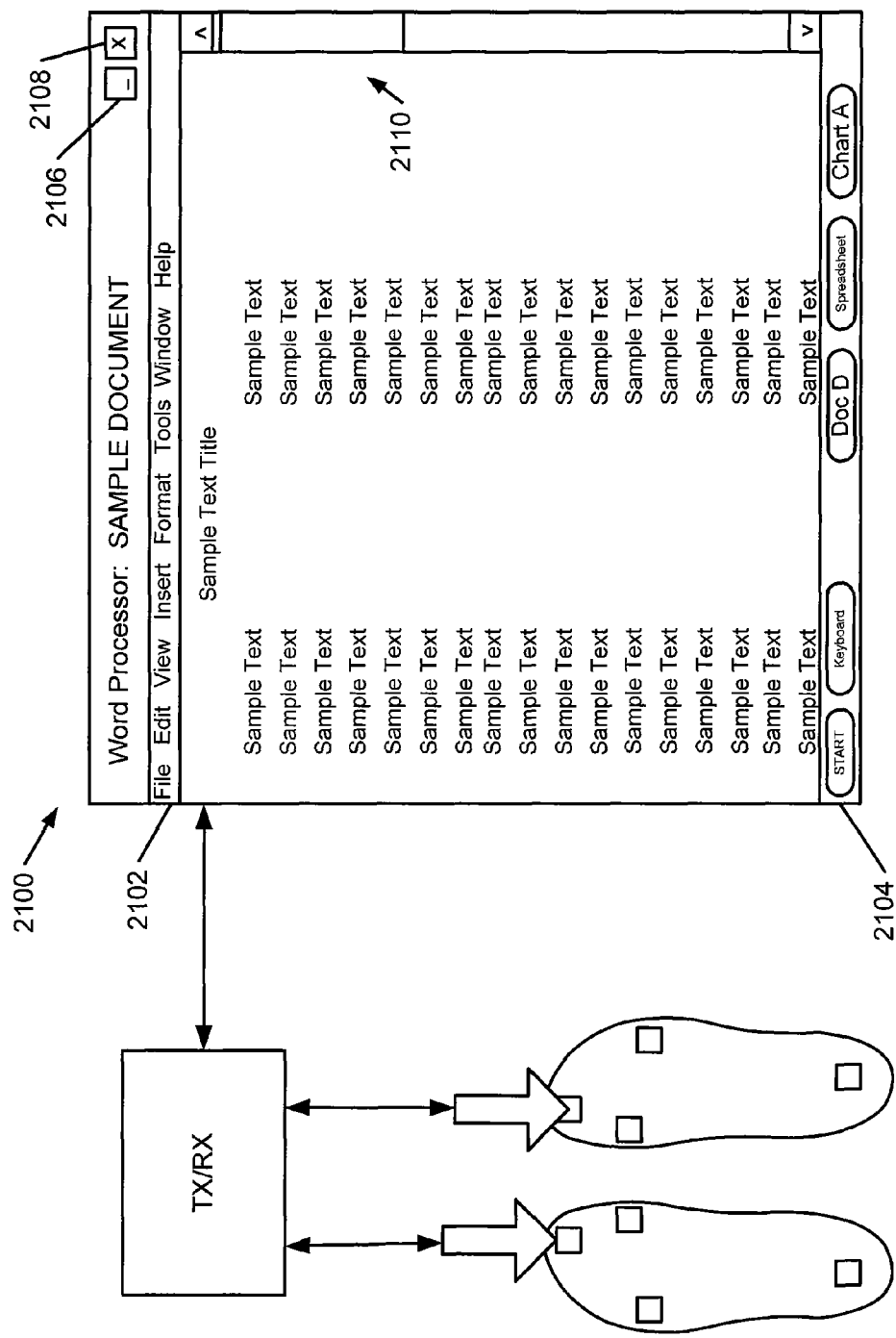
FIG. 21 illustrates additional features or areas of a user interface that may be controlled using foot action input in computer systems and methods in accordance with examples of this invention.

In addition to allowing users to interact with information contained within a user interface, aspects of this invention may be used to control the interface itself, e.g., to control any and all aspects of a computer operating system and/or to control any and all aspects of application programs running on such computers. FIG. 21 illustrates a user interface that is running a word processing application program. If desired, foot action input (e.g., of the types described above) associated with systems and methods in accordance with examples of this invention also may be used to operate the various toolbars 2102 and 2104 that are displayed by the interface 2100. For example, if desired, foot action input may be used to interact with the application program specific tool bar 2102, e.g., to access and interact with list items contained in the "File," "Edit," "View," "Insert," "Format," "Tools," "Window," "Help," and/or any other desired toolbar elements. Additionally or alternatively, if desired, foot action (e.g., of the types described above) may be used to interact with items on the toolbar 2104, which allow users to switch between open application programs, launch new application programs, and the like. As some more specific examples, as illustrated in FIG. 21, foot action could be used to activate a "Start" button, to launch a soft keyboard (like that shown in FIGS. 18A through 18D or 20), and/or to switch between the presently active document (e.g., "SAMPLE DOCUMENT") and other open documents (e.g., "Doc D") or application programs (e.g., a "Spreadsheet" application program or a graphic "Chart" application program). Foot action also may be used, e.g., to interact with any type of icon or menu item, such as the "minimize" icon 2106, the "close" icon 2108, and/or the scroll bar 2110 provided in the example interface 2100 illustrated in FIG. 21.

D. Additional Potential Features of Systems and Methods According to Examples of this Invention Foot action input for entering input data and/or controlling a user interface, as described above, may be used in combination with conventional input systems and methods, such as hard keyboard input, mouse input, roller ball input, touch pad input, track ball input, stylus input, finger touch screen input, joystick or other game controller input, voice input, hard button input, etc. In such systems and methods, foot action input may be input and recognized simultaneous with and/or at different times with respect to the other, conventional input.

Given benefit of the above disclosure, one skilled in the art could create a robust input system that receives input relating to foot actions, recognizes gestures relating to such foot actions (e.g., based on the foot motion, foot contact with a surface, the force associated with a foot contact, etc.), and translates the gestures into data for controlling or interacting with a user interface and/or for otherwise providing input to the computer system. Any desired foot actions, combinations of foot actions, and/or combinations of foot actions with other input data may be received as input and/or recognized, and these input and recognized gestures may be used to control any desired aspect of the computer system, its user interface, and/or application programs or other features run by the computer.

Further aspects of this invention relate to systems for retrofitting existing shoes and/or computer systems to accept foot action input for controlling the operating system and/or user interfaces. This may be accomplished, for example, using foot contact pads and/or shoe holding devices of the types illustrated in FIGS. 3 through 6. Software may be downloaded to enable an existing conventional computer to accept the foot action input data and convert it to a form for controlling a user interface or operating system. As another alternative, systems and methods according to the invention could process the data and convert it to the necessary form and/or format before sending it to the conventional computer system to control the user interface and/or computer operating system.

III. Conclusion

The present invention is described above and in the accompanying drawings with reference to a variety of example structures, features, elements, and combinations of structures, features, and elements. The purpose served by the disclosure, however, is to provide examples of the various features and concepts related to the invention, not to limit the scope of the invention. One skilled in the relevant art will recognize that numerous variations and modifications may be made to the embodiments described above without departing from the scope of the present invention, as defined by the appended claims. For example, the various features and concepts described above in conjunction with FIGS. 1A through 21 may be used individually and/or in any combination or subcombination without departing from this invention.

We claim:

1. A computer system, comprising:
   an input system including a first sensing device for sensing foot action, wherein the first sensing device is engaged with or formed as part of an article of footwear, and wherein the sensed foot action includes at least one of: foot movement, contact force between a foot and a contact surface, and contact between a foot and a contact surface;
   a data transmission system for transmitting data relating to the sensed foot action;
   a processing system for receiving the data transmitted by the data transmission system, wherein the processing system utilizes the data transmitted by the data transmission system, at least in part, to provide control data based, at least in part, on the sensed foot action; and
   an output device for producing a non-video game computer output based, at least in part, on data provided by the processing system, wherein the control data relating to the sensed foot action is used, at least in part, for controlling a user interface associated with the computer output.

2. A computer system according to claim 1, wherein the data transmission system includes a wireless transmission system.

3. A computer system according to claim 1, wherein the data transmission system is engaged with or formed as part of an article of footwear.

4. A computer system according to claim 1, wherein the first sensing device senses contact of a first portion of a foot with a contact surface, and wherein the article of footwear further includes a second sensing device engaged with or formed as part of the article of footwear, wherein the second sensing device senses contact of a second portion of the foot with the contact surface.

5. A computer system according to claim 1, wherein the sensed foot action includes at least one member selected from the group consisting of: a foot tap motion, a foot double tap motion, a foot press-and-hold, a heel tap motion, a toe tap motion, a lateral foot side tap motion, a medial foot side tap motion, a heel double tap motion, a toe double tap motion, a lateral foot side double tap motion, a medial foot side double tap motion, a heel press-and-hold, a toe press-and-hold, a lateral foot side press-and-hold, a medial foot side press-and-hold, a tap force, a press-and-hold press force, foot motion while in contact with a contact surface, heel motion while in contact with a contact surface, toe motion while in contact with a contact surface, lateral foot side motion while in contact with a contact surface, medial foot side motion while in contact with a contact surface, toe contact force, heel contact force, lateral foot side contact force, medial foot side contact force, a foot shaking motion, a direction of foot motion, a foot motion speed, a change in foot motion direction, a change in foot motion speed, a change in foot press force, a change in location of foot contact force, relative motion of two feet, relative motion direction of two feet, force differential between contact force of two feet, force differential between contact force of two consecutive foot contacts, and a foot hover action.

6. A computer system according to claim 1, wherein the data relating to the sensed foot action is used to provide the control data for controlling the user interface to perform at least one of the actions selected from the group consisting of: an item select action; a cursor positioning action; a highlight action; a switching action between open application programs; a switching action between operating modes within a single application program; launching a new application or program; volume up; volume down; channel up; channel down; zoom in; zoom out; changing a view on a display device by moving upward; changing a view on a display device by moving downward; changing a view on a display device by moving leftward; changing a view on a display device by moving rightward; page up; page down; moving around on content displayed on a display device; activating a text input panel; moving locations on a listing of items; incrementing a counter; skipping a currently playing item; replaying a currently playing item from its beginning; chapter up; chapter down; activating fast forward of audio or video; activating rewind of audio or video; activating play of audio or video; pausing playback of audio or video; moving to a checkout sequence; advancing to a top of a list or to a beginning of a display; moving to a bottom of a list or to an end of a display; draw a line or curve; exiting an application program; closing an individual document or other window element; changing font properties; changing line properties; changing window sizes; operating virtual switches, knobs, sliders, handles, doors, drawers, buttons, ON/OFF switches, and radio buttons; selecting or changing ringtones; initiating a telephone call; ending a telephone call; dialing a telephone call; initiating a conference call; and dropping one or more parties from a conference call.

7. A computer system according to claim 1, wherein the user interface controlled, at least in part, by the control data relating to the sensed foot action includes a graphical user interface.

8. A computer system according to claim 7, wherein the foot action sensed by the first sensing device includes moving the foot in a front-to-rear direction, and wherein the control data relating to this sensed foot action is used to scroll upward in displayed content.

9. A computer system according to claim 7, wherein the foot action sensed by the first sensing device includes moving the foot in a rear-to-front direction, and wherein the control data relating to this sensed foot action is used to scroll downward in displayed content.

10. A computer system according to claim 7, wherein the foot action sensed by the first sensing device includes moving the foot in a right-to-left direction, and wherein the control data relating to this sensed foot action is used to scroll rightward in displayed content.

11. A computer system according to claim 7, wherein the foot action sensed by the first sensing device includes moving the foot in a left-to-right direction, and wherein the control data relating to this sensed foot action is used to scroll leftward in displayed content.

12. A computer system according to claim 7, wherein the foot action sensed by the first sensing device includes a foot tap motion, and wherein the control data relating to this sensed foot action is used to make a selection action from information displayed by the output device.

13. A computer system according to claim 7, wherein the foot action sensed by the first sensing device includes a foot tap motion, and wherein the control data relating to this sensed foot action is used to position a cursor at a location of a displayed pointing element with respect to displayed content at the time of the foot tap motion.

14. A computer system, comprising:
    a first input system including a first sensing system for sensing action of a first foot, wherein the first sensing system is engaged with or formed as part of a first shoe of a pair of shoes, and wherein the action includes at least one of: first foot movement, contact force between the first foot and a contact surface, and contact between the first foot and a contact surface;

a second input system including a second sensing system for sensing action of a second foot, wherein the second sensing system is engaged with or formed as part of a second shoe of the pair of shoes, and wherein the action includes at least one of: second foot movement, contact force between the second foot and a contact surface, and contact between the second foot and a contact surface;

a data transmission system for transmitting data relating to the sensed action by the first foot and the second foot;

a processing system for receiving the data transmitted by the data transmission system, wherein the processing system utilizes the data transmitted by the data transmission system, at least in part, to provide control data based, at least in part, on the sensed actions of the first foot and the second foot; and an output device for producing a non-video game computer output based, at least in part, on data provided by the processing system, wherein the control data is used, at least in part, to control a user interface associated with the computer output.

15. A computer system according to claim 14, wherein the data transmission system includes a first data transmission device for transmitting data relating to the sensed action by the first foot and a second data transmission device for transmitting data relating to the sensed action by the second foot.

16. A computer system according to claim 15, wherein the first data transmission device is engaged with the first shoe of the pair of shoes and the second data transmission device is engaged with the second shoe of the pair of shoes.

17. A computer system according to claim 14, wherein the data transmission system includes at least one wireless transmission system.

18. A computer system according to claim 14, wherein the actions sensed by the first and second input systems include at least one member selected from the group consisting of: a foot tap motion, a foot double tap motion, a foot press-and-hold, a heel tap motion, a toe tap motion, a lateral foot side tap motion, a medial foot side tap motion, a heel double tap motion, a toe double tap motion, a lateral foot side double tap motion, a medial foot side double tap motion, a heel press-and-hold, a toe press-and-hold, a lateral foot side press-and-hold, a medial foot side press-and-hold, a tap force, a press-and-hold press force, foot motion while in contact with a contact surface, heel motion while in contact with a contact surface, toe motion while in contact with a contact surface, lateral foot side motion while in contact with a contact surface, medial foot side motion while in contact with a contact surface, toe contact force, heel contact force, lateral foot side contact force, medial foot side contact force, a foot shaking motion, a direction of foot motion, a foot motion speed, a change in foot motion direction, a change in foot motion speed, a change in foot press force, a change in location of foot contact force, relative motion of two feet, relative motion direction of two feet, force differential between contact force of two feet, force differential between contact force of two consecutive foot contacts, and a foot hover action.

19. A computer system according to claim 14, wherein the data relating to the sensed actions by the first foot and the second foot is used to provide or produce the control data for controlling the user interface to perform at least one of the actions selected from the group consisting of: an item select action; a cursor positioning action; a highlight action; a switching action between open application programs; a switching action between operating modes within a single application program; launching a new application or program; volume up; volume down; channel up; channel down; zoom in; zoom out; changing a view on a display device by moving upward; changing a view on a display device by moving downward; changing a view on a display device by moving leftward; changing a view on a display device by moving rightward; page up; page down; moving around on content displayed on a display device; activating a text input panel; moving locations on a listing of items; incrementing a counter; skipping a currently playing item; replaying a currently playing item from its beginning; chapter up; chapter down; activating fast forward of audio or video; activating rewind of audio or video; activating play of audio or video; pausing playback of audio or video; moving to a checkout sequence; advancing to a top of a list or to a beginning of a display; moving to a bottom of a list or to an end of a display; draw a line or curve; exiting an application program; closing an individual document or other window element; changing font properties; changing line properties; changing window sizes; operating virtual switches, knobs, sliders, handles, doors, drawers, buttons, ON/OFF switches, and radio buttons; selecting or changing ringtones; initiating a telephone call; ending a telephone call; dialing a telephone call; initiating a conference call; and dropping one or more parties from a conference call.

20. A computer system according to claim 14, wherein the user interface controlled, at least in part, by the control data relating to the sensed action of the first foot and the second foot includes a graphical user interface.

21. A computer system according to claim 20, wherein the action sensed includes a foot tap motion by at least one of the first foot or the second foot, and wherein the control data relating to this sensed foot action is used to make a selection action from information displayed by the output device.

22. A computer system according to claim 20, wherein the action sensed includes an indication of the first foot and the second foot moving apart from one another, and wherein the control data relating to this sensed action is used to enlarge a view of an object displayed on a display device.

23. A computer system according to claim 20, wherein the action sensed includes an indication of the first foot and the second foot moving toward one another, and wherein the control data relating to this sensed action is used to shrink a view of an object displayed on a display device.

24. A computer system according to claim 20, wherein combination or simultaneous actions using both the first foot and the second foot provide control data for controlling the graphical user interface.

25. A computer system according to claim 14, wherein the first input system is engaged with or formed as part of a first shoe of a pair of shoes and senses contact of different regions of the first foot with a contact surface, and wherein the second input system is engaged with or formed as part of a second shoe of the pair and senses contact of different regions of the second foot with a contact surface.

26. A method of controlling a non-video game computer user interface, comprising:

receiving input data indicating sensed foot action from one or more sensors engaged with or formed as part of an article of footwear, wherein the sensed foot action includes at least one of: foot movement, contact force between a foot and a contact surface, and contact between a foot and a contact surface;

processing the data indicating the sensed foot action to provide control data based, at least in part, on the sensed foot action; and generating output data for controlling a non-video game computer user interface displayed by an output device, wherein the output data includes the control data.

27. A non-transitory computer readable medium containing computer executable instructions stored thereon for causing a computer processor to perform a method of controlling a non-video game computer user interface comprising:

receiving input data indicating sensed foot action from one or more sensors engaged with or formed as part of an article of footwear, wherein the sensed foot action includes at least one of: foot movement, contact force between a foot and a contact surface and contact between a foot and a contact surface;

processing the data indicating foot action to provide control data based at least in part, on the sensed foot action; and generating output data for controlling a non-video game computer user interface displayed by an output device, wherein the output data includes the control data.

* * * * *